(12) United States Patent
Kanamoto et al.

(10) Patent No.: US 8,730,099 B2
(45) Date of Patent: May 20, 2014

(54) ELECTRONIC SCANNING TYPE RADAR DEVICE AND METHOD FOR ESTIMATING DIRECTION OF RECEPTION WAVE

(71) Applicant: Honda elesys Co., Ltd., Yokohama (JP)

(72) Inventors: Junji Kanamoto, Hadano (JP); Hiroyuki Akimoto, Tokyo (JP)

(73) Assignee: Honda elesys Co., Ltd., Yokohama (JP)

( * ) Notice: Subject to any disclaimer, the term of this patent is extended or adjusted under 35 U.S.C. 154(b) by 0 days.

(21) Appl. No.: 13/859,515

(22) Filed: Apr. 9, 2013

(65) Prior Publication Data

US 2013/0222173 A1   Aug. 29, 2013

Related U.S. Application Data

(62) Division of application No. 12/810,699, filed as application No. PCT/JP2008/073606 on Dec. 25, 2008, now Pat. No. 8,446,312.

(30) Foreign Application Priority Data

Dec. 25, 2007 (JP) ............................... P2007-331567
Jan. 9, 2008 (JP) ............................... P2008-002312
Jan. 9, 2008 (JP) ............................... P2008-002313

(51) Int. Cl.
*G01S 13/00* (2006.01)

(52) U.S. Cl.
USPC ............... 342/192; 342/70; 342/89; 342/147; 342/175; 342/189

(58) Field of Classification Search
USPC ......... 342/70–72, 89–97, 107, 113, 146–158, 342/175, 189, 192–197
See application file for complete search history.

(56) References Cited

U.S. PATENT DOCUMENTS 5,359,333 A * 10/1994 Withers, Jr. .................. 342/378
6,084,928 A *  7/2000 Kuwahara .................... 375/347

(Continued)

FOREIGN PATENT DOCUMENTS

JP    09-281204 A   10/1997
JP    11-97923 A    4/1999

(Continued)

OTHER PUBLICATIONS

International Search Report, PCT/JP2008/073606, Mar. 31, 2009.

(Continued)

*Primary Examiner* — Peter Bythrow
(74) *Attorney, Agent, or Firm* — Arent Fox LLP

(57) ABSTRACT

An electronic scanning type radar device mounted on a moving body includes: a transmission unit transmitting a transmission wave; a reception unit comprising a plurality of antennas receiving a reflection wave of the transmission wave from a target; a beat signal generation unit generating a beat signal from the transmission wave and the reflection wave; a frequency resolution processing unit frequency computing a complex number data; a target detection unit detecting an existence of the target; a correlation matrix computation unit computing a correlation matrix from each of a complex number data of a detected beat frequency; a target consolidation processing unit linking the target in a present detection cycle and a past detection cycle; a correlation matrix filtering unit generating an averaged correlation matrix by weighted averaging a correlation matrix of a target in the present detection cycle and a correlation matrix of a related target in the past detection cycle; and a direction detection unit computing an arrival direction of the reflection wave based on the averaged correlation matrix.

12 Claims, 51 Drawing Sheets

(56) References Cited

U.S. PATENT DOCUMENTS

| | | | |
|---|---|---|---|
| 6,087,974 A * | 7/2000 | Yu | 342/62 |
| 6,339,395 B1 * | 1/2002 | Hazumi et al. | 342/196 |
| 6,498,581 B1 * | 12/2002 | Yu | 342/90 |
| 6,567,034 B1 * | 5/2003 | Yu | 342/16 |
| 7,474,252 B2 * | 1/2009 | Natsume et al. | 342/70 |
| 7,489,266 B2 * | 2/2009 | Ohtake et al. | 342/70 |
| 7,495,605 B1 * | 2/2009 | Sakamoto et al. | 342/118 |
| 7,525,478 B2 * | 4/2009 | Takano et al. | 342/145 |
| 7,535,408 B2 * | 5/2009 | Kuhn | 342/129 |
| 7,724,181 B2 * | 5/2010 | Natsume | 342/108 |
| 7,907,083 B2 * | 3/2011 | Sakamoto et al. | 342/70 |
| 8,102,309 B2 * | 1/2012 | Nakagawa | 342/147 |
| 2004/0233095 A1 | 11/2004 | Galati et al. | |
| 2006/0007036 A1 * | 1/2006 | Natsume et al. | 342/70 |
| 2007/0103360 A1 | 5/2007 | Nakanishi | |
| 2008/0129596 A1 * | 6/2008 | Xin | 342/378 |
| 2008/0224918 A1 * | 9/2008 | Shimizu | 342/147 |
| 2009/0021422 A1 * | 1/2009 | Abe et al. | 342/195 |
| 2009/0058717 A1 * | 3/2009 | Kuhn | 342/175 |
| 2009/0309784 A1 * | 12/2009 | Natsume | 342/189 |
| 2010/0073216 A1 * | 3/2010 | Sakamoto et al. | 342/70 |
| 2012/0268316 A1 * | 10/2012 | Kanamoto | 342/158 |

FOREIGN PATENT DOCUMENTS

| | | |
|---|---|---|
| JP | 2000-121716 A | 4/2000 |
| JP | 2000-284044 A | 10/2000 |
| JP | 2001-091617 A | 4/2001 |
| JP | 2003-270341 A | 9/2003 |
| JP | 2003-318792 A | 11/2003 |
| JP | 2006-047282 A | 2/2006 |
| JP | 2006-125985 A | 5/2006 |
| JP | 2006-145251 A | 6/2006 |
| JP | 2006-153579 A | 6/2006 |
| JP | 2006-242695 A | 9/2006 |
| JP | 2006-275840 A | 10/2006 |
| JP | 2006-284182 A | 10/2006 |
| JP | 2006-308542 A | 11/2006 |
| JP | 2007-040806 A | 2/2007 |
| JP | 2007-240313 A | 9/2007 |
| JP | 2009025195 A | 2/2009 |

OTHER PUBLICATIONS

Nobuyoshi, Kikuma, et al., "Adaptive Antenna Technology", 2003, pp. 158-165.

Nobuyoshi, Kikuma, et al., "Adaptive Signal Processing Using Array Antennas", 1998, pp. 173-179, 162-169, and 194-205.

Non-Final Office Action, U.S. Appl. No. 12/810,699, dated Sep. 12, 2012.

Notice of Reasons for Rejection (Application No. 2008-002312) dated May 29, 2012.

Notice of Reasons for Rejection (Application No. 2008-002313) dated May 29, 2012.

Notice of Reasons for Rejection issued Sep. 18, 2012, in counterpart Japanese Application No. 2008-002312, 4 pages.

Source Estimation of the Magnetic Field Evoked by a Mental Rotation Task, Journal of the Magnetics Society of Japan, Apr. 15, 1998, vol. 22, No. 4-2, pp. 777-780.

Non-Final Office Action issued Aug. 12, 2013, in corresponding U.S. Appl. No. 13/859,492.

Japanese Office Action, JP Application No. 2013-071558, Notice of Reasons for Rejection, dated Jun. 4, 2013, 8 pages.

* cited by examiner

FIG. 3
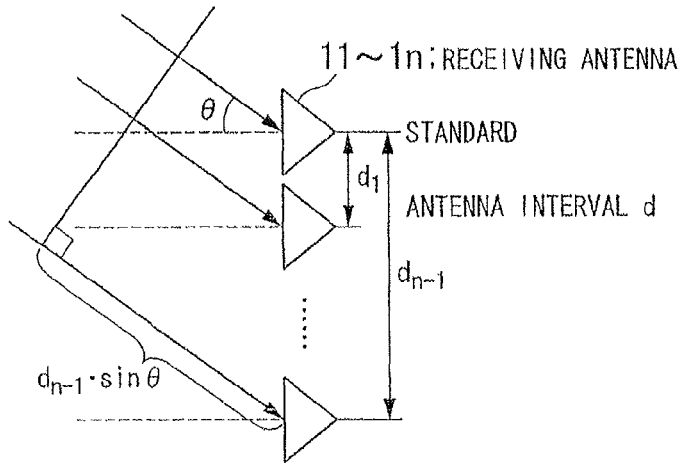
FIG. 4
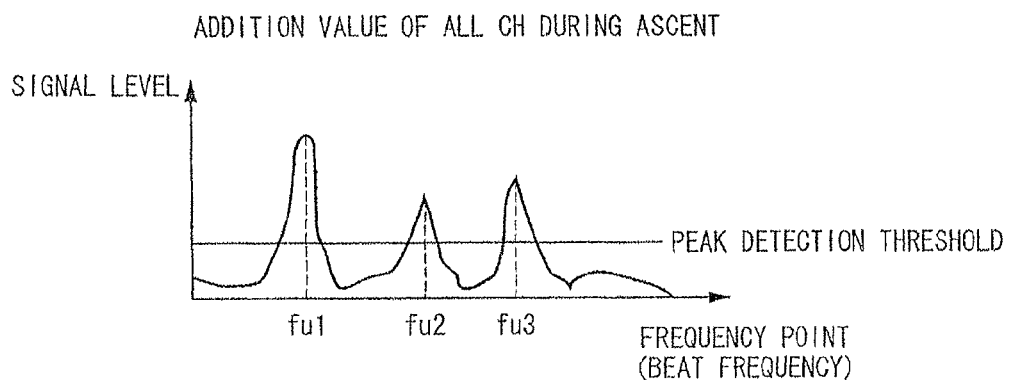
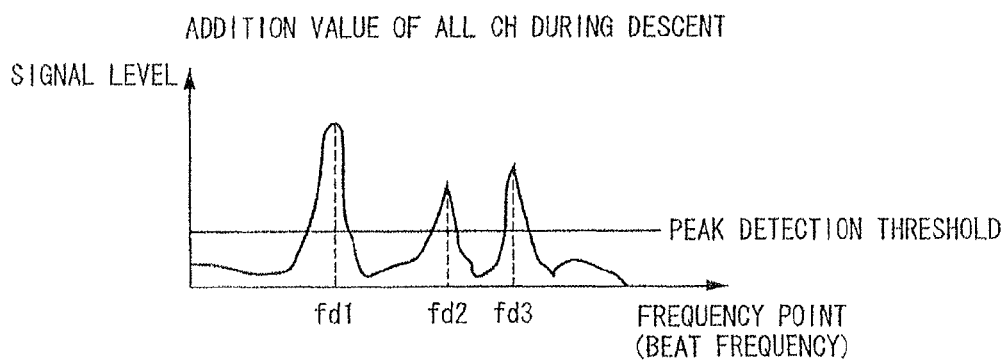

FIG. 5

PEAK DURING ASCENT →

PEAK DURING DESCENT ↓

| | 1 | 2 | 3 | 4 | 5 |
|---|---|---|---|---|---|
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | | ... | | |
| 4 | | | | | |
| 5 | | | | | $r_{55}$ $v_{55}$ $pu_5$ $pd_5$ |

AFTER DBF, THIS MATRIX WILL BE CREATED FOR THE NUMBER OF ANGLES CH

FIG. 6

| TARGET CLUSTER NUMBER | DISTANCE | RELATIVE VELOCITY | FREQUENCY POINT |
|---|---|---|---|
| TARGET CLUSTER 1 | $r_1$ | $v_1$ | $f_1$ |
| TARGET CLUSTER 2 | $r_2$ | $v_2$ | $f_2$ |
| TARGET CLUSTER 3 | $r_3$ | $v_3$ | $f_3$ |
| TARGET CLUSTER 4 | $r_4$ | $v_4$ | $f_4$ |
| ⋮ | | | |

| | | t (CLUSTER) | t (ESTIMATION) | t-1 | t-2 | t-3 |
|---|---|---|---|---|---|---|
| TARGET 1 | r | | | | | |
| | Long_d | | | | | |
| | Late_d | | | | | |
| | velo | | | | | |
| | f_dwn | | | | | |
| | mat_dwn | | | | | |
| TARGET 2 | r | | | | | |
| | Long_d | | | | | |
| | Late_d | | | | | |
| | velo | | | | | |
| | f_dwn | | | | | |
| | mat_dwn | | | | | |
| ⋮ | ⋮ | | | | | | r : DISTANCE
Long_d : LONGITUDINAL POSITION
Late_d : LATERAL POSITION
velo : RELATIVE VELOCITY
f_dwn : PEAK FREQUENCY DURING DESCENT
mat_dwn : CORRELATION MATRIX AT THE TIME OF PEAK FREQUENCY DURING DESCENT

FIG. 19

LINKING OF PRESENT TARGET CLUSTER AND PAST TARGET

|  |  | t (CLUSTER) | t (ESTIMATE) | t-1 | t-2 | t-3 |
|---|---|---|---|---|---|---|
| TARGET 1 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | mat_up |  |  |  |  |  |
|  | f_dwn |  |  |  |  |  |
|  | mat_dwn |  |  |  |  |  |
| TARGET 2 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | mat_up |  |  |  |  |  |
|  | f_dwn |  |  |  |  |  |
|  | mat_dwn |  |  |  |  |  |
| ⋮ | ⋮ |  |  |  |  |  | r : DISTANCE
Long_d : LONGITUDINAL POSITION
Late_d : LATERAL POSITION
velo : RELATIVE VELOCITY
f_up : PEAK FREQUENCY DURING ASCENT
mat_up : CORRELATION MATRIX AT THE TIME OF PEAK FREQUENCY DURING ASCENT
f_dwn : PEAK FREQUENCY DURING DESCENT
mat_dwn : CORRELATION MATRIX AT THE TIME OF PEAK FREQUENCY DURING DESCENT

FIG. 20

ASCENT

|  | ANGLE 1 | ANGLE 2 | ... | FREQUENCY POINT |
|---|---|---|---|---|
| TARGET CLUSTER 1 | $t_1\_ang_1$ | $t_1\_ang_2$ |  | $f_1$ |
| TARGET CLUSTER 2 | $t_2\_ang_1$ | $t_2\_ang_2$ |  | $f_2$ |
| TARGET CLUSTER 3 | $t_3\_ang_1$ | $t_3\_ang_2$ |  | $f_3$ |
| TARGET CLUSTER 4 | $t_4\_ang_1$ | $t_4\_ang_2$ |  | $f_4$ |
| ⋮ |  |  |  |  |

DESCENT

|  | ANGLE 1 | ANGLE 2 | ... | FREQUENCY POINT |
|---|---|---|---|---|
| TARGET CLUSTER 1 | $t_1\_ang_1$ | $t_1\_ang_2$ |  | $f_1$ |
| TARGET CLUSTER 2 | $t_2\_ang_1$ | $t_2\_ang_2$ |  | $f_2$ |
| TARGET CLUSTER 3 | $t_3\_ang_1$ | $t_3\_ang_2$ |  | $f_3$ |
| TARGET CLUSTER 4 | $t_4\_ang_1$ | $t_4\_ang_2$ |  | $f_4$ |
| ⋮ |  |  |  |  |

FIG. 21

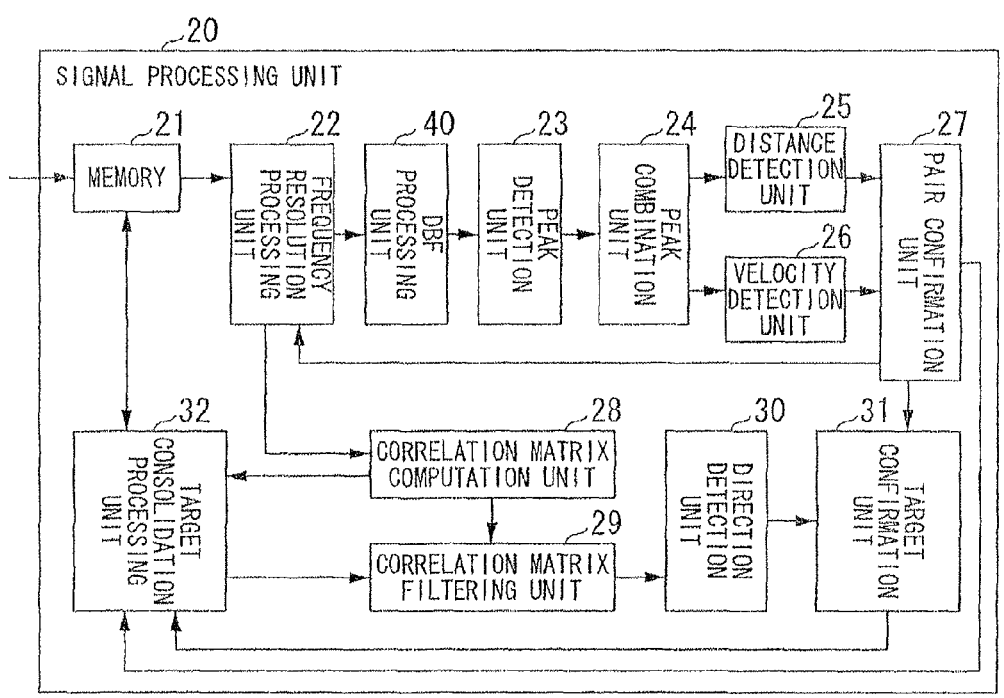

| TARGET CLUSTER NUMBER | LONGITUDINAL DISTANCE | LONGITUDINAL POSITION | LATERAL POSITION | RELATIVE VELOCITY | FREQUENCY POINT |
|---|---|---|---|---|---|
| TARGET CLUSTER 1 | $r_1$ | $long\_d_1$ | $late\_d_1$ | $v_1$ | $f_1$ |
| TARGET CLUSTER 2 | $r_2$ | $long\_d_2$ | $late\_d_2$ | $v_2$ | $f_2$ |
| TARGET CLUSTER 3 | $r_3$ | $long\_d_3$ | $late\_d_3$ | $v_3$ | $f_3$ |
| TARGET CLUSTER 4 | $r_4$ | $long\_d_4$ | $late\_d_4$ | $v_4$ | $f_4$ |
| ⋮ | | | | | |

FIG. 38A
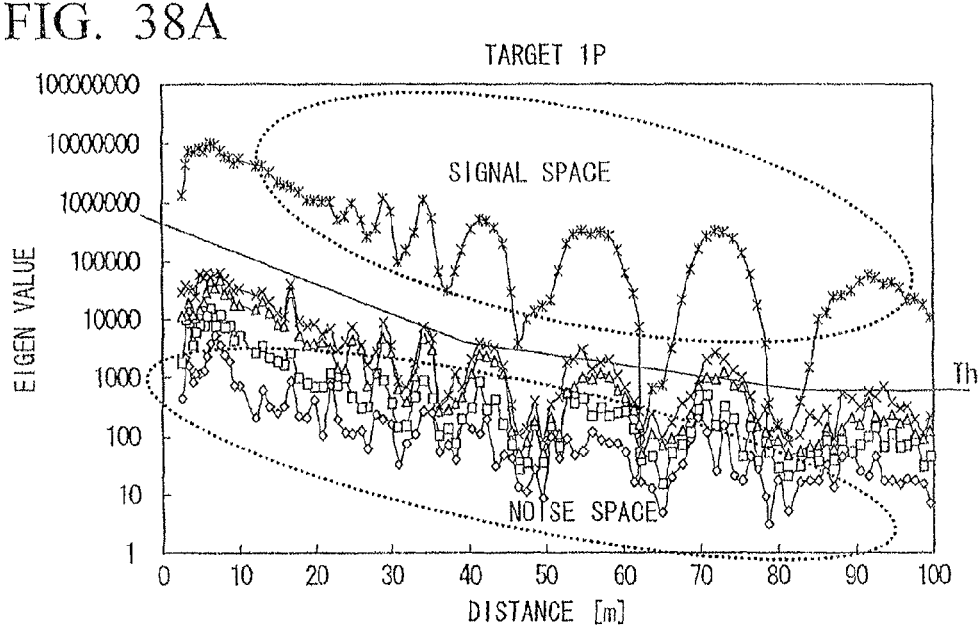
FIG. 38B
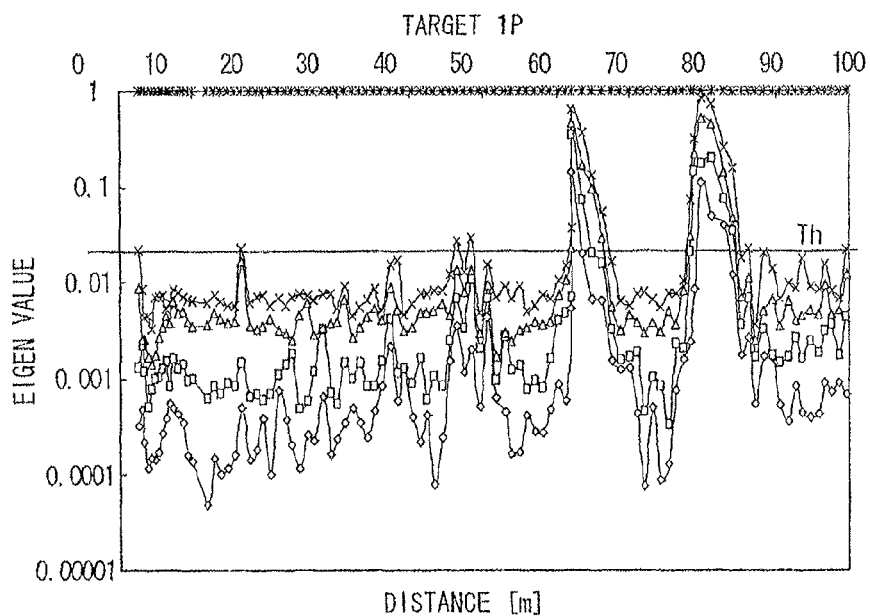
FIG. 38C
| CASE IN WHICH EIGEN VALUE EQUALS λ AT A TIME OF 100m IN EXAMPLE 1 | | | | | | |
|---|---|---|---|---|---|---|
| λ1 | λ2 | λ3 | λ4 | λ5 | λ6 | λ7 |
| 10524.2 | 225.7 | 127.8 | 44.9 | 7.0 | 0.2 | −0.00033 |
| SIGNAL | NOISE | | | | | |

FIG. 48
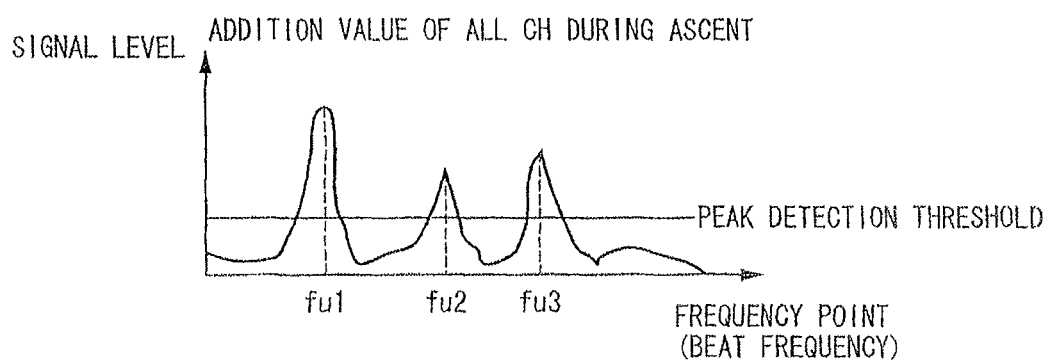
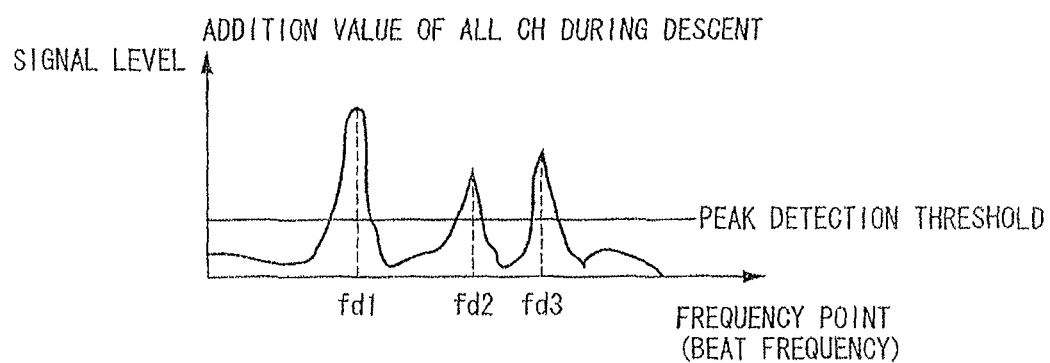

FIG. 59A
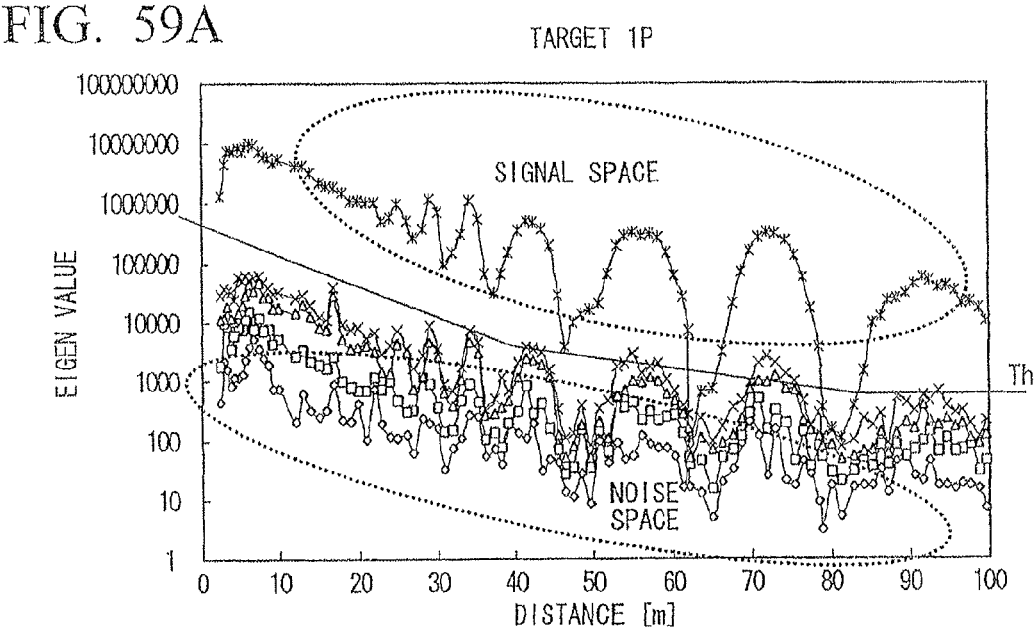
FIG. 59B
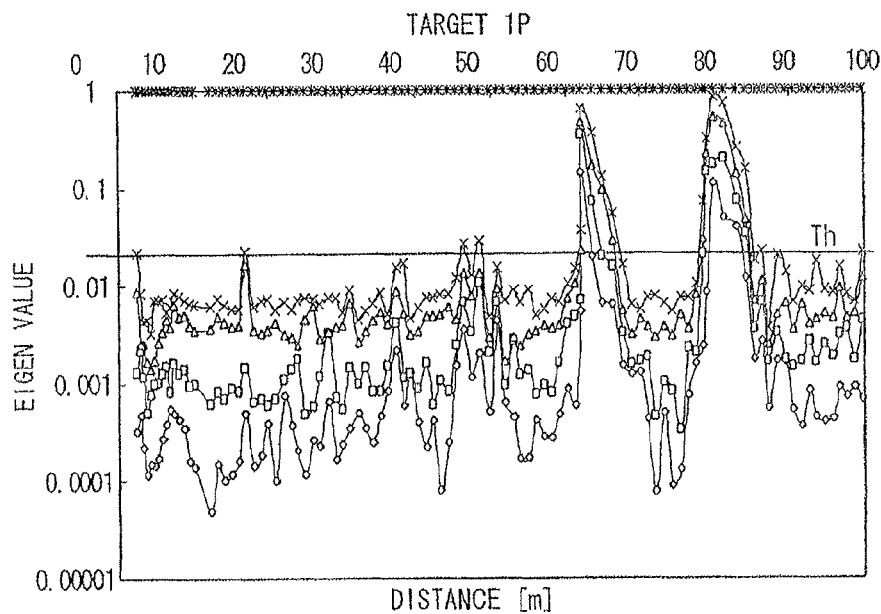
FIG. 59C
| CASE IN WHICH EIGEN VALUE EQUALS λ AT A TIME OF 100m IN EXAMPLE 1 | | | | | | |
|---|---|---|---|---|---|---|
| λ1 | λ2 | λ3 | λ4 | λ5 | λ6 | λ7 |
| 10524.2 | 225.7 | 127.8 | 44.9 | 7.0 | 0.2 | −0.00033 |
| SIGNAL | NOISE | | | | | |

ELECTRONIC SCANNING TYPE RADAR DEVICE AND METHOD FOR ESTIMATING DIRECTION OF RECEPTION WAVE

CROSS-REFERENCED TO RELATED APPLICATION

This application is a Divisional Application of U.S. patent application Ser. No. 12/810,699, filed Jun. 25, 2010, which is a National Stage entry of International Application PCT/JP2008/073606, filed Dec. 25, 2008, which claims priority to Japanese Patent Application No. 2007-331567, filed Dec. 25, 2007, Japanese Patent Application No. 2008-002312, filed Jan. 9, 2008, and Japanese Patent Application No. 2008-002313, filed Jan. 9, 2008, the disclosure of the prior applications being incorporated in their entirety by reference.

TECHNICAL FIELD

The present invention relates to an electronic scanning type radar device, suitable for mounting on a vehicle, which uses a reflection wave from a target corresponding to an emitted transmission wave in order to detect the target. The present invention also relates to an estimation method of a direction of a reception wave, and a program estimating a direction of an incoming wave to be used for the above estimation method.

The present application is based on Japanese Patent Application No. 2007-331567, filed on Dec. 25, 2007; Japanese Patent Application No. 2008-002312, filed on Jan. 9, 2008; and Japanese Patent Application No. 2008-002313, filed on Jan. 9, 2008.

BACKGROUND ART

Conventionally, an electronic scanning type radar has been used as a radar mounted on a vehicle, which utilizes the system of an FMCW (Frequency Modulated Continuous Wave) radar, a multifrequency CW (Continuous Wave) radar, a pulse radar, and the like.

According to each of the radars mentioned above, an estimation method of a direction of an incoming wave of an array antenna is used as a technology for detecting a direction of an incoming wave (or a reception wave) from a target.

An example of this estimation method of a direction of an incoming wave is a null operation method (refer to Non-Patent Document 1 and 2, for instance) known as a super-resolution (high precision) algorithm such as a beam scanning method like the Beamformer Method and the Capon Method, a linear prediction method like the Maximum Entropy Method (MEM: Maximum Entropy Method), the Minimum Norm Method, MUSIC (Multiple Signal Classification) Method, and the ESPRIT (Estimation of Signal Parameters via Rotational Invariance Techniques) Method.

Further, the estimation of the direction of the incoming wave, used by a radar mounted on a vehicle, is conducted by a method (refer to, for example, Patent Document 1) using solely the digital beam forming (DBF: Digital Beam Forming) of the Beamformer Method, or by a method (refer to, for example, Patent Documents 2 and 3) combining the DBF and the Maximum Entropy Method in recent years in order to enhance the detection accuracy of the arrival direction of the reception wave (or the resolution performance of the target).

Moreover, in order to apply a super-resolution algorithm such as MUSIC to a vehicle-mounted radar, a microprocessor is used which is utilized for vehicle-mounted radar with a low arithmetic processing capacity, compared to normal personal computers. Therefore, a method is developed by simplifying an estimation algorithm (refer to, for example, Patent Documents 4, 5, 6, and 7).

According to the super-resolution algorithm such as MUSIC, mentioned above, a correlation matrix is generated from data of reception waves received by each array antenna. An eigen value calculation is conducted by this correlation matrix. Thus, the arrival direction of the reception wave is detected. Here, the eigen value calculation (computation) refers to a calculation obtaining the eigen value and the eigenvector.

At this time, the super-resolution algorithm generates a correlation matrix by an ensemble average of the reception data because the accuracy of detecting the arrival direction enhances as the noise element of the correlation matrix is removed.

For example, the FMCW radar uses a correlation matrix generated by obtaining highest possible number of samples of a data set of the received beat signal (a temporal sequence data of a certain period of time, which can be converted to a data in a frequency domain) and obtaining an average. The number of samples is called a snapshot number (refer to, for example, Non-Patent Documents 1 and 2).

However, according to the vehicle-mounted radar, the distance from the target and the relative velocity change constantly. Therefore, even if the snapshot number is increased nebulously, the accuracy of detecting the arrival direction of the reception wave does not necessarily increase.

On the contrary, in order to increase the snapshot number within a control cycle (or a detection cycle such as 100 ms) for detecting the target, the frequency resolution operation corresponding to the reception signal must be conducted simultaneously for a number of times multiplying the number of array antennas and the snapshot number. Thus, there is a limit on the number.

Patent Document 4 describes a method in order to enhance the accuracy of detecting the target without increasing the snapshot number. According to this method described in Patent Document 4, for example, a correlation matrix is stored for each beat frequency at the previous control cycle (or the control cycle immediately prior to the previous control cycle). Further, this method obtains a weighted sum (weighted average) of a correlation matrix of a beat frequency, for which a target exists in the present control cycle, and a correlation matrix in the previous control cycle (or the control cycle immediately prior to the previous control cycle) having the same beat frequency. Moreover, Patent Document 4 describes a method which stores the weighted averaged correlation matrix for each beat frequency, and obtains a further weighted sum of the correlation matrix of a beat frequency for which a target exists in the present control cycle and a correlation matrix with the same frequency obtained as described above by weighted summation.

In addition, Patent Document 5, mentioned above, discloses a method for increasing the snapshot number by averaging each correlation matrix generated for a frequency indicating a peak value, from among the same peak waveform for which a target exists at a beat frequency, and for a frequency in the vicinity (for example, ±two frequency resolutions).

According to this Patent Document 5, an average of the correlation matrix in the frequency domain is further averaged by using a past correlation matrix. Next, Patent Document 6 describes estimating an arrival direction of the reception wave by combining a method estimating the form of a roadside and a method averaging the present and past correlation matrices.

In addition, Patent Document 7 describes a method which determines a weighted coefficient (or a forgetting coefficient: a constant representing the degree of forgetting) in real time in order to average the present and past correlation matrices.

Further, an electronic scanning type radar has been used conventionally as a radar mounted on a vehicle, which utilizes the system of an FMCW (Frequency Modulated Continuous Wave) radar, a multifrequency CW (Continuous Wave) radar, a pulse radar, and the like.

According to each of the radars mentioned above, an estimation method of a direction of an incoming wave of an array antenna is used as a technology for detecting a direction of an incoming wave (or a reception wave) which is a reflection wave from a target corresponding to a transmission wave.

An example of this estimation method of a direction of an incoming wave is a null operation method (refer to Non-Patent Document 1 and 2, for instance) known as a super-resolution (high precision) algorithm such as a beam scanning method like the Beamformer Method and the Capon Method, a linear prediction method like the Maximum Entropy Method (MEM: Maximum Entropy Method), the Minimum Norm Method, MUSIC (Multiple Signal Classification) Method, and the ESPRIT (Estimation of Signal Parameters via Rotational Invariance Techniques) Method.

Further, the estimation of the direction of the incoming wave, used by a radar mounted on a vehicle, is conducted by a method (refer to, for example, Patent Document 1) using solely the digital beam forming (DBF: Digital Beam Forming) of the Beamformer Method, or by a method (refer to, for example, Patent Documents 2 and 3) combining the DBF and the Maximum Entropy Method in recent years in order to enhance the detection accuracy of the arrival direction of the reception wave (or the resolution performance of the target).

Moreover, in order to apply a super-resolution algorithm such as MUSIC to a vehicle-mounted radar, methods have been developed with an inclination to simplify the processing (refer to, for example, Patent Documents 4 and 8). These methods can be applied to a vehicle-mounted device which has a low processing capacity compared to normal personal computers.

According to the super-resolution algorithm such as MUSIC, mentioned above, it is preferred that the direction of the incoming wave is estimated after a number of the incoming waves is estimated, in order to enhance the accuracy with which the direction is estimated.

Non-Patent Documents 1 and 2 introduce the AIC (Akaike Information Criteria) and the MDL (Minimum Description Length) as methods to estimate the number of incoming waves based on the maximum-likelihood approach in statistical processing.

However, according to the estimation methods introduced in Non-Patent Documents 1 and 2, it is necessary to collect a large amount of data and then conduct a dispersion assessment. Therefore, it is not suitable to use these methods for a vehicle-mounted radar whose relative distance to the target and relative velocity fluctuate rapidly.

Patent Document 8 describes a method for estimating the number of incoming waves, necessary for computing the MUSIC spectrum, with a light computation load. In other words, Patent Document 8 describes a method which is an application of a threshold approach in which an eigen value is computed, and the signal space and a noise space are estimated individually based on the magnitude of the eigen value.

In this case, the reception intensity of the radar declines as the measured distance becomes larger. Therefore, the method described above estimates the number of incoming waves by storing and setting a threshold for each relative distance to the target, and then comparing this threshold with the eigen value (equivalent to the reception intensity).

In addition, there is a method (refer to Patent Documents 9, for example) which normalizes an eigen value as one of the diagonal element value of the original covariance matrix (in other words, the correlation matrix), and then distinguishes based on a threshold value. This method is not designed to be used for a vehicle-mounted device.

Furthermore, an estimation method which estimates the number of incoming waves with a high degree of accuracy constantly performs a spectrum computation assuming that the number of incoming waves is the maximum number that can be received, and in the subsequent calculation of electronic power, unnecessary peak values are removed, and obtain a final estimation value of the number of incoming waves (Patent Document 10).

Moreover, an electronic scanning type radar has been conventionally used as a radar mounted on a vehicle, which utilizes the system of an FMCW (Frequency Modulated Continuous Wave) radar, a multifrequency CW (Continuous Wave) radar, a pulse radar, and the like.

According to each of the radars mentioned above, an estimation method of a direction of an incoming wave of an array antenna is used as a technology for detecting a direction of an incoming wave (or a reception wave) which is a reflection wave from a target corresponding to a transmission wave.

An example of this estimation method of a direction of an incoming wave is a null operation method (refer to Non-Patent Document 1 and 2, for instance) known as a super-resolution (high precision) algorithm such as a beam scanning method like the Beamformer Method and the Capon Method, a linear prediction method like the Maximum Entropy Method (MEM: Maximum Entropy Method), the Minimum Norm Method, MUSIC (Multiple Signal Classification) Method, and the ESPRIT (Estimation of Signal Parameters via Rotational Invariance Techniques) Method.

Further, the estimation of the direction of the incoming wave, used by a radar mounted on a vehicle, is conducted by a method (refer to, for example, Patent Document 1) using solely the digital beam forming (DBF: Digital Beam Forming) of the Beamformer Method, or by a method (refer to, for example, Patent Documents 2 and 3) combining the DBF and the Maximum Entropy Method in recent years in order to enhance the detection accuracy of the arrival direction of the reception wave (or the resolution performance of the target).

Moreover, in order to apply a super-resolution algorithm such as MUSIC to a vehicle-mounted radar, methods have been developed with an inclination to simplify the processing (refer to, for example, Patent Documents 4 and 8). These methods can be applied to a vehicle-mounted device which has a low processing capacity compared to normal personal computers.

According to the super-resolution algorithm such as MUSIC, mentioned above, it is preferred that the direction of the incoming wave is estimated after a number of the incoming waves is estimated, in order to enhance the accuracy with which the direction is estimated.

Non-Patent Documents 1 and 2 introduce the AIC (Akaike Information Criteria) and the MDL (Minimum Description Length) as methods to estimate the number of incoming waves based on the maximum-likelihood approach in statistical processing.

However, according to the estimation methods introduced in Non-Patent Documents 1 and 2, it is necessary to collect a large amount of data and then conduct a dispersion assessment. Therefore, it is not suitable to use these methods for a vehicle-mounted radar whose relative distance to the target and relative velocity fluctuate rapidly.

Patent Document 8 describes a method for estimating the number of incoming waves, necessary for computing the MUSIC spectrum, with a light computation load. In other words, Patent Document 8 describes a method which is an application of a threshold approach in which an eigen value is computed, and the signal space and a noise space are estimated individually based on the magnitude of the eigen value.

In this case, the reception intensity of the radar declines as the measured distance becomes larger. Therefore, the method described above estimates the number of incoming waves by storing and setting a threshold for each relative distance to the target, and then comparing this threshold with the eigen value (which is proportional to the reception intensity).

In addition, there is a method (refer to Patent Documents 9, for example) which normalizes an eigen value as one of the diagonal element value of the original covariance matrix (in other words, the correlation matrix), and then distinguishes based on a threshold value. This method is not designed to be used for a vehicle-mounted device.

[Non-Patent Document 1] "Adaptive Signal Processing Using Array Antennas," Kikuma Nobuyoshi (Kagaku Gijutsu Shyuppan, 1998).

[Non-Patent Document 2] "Adaptive Antenna Technology," Kikuma Nobuyoshi (Ohm Sha, 2003).

[Patent Document 1] Japanese Unexamined Patent Application, First Publication No. 2000-284044

[Patent Document 2] Japanese Unexamined Patent Application, First Publication No. 2006-275840

[Patent Document 3] Japanese Unexamined Patent Application, First Publication No. 2006-308542

[Patent Document 4] Japanese Unexamined Patent Application, First Publication No. 2007-040806

[Patent Document 5] Japanese Unexamined Patent Application, First Publication No. 2006-145251

[Patent Document 6] Japanese Unexamined Patent Application, First Publication No. 2006-242695

[Patent Document 7] Japanese Unexamined Patent Application, First Publication No. 2006-284182

[Patent Document 8] Japanese Unexamined Patent Application, First Publication No. 2006-047282

[Patent Document 9] Japanese Unexamined Patent Application, First Publication No. 2006-153579

[Patent Document 10] Japanese Unexamined Patent Application, First Publication No. 2000-121716

DISCLOSURE OF INVENTION

Problems to be Solved by the Invention

However, according to Patent Document 4, in the conventional averaging process of the correlation matrix, it is necessary to perform a frequency resolution on the past correlation matrix for all beat frequencies. For example, when a Fourier transform is performed for 256 discrete times, it is necessary to store 128 discrete frequencies. As a result, in the conventional averaging process of the correlation matrix, there is a problem in that a large amount of memory is needed for "(the number of data of the correlation matrix)×(the beat frequency)." In addition, the beat frequency of the past correlation matrix selects the same frequency as the beat frequency of the present target. Therefore, when the target is being followed while maintaining a constant distance in between, the data, used for detection, is averaged. Meanwhile, when the distance to the target fluctuates, the previous frequency may not have a corresponding target. Therefore, the data used for detection may deteriorate.

Furthermore, according to Patent Document 5, as a conventional averaging method of correlation matrices, the correlation matrix of nearby beat frequencies are always averaged before an average is obtained with the past correlation matrix.

Therefore, according to the conventional averaging method of correlation matrices, it is presumed that a signal intensity is indicated as a level of existence of the target in the frequency domain including the nearby beat frequency. Thus, the conventional averaging method of correlation matrices can be applied only when the discrete frequency resolution of the beat frequency is extremely fine. In addition, the conventional averaging method is executed in combination with the averaging of the correlation matrices for nearby beat frequencies. In this way, the arrival direction of the reception wave is not detected by using the past correlation matrix individually.

Furthermore, according to Patent Document 6, it is presumed, as in Patent Document 5, that a method estimating the form of a roadside is performed in the conventional averaging method of correlation matrices as well. Therefore, the arrival direction of the reception wave is not detected by using the past correlation matrix individually. In this way, the processing is complicated.

The present invention is made considering the problems described above. One of the objects of the present invention is to provide an electronic scanning type radar device and an estimation method of a direction of a reception wave which detects an arrival direction of the reception wave with a high degree of accuracy by using a past correlation matrix individually, and by performing a simple computation.

However, according to an estimation method of an incoming wave described in Patent Document 8, it is necessary to store a threshold value for all of the distances for detecting the target. Thus, the necessary memory capacity must be retained (forming a map of a table of the threshold value on an ROM, for instance). In addition, this estimation method of the incoming wave has a problem in that the setting of the threshold value and the generation of the program which performs a comparison between the threshold values for each distance are cumbersome.

In addition, since the above threshold value is an absolute amount, there is a concern in that the robustness may not be enough, because it is not possible to cope with the up-and-down fluctuation of the eigen value due to the RCS (Radar Cross Section) of the target, a clutter which is a reflection from an unneeded object, and noise.

In addition, according to the estimation of the arrival wave described in Patent Document 9, the computed eigen value is normalized by one of the diagonal elements of the original covariance matrix. Since the number of incoming waves is usually estimated, an erroneous estimate of the number may be computed when the incoming wave is weak. Here, "weak" indicates a signal level which is greatly below a level at which the eigen value fluctuates up and down due to the RCS of the target, clutter, and noise.

In particular, regarding a usage with a vehicle-mounted radar, there is a phenomenon called a multi-pass from a road surface (which is a type of clutter). It is inevitable that a distance range is generated at which the reception wave becomes the weak signal level.

Therefore, in the distance range at which the signal level is weak, the estimation of the number of incoming wave produces an erroneous result on the contrary.

Furthermore, according to an estimation method of the incoming wave described in Patent Document 10, it is not necessary to execute a process estimating the number of incoming waves before the MUSIC spectrum computation. However, after the spectrum computation, it is necessary to always perform a calculation of electric power which accompanies an inverse matrix computation. Thus, there is a problem in that the computation load becomes heavy.

The present invention is made considering the problems described above. One of the objects of the present invention is to provide an electronic scanning type radar device, an estimation method of a direction of a reception wave, and a program estimating a direction of a reception wave which estimates the number of incoming waves with a high degree of accuracy in a robust manner when the direction of the incoming wave is estimated by performing an estimate of the incoming wave using an eigen value decomposition, such as the MUSIC Method or the Esprit Method.

However, according to the MUSIC Method, the accuracy of the estimate of the arrival direction changes, as shown below, due to the variable step $\Delta\theta$ of $\theta$ regarding the evaluation function of the arrival angle.

In other words, when the variable step $\Delta\theta$ is increased, the amount of computation decreases for the entire range in which $\theta$ varies. However, the peak direction of the evaluation function of the arrival direction cannot be detected accurately. Thus, the degree of accuracy declines.

Meanwhile, the MUSIC Method has a defect in that, although the peak direction of the evaluation function of the arrival direction can be detected accurately by reducing the variable step AO, the computation amount increases for the entire range in which 0 varies.

The present invention is made considering the problems described above. One of the objects of the present invention is to provide an electronic scanning type milliwave radar device and a program estimating a direction of a reception wave, which can decrease the variable step and reduce the amount of computation for detecting an angle when an eigen expansion such as the Music Method or the Minimum Norm Method are used to detect a direction of an incoming wave.

Means for Solving the Problems (1) The following measures are employed as an embodiment of the present invention: an electronic scanning type radar device according to an aspect of the present invention mounted on a moving body includes: a transmission unit transmitting a transmission wave; a reception unit comprising a plurality of antennas receiving a reflection wave of the transmission wave from a target; a beat signal generation unit generating a beat signal from the transmission wave and the reflection wave; a frequency resolution processing unit frequency resolving the beat signal into a beat frequency of a predetermined resolution number and computing a complex number data; a target detection unit detecting a peak value from an intensity value of the beat frequency and detecting an existence of the target; a correlation matrix computation unit computing a correlation matrix from each of a complex number data of a detected beat frequency for which the target was detected for each of the antennas; a target consolidation processing unit linking the target in a present detection cycle and a past detection cycle based on a distance and a relative velocity; a correlation matrix filtering unit generating an averaged correlation matrix by weighted averaging a correlation matrix of a target in the present detection cycle and a correlation matrix of a related target in the past detection cycle; and a direction detection unit computing an arrival direction of the reflection wave based on the averaged correlation matrix.

(2) The above electronic scanning type radar device may be configured as follows: when the target consolidation processing unit links the target in the present detection cycle and the past detection cycle, whether the target is related is detected according to whether or not a distance and a relative velocity obtained by the detected beat frequency of the present detection cycle is respectively included in a predetermined distance range and a relative velocity range estimated by a distance and a relative velocity obtained by the past detection cycle.

(3) The above electronic scanning type radar device may be configured as follows: the electronic scanning type radar device further includes a memory unit storing a distance, a relative velocity, and a correlation matrix each corresponding to one or more past cycles of the related target, wherein the target consolidation processing unit generates an averaged correlation matrix by weighted-averaging a correlation matrix of a target in the present detection cycle and a target in the past detection cycle of a plurality of temporal sequences relating to the target in the present detection cycle, makes a correspondence between a distance, a relative velocity, and a correlation matrix of the target in the present detection cycle and a distance, a relative velocity, and a correlation matrix of a related past target, and stores into the memory unit.

(4) The above electronic scanning type radar device may be configured as follows: the electronic scanning type radar device further includes a memory unit correspondingly storing a complex number data of a detected beat frequency corresponding to the related target for one or more cycles, wherein when a target of a past detection cycle related to a target of a present detection cycle is detected, the correlation matrix computation unit computes the correlation matrix from the complex umber data of the past detection cycle; and the target consolidation processing unit generates an averaged correlation matrix weighted-averaging a correlation matrix of a target in the present detection cycle and a past target related to the present target, and correspondingly stores a distance, a relative velocity, and a complex number data of a detection beat frequency of the related present target in correspondence with a distance, a relative velocity, and a complex number data of the related past detection cycle.

(5) The above electronic scanning type radar device may be configured as follows: the electronic scanning type radar device further comprising a digital beam forming unit performing a digital beam forming in a direction of a channel based on the complex number data of each antenna and detecting an existence and a direction of the target, wherein a direction of the target is detected by the digital beam forming from a beat frequency in a present detection cycle, and a correlation between a target of a present and a past detection cycle is made based on a distance, a relative velocity, and a direction.

(6) The above electronic scanning type radar device may be configured as follows: the electronic scanning type radar device further includes a digital beam forming unit performing a digital beam forming in a direction of a channel based on the complex number data of each antenna and detecting an existence and a direction of the target, wherein a direction of the target is detected by the digital beam forming from a beat frequency in a present detection cycle, and a correlation between a target of a present and a past detection cycle is made based on a distance, a relative velocity, and a direction.

(7) The above electronic scanning type radar device may be configured as follows: the electronic scanning type radar device further includes a channel deleting unit wherein, when the digital beam forming unit computes a spatial complex number data showing an intensity of a spectrum for each angular channel by performing a digital beam forming using the complex number data, and an intensity of a spectrum of an adjacent angular channel exceeds a predetermined digital beam forming threshold value in a predetermined range of a number of angular channels, the channel deleting unit detects that a digital beam forming detection target exists in the angular channel, and wherein, the channel deleting unit replaces a spectrum intensity of an angular channel for which an existence of the digital beam forming detection target is not detected to "0," and outputs as a new spatial complex number data; and an inverse digital beam forming unit generating a restored complex number data by performing an inverse digital beam forming on the new spatial complex number data, wherein the correlation matrix computation unit computes a correlation matrix from the restored complex number data.

(8) The above electronic scanning type radar device may be configured as follows: the electronic scanning type radar device further includes a channel deleting unit wherein, when the digital beam forming unit computes a spatial complex number data showing an intensity of a spectrum for each angular channel by performing a digital beam forming using the complex number data, and an intensity of a spectrum of an adjacent angular channel exceeds a predetermined digital beam forming threshold value in a predetermined range of a number of angular channels, the channel deleting unit detects that a digital beam forming detection target exists in the angular channel, and wherein, the channel deleting unit replaces a spectrum intensity of an angular channel for which an existence of the digital beam forming detection target is not detected to "0," and outputs as a new spatial complex number data; and an inverse digital beam forming unit generating a restored complex number data by performing an inverse digital beam forming on the new spatial complex number data, wherein the correlation matrix computation unit computes a correlation matrix from the restored complex number data.

(9) The above electronic scanning type radar device may be configured as follows: when the channel deleting unit detects a plurality of digital beam forming detection targets, a spectrum is divided for each angular channel range corresponding to each digital beam forming detection target, thereby generating a spatial complex number data for each digital beam forming detection target, the inverse digital beam forming unit generates a restored complex number data for each digital beam forming detection target by respectively performing an inverse digital beam forming on a spatial complex number data for each of the digital beam forming detection target, and the correlation matrix computation unit computes a correlation matrix for each digital beam forming detection target from a restored complex number data of each of the digital beam forming detection targets.

(10) The above electronic scanning type radar device may be configured as follows: when the channel deleting unit detects a plurality of digital beam forming detection targets, a spectrum is divided for each angular channel range corresponding to each digital beam forming detection target, thereby generating a spatial complex number data for each digital beam forming detection target, the inverse digital beam forming unit generates a restored complex number data for each digital beam forming detection target by respectively performing an inverse digital beam forming on a spatial complex number data for each of the digital beam forming detection target, and the correlation matrix computation unit computes a correlation matrix for each digital beam forming detection target from a restored complex number data of each of the digital beam forming detection targets.

(11) The above electronic scanning type radar device may be configured as follows: the correlation matrix filtering unit varies a weighted coefficient, used during a weighted-averaging, with respect to each of the targets corresponding to the relative velocity.

(12) The above electronic scanning type radar device may be configured as follows: when a change in a position of the target in a lateral direction obtained from a direction and a distance in a past and a present exceeds a predetermined range, the correlation matrix filtering unit varies a weighting coefficient, used during a weighted-averaging, with respect to each of the target.

(13) The above electronic scanning type radar device may be configured as follows: a number of past cycles used when the target consolidation processing unit computes an average is varied corresponding to the relative velocity.

(14) A reception wave direction estimation method according to an aspect of the present invention by an electronic scanning type radar device mounted on a moving body includes: a transmission process transmitting a transmission wave from a transmission unit; a reception process in which a reception unit comprising a plurality of antennas receives a reflection wave of the transmission wave from a target; a beat signal generation process in which a beat signal generation unit generates a beat signal from the transmission wave and the reflection wave; a frequency resolution processing step in which a frequency resolution processing unit frequency resolves the beat signal into a beat frequency of a predetermined resolution number and computes a complex number data; a target detecting process in which a target detection unit detects a peak value from an intensity value of the beat frequency and detects an existence of the target; a correlation matrix computing process in which a correlation matrix computation unit computes a correlation matrix from each of a complex number data of a detected beat frequency for which the target was detected for each of the antennas; a target consolidation processing step in which a target consolidation processing unit links the target in a present detection cycle and a past detection cycle based on a distance and a relative velocity; a correlation matrix filtering process in which a correlation matrix filtering unit generates an averaged correlation matrix by weighted averaging a correlation matrix of a target in the present detection cycle and a correlation matrix of a related target in the past detection cycle; and a direction detection process in which a direction detection unit computes an arrival direction of a reception wave based on the averaged correlation matrix.

(15) A reception wave direction estimation program according to an aspect of the present invention is a program for an electronic scanning type radar device mounted on a moving body to make a computer control an operation of a reception wave direction estimation. The reception wave direction estimation program according to an aspect of the present invention includes: a transmission process transmitting a transmission wave from a transmission unit; a reception process in which a reception unit makes a plurality of antennas receive a reflection wave of the transmission wave from a target; a beat signal generation process in which a beat signal generation unit generates a beat signal from the transmission wave and the reflection wave; a frequency resolution processing step in which a frequency resolution processing unit frequency resolves the beat signal into a beat frequency of a predetermined resolution number and computes a complex number data; a target detecting process in which a target detection unit detects a peak value from an intensity value of the beat frequency and detects an existence of the target; a correlation matrix computing process in which a correlation matrix computation unit computes a correlation matrix from each of a complex number data of a detected beat frequency for which the target was detected for each of the antennas; a target consolidation processing step in which a target consolidation processing unit links the target in a present detection cycle and a past detection cycle based on a distance and a relative value; a correlation matrix filtering process in which a correlation matrix filtering unit generates an averaged correlation matrix by weighted averaging a correlation matrix of a target in the present detection cycle and a correlation matrix of a related target in the past detection cycle; and a direction detection process in which a direction detection unit computes an arrival direction of a reception wave based on the averaged correlation matrix.

(16) An electronic scanning type radar device according to an aspect of the present invention mounted on a moving body includes: a transmission unit transmitting a transmission wave; a reception unit comprising a plurality of antennas receiving an incoming wave, the incoming wave being a reflection wave of the transmission wave from a target; a beat signal generation unit generating a beat signal comprising a frequency of a difference between the transmission wave and the reflection wave; a frequency resolution processing unit frequency resolving the beat signal into a beat frequency of a predetermined resolution number in chronological order and computing a complex number data; a peak detection unit detecting a peak value from an intensity value of each of the beat frequency and detecting an existence of a target; a correlation matrix computation unit computing a correlation matrix from each of a complex number data of a detected beat frequency for which the target was detected for each of the antennas; an eigen value computation unit computing an eigen value from a correlation matrix; a comparison unit comparing an eigen value obtained by normalizing, and a predetermined threshold value; a determination unit determining a number of an eigen value of a numeric value, among an eigen value corresponding to a beat frequency for which a target was detected, the numeric value exceeding the threshold value, as a number of the incoming waves.

(17) The above electronic scanning type radar device may be configured as follows: the eigen value computation unit, concerning an eigen value having a maximum value among the computed eigen value, normalizes all eigen values by performing a division, and wherein the comparison unit compares the normalized eigen value and the predetermined threshold value.

(18) The above electronic scanning type radar device may be configured as follows: the eigen value computation unit, by a maximum value element of the correlation matrix, divides all of the element of the correlation matrix, and computes an eigen value based on a correlation matrix whose element is normalized, and wherein the comparison unit compares the eigen value with the predetermined threshold value.

(19) The above electronic scanning type radar device may be configured as follows: the determination unit compares a predetermined maximum eigen value threshold value and a maximum eigen value among an obtained eigen value, and, when the maximum eigen value exceeds the predetermined maximum eigen value threshold value, the determination unit finds that the eigen value is of an effective reception level, and performs an estimation of a number of an incoming wave.

(20) The above electronic scanning type radar device may be configured as follows: the eigen value computation unit divides all element of the correlation matrix with an element having a maximum value among a diagonal element of the correlation matrix, computes an eigen value based on a correlation matrix whose elements are normalized, and wherein the comparison unit compares the eigen value and the predetermined threshold value.

(21) The above electronic scanning type radar device may be configured as follows: the electronic scanning type radar device further includes a peak value comparison unit comparing the peak value with a predetermined effective reception level, wherein when the peak value exceeds the predetermined effective reception level, the determination unit finds that an eigen value is of an effective determination level, and estimates a number of a incoming wave.

(22) The above electronic scanning type radar device may be configured as follows: the determination unit compares a predetermined maximum correlation matrix diagonal element threshold value and a maximum value of a diagonal element of the correlation matrix which was obtained, and when the maximum value of the diagonal element exceeds the maximum correlation matrix diagonal element threshold, the determination unit finds that an eigen value is of an effective reception level, and estimates a number of an incoming wave.

(23) The above electronic scanning type radar device may be configured as follows: the peak detection unit comprises a digital beam forming unit which performs a digital beam forming in a direction of a channel based on the complex number data for each of the antennas, and detects an existence of the target.

(24) The above electronic scanning type radar device may be configured as follows: the electronic scanning type radar device further includes a channel deleting unit wherein, when the digital beam forming unit computes a spatial complex number data showing an intensity of a spectrum for each angular channel by performing a digital beam forming using the complex number data, and an intensity of a spectrum of an adjacent angular channel exceeds a predetermined digital beam forming threshold value in a predetermined range of a number of angular channels, the channel deleting unit detects an existence of a target, and wherein, the channel deleting unit replaces a spectrum intensity of an angular channel for which the existence of the target is not detected to "0," and outputs a new spatial complex number data; and an inverse digital beam forming unit generating a restored complex number data by performing an inverse digital beam forming on the new spatial complex number data, wherein the correlation matrix computation unit computes a correlation matrix from the restored complex number data.

(25) The above electronic scanning type radar device may be configured as follows: the peak detection unit converts an added value of a complex number data of all of the antennas to a frequency spectrum, and detects a target based on a peak value of the frequency spectrum.

(26) A reception wave direction estimation method by an electronic scanning type radar device according to an aspect of the present invention mounted on a moving body includes: a transmission process transmitting a transmission wave from a transmission unit; a reception process in which a reception unit comprising a plurality of antennas receives a reflection wave of the transmission wave from a target; a beat signal generation process in which a beat signal generation unit generates a beat signal comprising a frequency of a difference between the transmission wave and the reflection wave; a frequency resolution processing step in which a frequency resolution processing unit frequency resolves the beat signal into a beat frequency of a predetermined resolution number and computes a complex number data in chronological order; a peak detection process in which a peak detection unit detects a peak value from an intensity value of each of the beat frequency and detecting an existence of the target; a correlation matrix computing process in which a correlation matrix computation unit computes a correlation matrix from each of a complex number data of a detected beat frequency for which the target was detected for each of the antennas; an eigen value computation process in which an eigen value computation unit computes an eigen value from a correlation matrix; a comparison process in which a comparison unit compares an eigen value obtained by normalizing, and a predetermined threshold value; and a determination process in which the determination unit determines a number of an eigen value of a numeric value, among an eigen value corresponding to a beat frequency for which a target was detected, the numeric value exceeding the threshold value, as a number of the incoming waves.

(27) A reception wave direction estimation program according to an aspect of the present invention is a program for an electronic scanning type radar device mounted on a moving body to make a computer control an operation of a reception wave direction estimation. The reception wave direction estimation program according to an aspect of the present invention includes a transmission process transmitting a transmission wave from a transmission unit; a reception process in which a reception unit comprising a plurality of antennas receives an incoming wave, the incoming wave being a reflection wave of the transmission wave from a target; a beat signal generation process in which a beat signal generation unit generates a beat signal comprising a frequency of a difference of the transmission wave and the reflection wave; a frequency resolution processing step in which a frequency resolution processing unit frequency resolves the beat signal into a beat frequency of a predetermined resolution number and computes a complex number data in chronological order; a peak detection process in which a peak detection unit detects a peak value from an intensity value of each of the beat frequency and detects an existence of the target; a correlation matrix computing process in which a correlation matrix computation unit computes a correlation matrix from each of a complex number data of a detected beat frequency for which the target was detected for each of the antennas; an eigen value computation process in which an eigen value computation unit computes an eigen value from a correlation matrix; a comparison process in which a comparison unit compares an eigen value obtained by normalizing, and a predetermined threshold value; and a determination process in which the determination unit determines a number of an eigen value of a numeric value, among an eigen value corresponding to a beat frequency for which a target was detected, the numeric value exceeding the threshold value, as a number of the incoming waves.

(28) An electronic scanning type radar device according to an aspect of the present invention mounted on a moving body includes: a transmission unit transmitting a transmission wave; a reception unit comprising a plurality of antennas receiving an incoming wave, the incoming wave being a reflection wave of the transmission wave from a target; a beat signal generation unit generating a beat signal comprising a frequency of a difference between the transmission wave and the reflection wave; a frequency resolution processing unit frequency resolving the beat signal into a beat frequency of a predetermined resolution number and computing a complex number data in chronological order; an angular range setting unit computing an angular range in which a target exists based on the complex number data; and a direction detection unit computing an angular spectrum in the angular range.

(29) The above electronic scanning type radar device may be configured as follows: the angular range setting unit includes a digital beam forming unit performing a digital beam forming on the complex number data in an alignment direction of an antenna, computing an intensity of a spectrum for each angular channel, detecting an existence of a target, and obtaining information on a direction; and a range detection unit setting, based on a data of a frequency axis for which the target exists and based on directional information, an angular range for which an angular spectrum is computed.

(30) The above electronic scanning type radar device may be configured as follows: the angular range setting unit further includes: a channel deleting unit performing a division into a plurality of groups according to whether a target exists in a direction of an angular channel based on a spectrum intensity for each of an angular channel computed by the digital beam forming processing unit, the channel deleting unit further setting a spectrum intensity of an angular channel for which a target does not exist to "0"; and an inverse digital beam forming processing unit performing an inverse digital beam forming on a spectrum intensity for each of the angular channels and restoring a complex number data for each antenna, and outputting as a restored complex number data, wherein the range detection unit sets an angular range for which an angular spectrum is computed, based on the restored complex number data, information on a direction in which a target exists, and an estimation value of a number of a reception wave.

(31) The above electronic scanning type radar device may be configured as follows: the angular range setting unit further includes a channel deleting unit performing a division into a plurality of groups according to whether a target exists in a direction of an angular channel based on a spectrum intensity for each of an angular channel computed by the digital beam forming processing unit, the channel deleting unit further setting a spectrum intensity of an angular channel for which a target does not exist to "0"; and an inverse digital beam forming processing unit performing an inverse digital beam forming on a spectrum intensity for each of the angular channels and restoring a complex number data for each antenna, and outputting as a restored complex number data, wherein the direction detection unit computes a root corresponding to an angle, based on the restored complex number data and an estimation value of a number of a reception wave.

(32) The above electronic scanning type radar device may be configured as follows: the angular range setting unit further includes a channel deleting unit performing a division into a plurality of groups according to whether a target exists in a direction of an angular channel based on a spectrum intensity for each of an angular channel computed by the digital beam forming processing unit, the channel deleting unit further setting a spectrum intensity of an angular channel for which a target does not exist to "0"; an inverse digital beam forming processing unit performing an inverse digital beam forming on a spectrum intensity for each of the angular channels and restoring a complex number data for each antenna, and outputting as a restored complex number data; and a memory unit storing information on a direction of each of a target in a past direction detection cycle, wherein the range detection unit sets an angular range for which an angular spectrum is computed, based on the restored complex number data, information on a direction of a past direction detection cycle stored in the memory unit, and an estimation value of a number of a reception wave.

(33) The above electronic scanning type radar device may be configured as follows: an estimation value of a number of a reception wave is an eigen value.

(34) The above electronic scanning type radar device may be configured as follows: the angular range setting unit includes: a peak detection unit detecting an existence of a target based on a peak value of an intensity of a frequency axis; a memory unit storing information on a direction of each of a target in a past direction detection cycle; and a range detection unit limiting the angular range based on an information on a direction of a past direction detection cycle stored in the memory unit, and writing in an obtained angular range into the memory unit.

(35) A reception wave direction estimation method by an electronic scanning type radar device according to an aspect of the present invention mounted on a moving body includes: a transmission process transmitting a transmission wave from a transmission unit; a reception process in which a reception unit comprising a plurality of antennas receiving an incoming wave, the incoming wave being a reflection wave of the transmission wave from a target; a beat signal generation process in which a beat signal generation unit generates a beat signal comprising a frequency of a difference between the transmission wave and the reflection wave; a frequency resolution processing step in which a frequency resolution processing unit frequency resolves the beat signal into a beat frequency of a predetermined resolution number and computes a complex number data in chronological order; an angular range setting process in which an angular range setting unit computes an angular range in which a target exists based on the complex number data; and a direction detection process in which a direction detection unit computes an angular spectrum in the angular range.

(36) A reception wave direction estimation program according to an aspect of the present invention is a program for an electronic scanning type radar device mounted on a moving body to make a computer control an operation of a reception wave direction estimation. The reception wave direction estimation program according to an aspect of the present invention includes a transmission process transmitting a transmission wave from a transmission unit; a reception process in which a reception unit makes a plurality of antennas receive an incoming wave, the incoming wave being a reflection wave of the transmission wave from a target; a beat signal generation process in which a beat signal generation unit generates a beat signal comprising a frequency of a difference between the transmission wave and the reflection wave; a frequency resolution processing step in which a frequency resolution processing unit frequency resolves the beat signal into a beat frequency of a predetermined resolution number and computes a complex number data in chronological order; an angular range setting process in which an angular range setting unit computes an angular range in which a target exists based on the complex number data; and a direction detection process in which a direction detection unit computes an angular spectrum in the angular range.

Effects of the Invention

According to the embodiment described in (1) above, the target consolidation processing unit relates the same target in the present and in the past to one another. Then, the target consolidation processing unit performs an averaging process of the correlation matrix. Therefore, regardless of the fluctuation of the distance to the target, the eigen value computation in the subsequent direction detection process and the spectrum computation (such as MUSIC) can be performed accurately. Thus, compared to the instance in which the computation is performed using the correlation matrix of only the present time, it is possible to enhance the recognition performance of the final distance and direction of the target.

In addition, according to the embodiment described in (1) above, a plurality of correlation matrices or complex number data are stored for each target. Since all of these are used to perform the averaging process, the recognition performance of the final distance and direction of the target can be further enhanced regardless of the fluctuation in the distance to the target.

In addition, according to the embodiment described in (13) above, the number of detection cycles of the correlation matrix used to average the correlation matrix are altered optionally for each target based on the relative velocity with respect to the target. Thus, when the distance to the target is fluctuating, the number of detection cycles is reduced. Meanwhile, when the distance to the target is stable, the number of detection cycles is increased. As a result, the correlation matrix filtering unit can have an appropriate filtering characteristic based on the condition of the relative velocity with respect to each target. Consequently, the recognition performance of the final distance and direction of the target can be further enhanced regardless of the fluctuation in the distance to the target.

In addition, according to the embodiment described in (11) above, the averaging weight coefficient used to average the correlation matrix can be varied for each target based on the relative velocity with respect to the target. As a result, the correlation matrix filtering unit can have an appropriate filtering characteristic based on the condition of the relative velocity with respect to each target. Consequently, the recognition performance of the final distance and direction of the target can be further enhanced.

In addition, according to the embodiment described in (11) above, when the amount of change of the lateral position, obtained by the direction and the distance in the past and in the present, exceeds a predetermined range, the weight coefficient used to compute a weighted average is altered according to each target. In other words, the correlation matrix filtering unit can have an appropriate filtering characteristic such that the number of past cycles to be averaged is reduced, or, the weighting coefficients are made variable and the number of linkage is thus substantively reduced. Consequently, the recognition performance of the final distance and direction of the target can be further enhanced.

In addition, according to the embodiment described in (3) above, the complex number data of the target frequency is stored. As a result, the past data stored in the memory equals, for each target, the number of channels of the plurality of original antennas×2 (the complex number data of the real part and the imaginary part). Therefore, compared to the case in which the storing is made simply by the correlation matrix, the memory size can be reduced.

In addition, according to the embodiment described in (5) above, a DBF unit is provided, which detects a direction by DBF from the beat frequency which has undergone a frequency resolution. Thus, linkage is made not only for the prediction range from the distance and the relative velocity, but also for the range of the direction. Therefore, the past and present correlation matrices can be linked with more accuracy.

In addition, according to the embodiment described in (7) above, the spectrum is divided for each angle channel range corresponding to the DBF detection target. At the same time, each special complex number data is generated. The IDBF unit computes a correlation matrix for each DBF detection target from a regenerated complex number data which is obtained by performing a reverse DBF on the respective space complex number data for each of the DBF detection target. As a result, the correlation matrix, used when performing an eigen value calculation, includes only the element of the incoming reception wave for each DBF detection target. Thus even if the number of incoming reception waves is greater than or equal to the number of reception antennas and subarrays, the recognition performance of the direction and the distance can be reduced and be made more accurate without making an error in the eigen value calculation for each DBF detection target.

In addition, according to the embodiment described in (16) above, the number of eigen values which exceed a predetermined threshold value is output as the number of incoming waves, in regards to the eigen value obtained by normalization. Thus, regardless of the beat frequency (i.e., the distance to the target) for which a target exists, a threshold value can be set for the eigen value of all beat frequency which underwent a Fourier transform, without setting a threshold for each beat frequency as was done conventionally. Hence, the number of eigen values that exceeded the threshold value can be an estimate of the number of incoming waves. In this way, it is not necessary to set a threshold value for each beat frequency, as was done conventionally, in order to make a comparison with the eigen value. Therefore, the memory size can be reduced. Moreover, since the computation is a simple one comparing the eigen value with the threshold value, it is possible to reduce the processing time of computing the number of incoming waves.

In addition, according to the embodiment described in (16) above, a determination is made comparing the eigen value, computed by normalization, and the threshold value. Thus, the robustness can be enhanced in response to the fluctuation of the overall eigen values due to the RCS of the target, clutter, and noise.

In addition, according to the embodiment described in (16) above, the existence of the target is detected from the peak value of the spectrum (the peak value of the added value of the spectrum for each reception antenna or the DBF) at the frequency point (the beat frequency value) for the frequency axis after the frequency conversion. Thus, the process after the formation of the correlation matrix is not executed with respect to the beat frequency value with a low peak value. Therefore, even if the eigen value exceeds the threshold value, an erroneous estimation of the incoming wave is prevented when the incoming wave from a target is weak due to a multi-pass from the road surface.

In addition, according to the embodiment described in (24) above, a DBF is performed on the beat frequency value for which a target exists. When the spectrum is lower than the predetermined value, an IDBF (an inverse DBF) is performed by setting the spectrum corresponding to the angle channel to "0." Further, when the correlation matrix is computed using the regenerated complex number data in the direction of the reception antenna, an eigen value within only the range divided for each target in the DBF is obtained, which is equivalent to receiving only the divided, incoming wave. Thus, even if the number of incoming waves is greater than the number of reception antennas, an erroneous estimation is not made in the eigen value calculation.

In addition, according to the embodiment described in (19) above, the determining unit performs an estimation process of the number of incoming waves only when the value of the maximum eigen value among the obtained eigen values exceeds the predetermined maximum eigen value threshold. Thus, even in an embodiment configured so that the even value is computed from the correlation matrix in the overall frequency point or in a range of the specific frequency point, without using the detection result of the target, obtained from the peak value of the spectrum based on the frequency point after the frequency resolution, an erroneous estimation is not made when the incoming wave from the target is weak due to a multi-pass from the road surface.

In addition, according to the embodiment described in (20) above, normalization is made by dividing all elements by the maximum value of the elements of the correlation matrix. Further, the eigen value is computed based on the normalized correlation matrix. As a result, the accuracy of the floating-point calculation, which is executed when the eigen value is computed, can be enhanced. In addition, it is possible to reduce the number of computations necessary for the conversion of the arithmetic algorithm (such as the Jacobi Method and the QR Method) of the eigen value and the eigen vector. In this way, it is possible to speed up the computation of the eigen value and the eigen vector.

In addition, according to the embodiment described in (28) above, the direction can be detected in a generalized manner by using the angle range outputted by the angle range setting unit. Thus, when the angle spectrum is computed by the direction detection unit, the angle spectrum of the above specific angle range corresponding to the detected direction of the target is computed with priority. Therefore, it is possible to reduce the variable step $\Delta\theta$. It is also possible to make the resolution performance of the computation more minute. Thus, the arrival direction of the incoming wave can be computed with more accuracy. As a result, according to an embodiment of the present invention, in the spectrum computation operation, which has a heavy processing load next to eigen value calculations, the range of the angle which is computed is limited and narrowed, thus reducing the load, and thereby enhancing the resolution performance of the calculation.

In addition, according to the embodiment described in (32) above, by referring to the direction of the target in the past cycle recorded in the memory, the direction of the target in the past cycle can be checked. Thus, when the direction detection unit, for example, computes the angle spectrum, the angle spectrum can be computed with priority in the specific angle range corresponding to the direction of the past cycle. Therefore, it is possible to reduce the variable step $\Delta\theta$ and make the resolution performance of the computation more minute. In this way, the direction of the arrival direction of the incoming wave can be computed with more accuracy.

In addition, according to the embodiment described in (30) above, a DBF of the beat frequency for which a target exists is performed, an unnecessary angle channel is deleted (making the spectrum intensity "0"), an IDBF is performed after the deletion, a correlation matrix is generated in the direction of the reception channel by the regenerated complex data, and the eigen value computation is executed. As a result, this is equivalent to receiving only the divided incoming wave. Thus, even if the number of received incoming waves is large compared to the number of reception antennas, it is possible to compute the arrival direction of the incoming wave without making an error in the eigen value computation.

In addition, according to the embodiment described in (31) above, the entire detectable range of angles is divided into a plurality of angle ranges. Thus, it is possible to estimate the maximum value of the actually used number of arrival waves (the number of targets) if within the divided narrow angle range. Therefore, a spectrum estimation can be conducted according to the predetermined fixed number of arrival waves.

In addition, according to the embodiment described in (30) above, when a plurality of target clusters exist, and when each of the target cluster is positioned in different directions, a plurality of angle ranges are set corresponding to a plurality of

BRIEF DESCRIPTION OF THE DRAWINGS

FIG. 3 is a conceptual diagram describing a reception wave by a reception antenna.

FIG. 4 is a graph showing a beat frequency (horizontal axis) and its peak value (vertical axis) which is a result of a frequency resolution of a beat signal.

FIG. 5 is a table showing a matrix of a beat frequency in an ascending region and a descending region at a combination unit 24, an intersection of the matrix, i.e., a distance and a relative velocity according to a combination of a beat frequency in an ascending region and a descending region.

FIG. 6 is a table showing a distance and a relative velocity for each target in a present detection cycle.

FIG. 19 is a conceptual diagram used when a correlation is made between a present detection cycle and a past detection cycle, and shows a configuration of a table in which a correlation matrix is entered corresponding to a distance, a longitudinal position, a lateral position, and a relative velocity of the past detection cycle.

FIG. 20 is a table showing a correspondence between each angle of each target in a present detection cycle and frequency point.

FIG. 21 is a block diagram showing an example of a configuration of an electronic scanning type radar device according to a third embodiment of the present invention.

FIG. 38A is a graph showing a distance when a number of incoming wave is 1, and also showing a correspondence between an eigen value and each distance.

FIG. 38B is a graph showing a distance when a number of incoming wave is 1, also showing a correspondence between an eigen value and each distance.

FIG. 38C is a table showing an eigen value when a number of incoming wave is 1 at distance 100 (m), also showing a difference in values between an eigen value λ1 in a signal space and an eigen value in an otherwise noise space.

FIG. 48 is a graph showing a beat frequency (horizontal axis) and its peak value (vertical axis) which is a result of a frequency resolution of a beat signal.

FIG. 59A is a graph showing a distance when a number of incoming wave is 1, and also showing a correspondence between an eigen value and each distance.

FIG. 59B is a graph showing a distance when a number of incoming wave is 1, and also showing a correspondence between an eigen value and each distance.

FIG. 59C is a table showing an eigen value λx when a number of incoming wave is 1 at distance 100 (m), also showing a difference in values between an eigen value λ1 in a signal space and an eigen value in an otherwise noise space.

DESCRIPTION OF THE REFERENCE SYMBOLS

11~1$n$ ... Reception antenna, 61~6$n$ ... Mixer (Beat signal generation unit), 3 ... Transmission antenna, 4 ...

Distributor, 51~5n ... Filter, 6 ... SW, 7 ... ADC, 8 ... Control unit, 9 ... Triangular wave generation unit, 10 ... VCO, 20 ... Signal processing unit, 21 ... Memory (Memory unit), 22 ... Frequency resolution processing unit, 23 ... Peak detection unit, 24 ... Peak combination unit, 25 ... Distance detection unit, 26 ... Velocity detection unit, 27, 27B ... Pair confirmation unit, 28 ... Correlation matrix computation unit, 29 ... Correlation matrix filtering unit, 30 ... Direction detection unit, 31, 31B ... Target confirmation unit, 32, 32B ... Target consolidation processing unit, 40 ... DBF processing unit, 41 ... Ch Deleting Unit, 42, 43 ... IDBF processing unit, 111~11n ... Reception antenna, 161~16n Mixer (Beat signal generation unit), 103 ... Transmission antenna, 104 ... Distributor, 151~15n ... Filter, 106 ... SW, 107 ... ADC, 108 ... Control unit, 109 ... Triangular wave generation unit, 110 ... VCO, 120 ... Signal processing unit, 121 ... Memory (Memory unit), 122 ... Frequency resolution processing unit, 123 ... Peak detection unit, 124 ... Peak combination unit, 125 ... Distance detection unit, 126 ... Velocity detection unit, 127, 127B ... Pair confirmation unit, 128 ... Correlation matrix computation unit, 130 ... Direction detection unit, 131 ... Eigen value computation unit, 132 ... Determination unit, 133 ... DBF processing unit, 134 ... Ch Deleting Unit, 135 ... IDBF processing unit, 211~21n ... Reception antenna, 261~26n ... Mixer (Beat signal generation unit), 203 ... Transmission antenna, 204 ... Distributor, 251~25n ... Filter, 206 ... SW, 207 ... ADC, 208 ... Control unit, 209 ... Triangular wave generation unit, 210 ... VCO, 220 ... Signal processing unit, 221 ... Memory (Memory unit), 222 ... Frequency resolution processing unit, 223 ... Peak detection unit, 224 ... Peak combination unit, 225 ... Distance detection unit, 226 ... Velocity detection unit, 227, 227B ... Pair confirmation unit, 228 ... Correlation matrix computation unit, 230 ... Direction detection unit, 231 ... Eigen value computation unit, 232 ... Determination unit, 233 ... DBF processing unit, 234 ... Ch Deleting Unit, 235 ... IDBF processing unit, 236 ... Range detection unit, 250 ... Angle range setting unit, 301 ... Moving body, 302 ... Electronic Scanning Type Radar Device, 303 ... Transmission wave, 304 ... Target, 305 ... Reflection wave, 306 ... Computer

BEST MODE FOR CARRYING OUT THE INVENTION

First Embodiment

Figure 1:
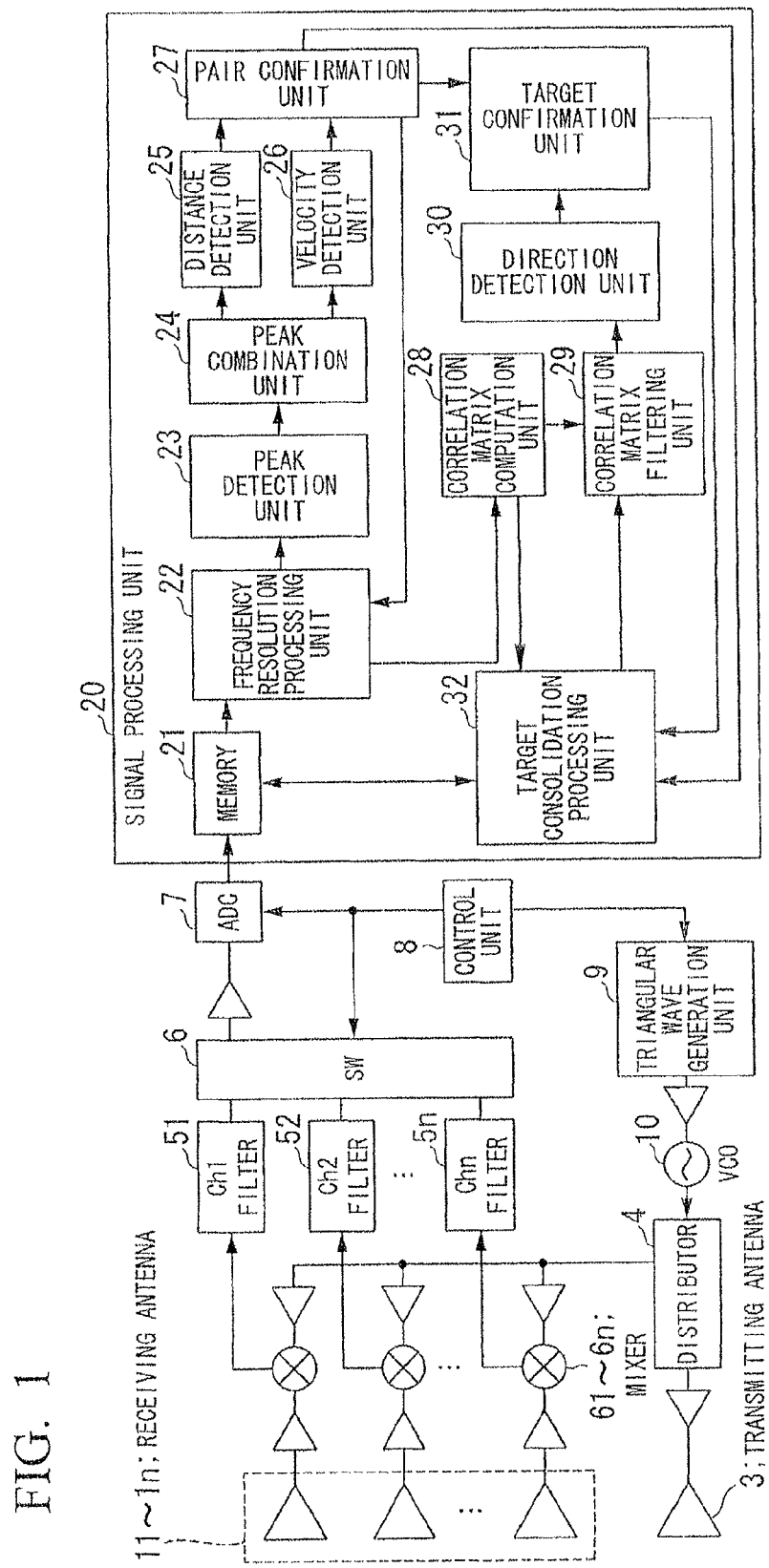
FIG. 1 is a block diagram showing an example of a configuration of an electronic scanning type radar device according to a first embodiment of the present invention.

Hereinafter, a first embodiment of an electronic scanning type radar device (FMCW type miliwave radar) according to the present invention is described with reference to the diagrams. FIG. 1 is a block diagram showing an example of a configuration of the first embodiment.

In this diagram, the electronic scanning type radar device according to the first embodiment includes a reception antenna 11~1n, a mixer (beat signal generation unit) 61~6n, a transmission antenna 3, a distributor 4, a filter 51~5n, a SW (switch) 6, an ADC (A/D converter) 7, a control unit 8, a triangular wave generation unit 9, a VCO 10, and a signal processing unit 20.

The signal processing unit 20 includes a memory (memory unit) 21, a frequency resolution processing unit 22, a peak detection unit 23, a peak combination unit 24, a distance detection unit 25, a velocity detection unit 26, a pair confirmation unit 27, a correlation matrix computation unit 28, a correlation matrix filtering unit 29, a direction detection unit 30, a target confirmation unit 31, and a target consolidation processing unit 32.

Next, an operation of the electronic scanning type radar device according to the first embodiment is described with reference to FIG. 1.

The reception antenna 11~1n receives a reflection wave, i.e., a reception wave, which comes from a target at which a transmission wave reflects.

Each of the mixers 61~6n mixes a transmission wave, transmitted by the transmission antenna 3, and a signal obtained by an amplifier amplifying a reception wave received by each of the reception antennas 11~1n. Thus, each of the mixers 61~6n generates a beat signal corresponding to each difference in frequency.

The transmission antenna 3 transmits to a target, a transmission wave, which is a transmission signal obtained by the VCO (Voltage Controlled Oscillator) 10 frequency-modulating a triangular wave signal generated by the triangular wave generation unit 9.

The distributor 4 distributes a frequency-modulated transmission signal from the VCO 10 to the mixers 61~6n and to the transmission antenna 3.

Each of the filters 51~5n executes a band limitation on beat signals Ch1~Chn, each of which were generated respectively by the mixers 61~6n, corresponding to each reception antenna 11~1n. In this way, each of the filters 51~5n outputs the band-limited beat signal to the SW (switch) 6.

The SW 6 outputs to the ADC (A/D converter) 7, a beat signal of Ch1~Chn corresponding to each reception antennas 11~1n which traveled through each of the filters 51~5n corresponding to a sampling signal entered by the control unit 8, switching in succession.

The ADC 7 converts the beat signals of Ch1~Chn, corresponding to each of the reception antennas 11~1n and entered by the SW 6 in synchrony with the sampling signal, to a digital signal by performing an A/D conversion in synchrony with the sampling signal. The ADC 7 also stores the digital signal in series into a wave form memory region of the memory 21 of the signal processing unit 20.

The control unit 8 includes a micro computer and the like. The control unit 8 controls the overall electronic scanning type radar device shown in FIG. 1 based on a control program stored in a ROM, not diagramed, and the like.

<Principle of Detecting the Distance, Relative Velocity, and Angle (Direction)>

Figure 2A:
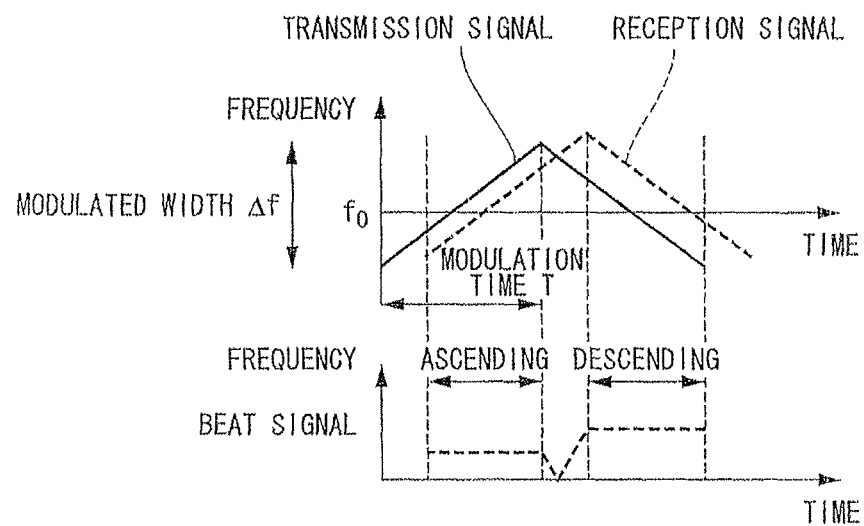
FIG. 2A is a conceptual diagram describing a generation of a beat signal in an ascending region and a descending region of a triangular wave by a transmission wave and a reception wave.
Figure 2B:
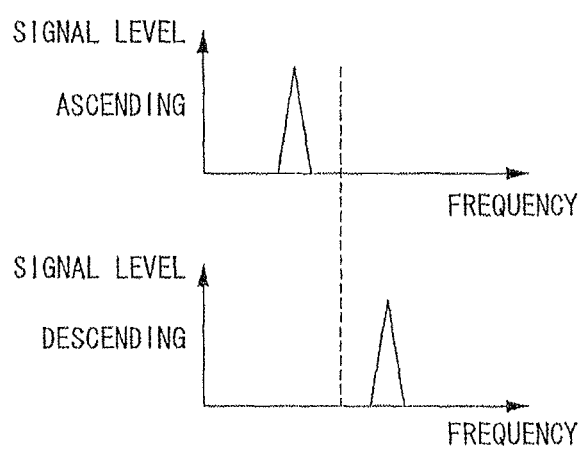
FIG. 2B is a conceptual diagram describing a generation of a beat signal in an ascending region and a descending region of a triangular wave by a transmission wave and a reception wave.

Next, the principle of detecting a distance between the electronic scanning type radar device and a target, a relative velocity, and an angle (direction) is briefly described using FIGS. 2A and 2B. This principle is utilized by the signal processing unit 20 in the first embodiment.

FIGS. 2A and 2B show a transmission signal, which was obtained by the VCO 10 frequency-modulating a signal generated by the triangular wave generation unit 9 shown in FIG. 1, and a condition in which the transmission signal is reflected from the target and is entered as a reception signal. The example in FIGS. 2A and 2B shows an instance in which there is one target.

As FIG. 2A indicates, a reception signal, which is a reflection wave from a target, is received, with respect to the transmitted signal, with a lag in the right direction (direction of time lag) in proportion to the distance from the target. In addition, the reception signal fluctuates in the longitudinal direction (frequency direction) with respect to the transmission signal in proportion to the relative velocity with respect to the target. Furthermore, after the frequency modulation (such as a Fourier transform, DTC, Hadamard transform, and wavelet transformation) of the beat signal obtained in FIG. 2A, the signal has a peak value in each of the ascending region and the descending region, as shown in FIG. 2B, when there is one target. Here, the horizontal axis of FIG. 2B represents the frequency, and the vertical axis represents the intensity.

The frequency resolution processing unit 22 performs a frequency resolution on each of the ascending portion (ascending) and the descending portion (descending) of the triangular wave from the sampled data of the beat signal stored in the memory 21. For example, the frequency resolution processing unit 22 performs a frequency modulation into a discrete time by, for example, a Fourier transform.

As a result, in the ascending portion and the descending portion, a graph of the signal level for each beat frequency, which was frequency-resolved in each of the ascending portion and in the descending portion, is obtained, as shown in FIG. 2B.

Then, the peak detection unit 23 detects the peak value from a signal level for each beat frequency shown in FIG. 2B, and detects the existence of a target. At the same time, the peak detection unit 23 outputs the beat frequency (both the ascending portion and the descending portion) of the peak value as a target frequency.

Next, the distance detection unit 25 computes the distance from Equation (1) shown below from the target frequency fu of the ascending portion and a target frequency fd of the descending portion inputted from the peak combination unit 24.

(Equation 1)

$$r = \{C \cdot T/(2 \cdot \Delta f)\} \cdot (fu+fd)/2) \quad (1)$$

Further, the velocity detection unit 26 computes the relative velocity from Equation (2) shown below from the target frequency fu of the ascending portion and the target frequency fd of the descending portion inputted from the peak combination unit 24.

(Equation 2)

$$v = \{C/(2 \cdot f0)\} \cdot \{(fu-fd)/2\} \quad (2)$$

In the above equations for computing the distance r and the relative velocity v, C: optical velocity
Δf: width of the frequency modulation of the triangular wave
f0: central frequency of the triangular wave
T: modulation time (ascending portion/descending portion)
fu: target frequency in the ascending portion
fd: target frequency in the descending portion Next, the reception antenna 11~1n according to the first embodiment is an array-type antenna which is placed at an interval d, as shown in FIG. 3.

An incoming wave from a target (incident wave, which is a reflection wave from the target with respect to the transmission wave transmitted by the transmission antenna 3) enters the reception antenna 11~1n from a direction at an angle of θ degrees from the axis perpendicular to the surface of the antenna which is lined up.

At this time, the incoming wave is received by the reception antenna 11~1n at the same angle.

A phase difference "$d_{n-1} \cdot \sin\theta$," which is obtained by this same angle such as the angle θ and the interval d between each antenna, occurs between each adjacent antenna.

This phase difference can be used to perform a digital beam forming (DBP), which is an additional Fourier transform, in the antenna direction, of the value which underwent a frequency resolution processing for each antenna in the temporal direction. The phase difference can also be used to detect the angle θ in a signal processing of a super resolution algorithm and the like.

<Signal Processing of a Reception Wave by the Signal Processing Unit 20>

Next, the memory 21 stores a time-series data (the ascending portion and the descending portion), which was obtained by A/D modulating the reception signal by the ADC 7 with respect to the wave form storing region, so that each time-series data corresponds to each antenna 11~1n. For example, when 256 pieces are sampled in each of the ascending portion and the descending portion, 2×256(pieces)×(number of antennas) numbers of data are stored in the wave form storing region.

The frequency resolution processing unit 22 outputs a frequency point indicating a beat frequency, and also outputs a complex number data of the beat frequency. The frequency point is obtained by performing a Fourier transform, for example, and modulating each beat signal corresponding to each of Ch1~Chn (each antenna 11~1n) into a frequency at a predetermined resolution performance. For example, when each of the ascending portion and the descending portion for each antenna has 256 pieces of sampled data, the beat signal is modulated into a beat frequency as a frequency region data of the complex number for each antenna. Thus, the beat signal becomes 128 pieces of complex number data (2×128 pieces× data for the number of antennas) for each of the ascending portion and the descending portion. In addition, the beat frequency is indicated by the frequency point.

Here, the only difference between each of the complex number data for each antenna is the phase difference which depends on the angle θ. The absolute value (such as the reception intensity or the amplitude) of each complex number data on the complex plane is equal.

The peak combination part 24 selects the target frequency and detects the existence of a target for each beat frequency by detecting a beat frequency, which has a peak value exceeding a predetermined value, from a peak of the signal intensity (or the amplitude) using a complex number data with respect to the peak value of each intensity for the ascending region and the descending region of the triangular wave of the beat frequency which was frequency-modulated.

Therefore, the peak detection unit 23 can detect each peak value of the spectrum as a beat frequency, in other words, an existence of a target which depends on the distance, by converting the complex number data for either one of the antennas, or the added value of the complex number data for all of the antennas, into a frequency spectrum. By the addition of the complex number data for all of the antennas, the noise element is averaged, and the S/N ratio increases.

The peak combination unit 24 combines the beat frequency and its peak value, entered by the peak detection unit 23 and shown in FIG. 4, with a beat frequency of each ascending region and the descending region and its peak value, in a matrix fashion in a round-robin matter. In other words, the peak combination unit 24 combines all of the beat frequencies in each of the ascending region and the descending direction. Thus, the peak combination unit 23 outputs, in series, to the distance detection unit 25 and the velocity detection unit 26. Here, the horizontal axis of FIG. 4 indicates the frequency point of the beat frequency, while the vertical axis indicates the level (intensity) of the signal.

The distance detection unit 25 computes the distance r to the target based on a value obtained by adding the beat frequency of the combination for each ascending region and the descending region, which are inputted in series.

Further, the velocity detection unit 26 computes the relative velocity v with respect to the target by the difference in the beat frequency of the combination for each ascending region and the descending region, which are inputted in series.

The pair confirmation unit 27 generates a table shown in FIG. 5 from the inputted distance r, the relative velocity v, the peak value level of descent pu, and the peak value level of ascent pd. Moreover, the pair confirmation unit 27 determines an appropriate combination of the peak of each ascending region and the descending region corresponding to each target. The pair confirmation unit 27 thus confirms the pair of the peak of each ascending region and the descending region as a table shown in FIG. 6. The pair confirmation unit 27 then outputs the number of the target cluster, indicating the confirmed distance r and the relative velocity v, to the target confirmation unit 31. FIG. 6 indicates the distance, relative velocity, and the frequency point (the ascending region or the descending region) corresponding to the target cluster number. The tables shown in FIGS. 5 and 6 are stored in the inner memory unit of the pair confirmation unit 27. Here, the direction is not determined for each target cluster. Therefore, the position in the lateral direction, parallel to the direction in which the reception antenna 11~1$n$ is aligned with respect to an axis perpendicular to the direction in which the antenna arrays of the electronic scanning type radar device are aligned, is not determined.

Here, the pair confirmation unit 27 can, for example, select the combination of the target clusters by prioritizing a value which is estimated in the present detection cycle from the distance r and the relative velocity v with respect to each target which was confirmed as final in the prior detection cycle.

In addition, the correlation matrix computation unit 28 selects the beat frequency, which underwent a frequency resolution by the frequency resolution processing unit 22, according to the frequency point of the beat frequency of the target cluster for which a combination was confirmed by the pair confirmation unit 27. Thus, the correlation matrix computation unit generates a correlation matrix corresponding to the beat frequency of either one of the ascending portion and the descending portion (in the first embodiment, the descending portion) regarding this combination, and outputs to the correlation matrix filtering unit 29 and the target consolidation processing unit 32.

Next, the target consolidation processing unit 32 links the distance r, the relative velocity v, and the frequency point f shown in FIG. 6 and inputted from the pair confirmation unit 27 with the target of the past detection cycle stored in the memory 21, Then, the target consolidation processing unit 32 outputs the past correlation matrix for each target to the correlation matrix filter 29.

The correlation matrix filtering unit 29 multiplies each of the past correlation matrix inputted from the target consolidation processing unit 32 and the present correlation matrix with a weighting coefficient. Then, the correlation matrix filtering unit 29 performs an averaging operation on these correlation matrices. The correlation matrix filtering unit 29 outputs the averaged correlation matrix, obtained as a result of the averaging operation, to the direction detection unit 30.

The direction detection unit 30 uses a super-resolution algorithm such as MUSIC to detect the direction of the corresponding target from the averaged correlation matrix, and outputs to the target confirmation unit 31.

In addition, the target consolidation processing unit 32 adds to the present correlation matrix, the identifying information regarding the distance, the relative velocity, and the direction outputted from the target confirmation unit 31, and stores into the memory 21.

<Super-Resolution Algorithm in the Estimation of the Arrival Direction of an Incoming Wave>

Figure 7:
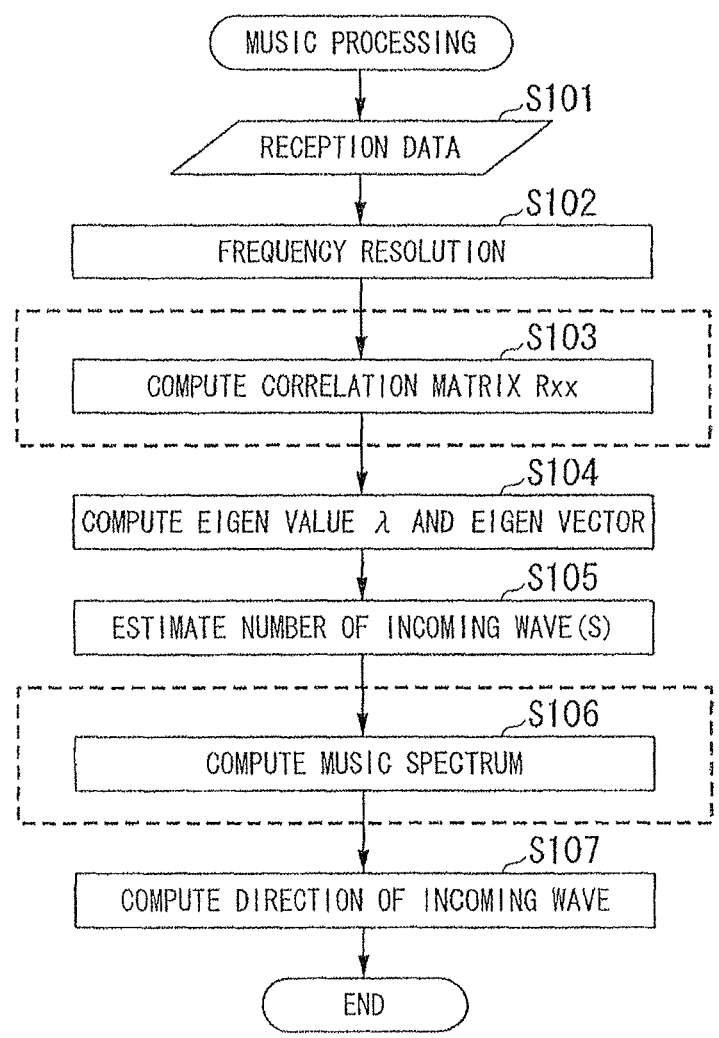
FIG. 7 is a flowchart describing a MUSIC operation.

Next, a super-resolution algorithm estimating the arrival direction of an incoming wave according to the correlation matrix computation unit 28, the correlation matrix filtering unit 29, and the direction detection unit 30, is described with MUSIC as an example with reference to FIG. 7. FIG. 7 is a flowchart describing the flow of the operating process of a general MUSIC Method. Since the process of the MUSIC Method itself is used in general (for example, in Non-Patent Documents 1 and 2, or, Patent Documents 3-6), only the aspects of the MUSIC Method which are necessary in the first embodiment are described.

The frequency resolution processing unit 22 reads in the beat signal of the reception wave stored in the memory 21 (step S101), and performs a frequency-modulation on the beat signal for each antenna (step S102).

Further, as described above, the correlation matrix computation unit 28 reads in the complex number frequency region data (hereinafter referred to as complex number data) by making a selection from the frequency resolution processing unit 22. The complex number data has undergone a frequency resolution, and corresponds to the frequency point of the target in the descending region for which a pair has been confirmed by the pair confirmation unit 27. In addition, regarding the descending region, the correlation matrix computation unit 28 generates a correlation matrix indicating the correlation for each antenna (step S103).

Figure 8A:
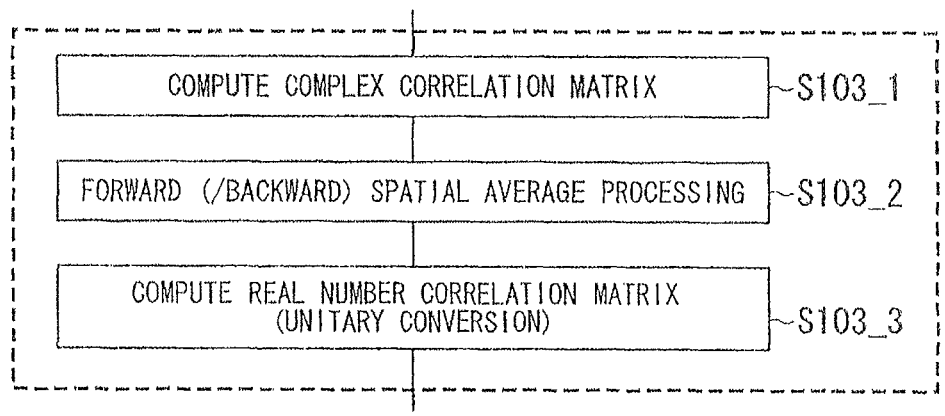
FIG. 8A is a flowchart showing a substep executed in step S103 of the flowchart shown in FIG. 7.
Figure 8B:
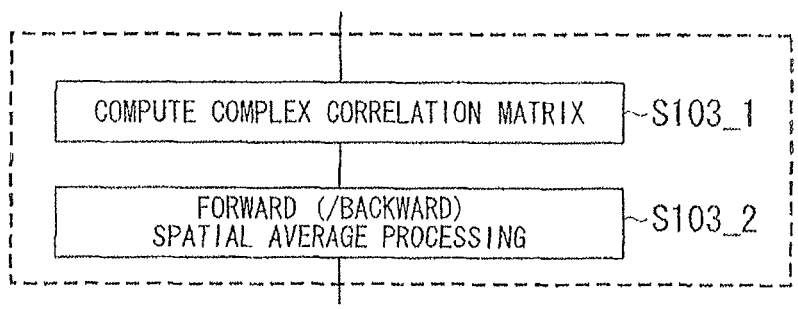
FIG. 8B is a flowchart showing a substep executed in step S103 of the flowchart shown in FIG. 7.

The generation of the correlation matrix by the correlation matrix computation unit 28 in step S103 is conducted, for example, according to the methods shown in FIGS. 8A and 8B. The methods shown in FIGS. 8A and 8B are briefly described below.

According to the method shown in FIG. 8A, the correlation matrix computation unit 28 generates a correlation matrix (complex correlation matrix) based on the bare complex number data (step S103_1), and processes with a forward-only spatial average (Forward Spatial Averaging Method) or a forward-and-backward spatial average (Forward-Backward Spatial Averaging Method) (step S103_2).

Spatial averaging refers to a process in which the number of antennas in the array of the original reception antennas is divided into subarrays which has a lesser amount of antennas, and the subarrays are averaged. The phase relation of waves having a correlation differs according to the position at which the wave was received. Thus, according to this basic principle of spatial averaging, the correlation matrix is obtained by moving the reception point in an appropriate manner. In this way, the basic principle of spatial averaging is such that the correlation of the correlated interference wave is restrained due to the effect of the averaging process. In general, the averaging is conducted by taking out a plurality of subarrays having the same alignment from the overall array of reception antennas without moving the array of reception antennas, and then obtaining the average of each correlation matrix.

Figure 9:
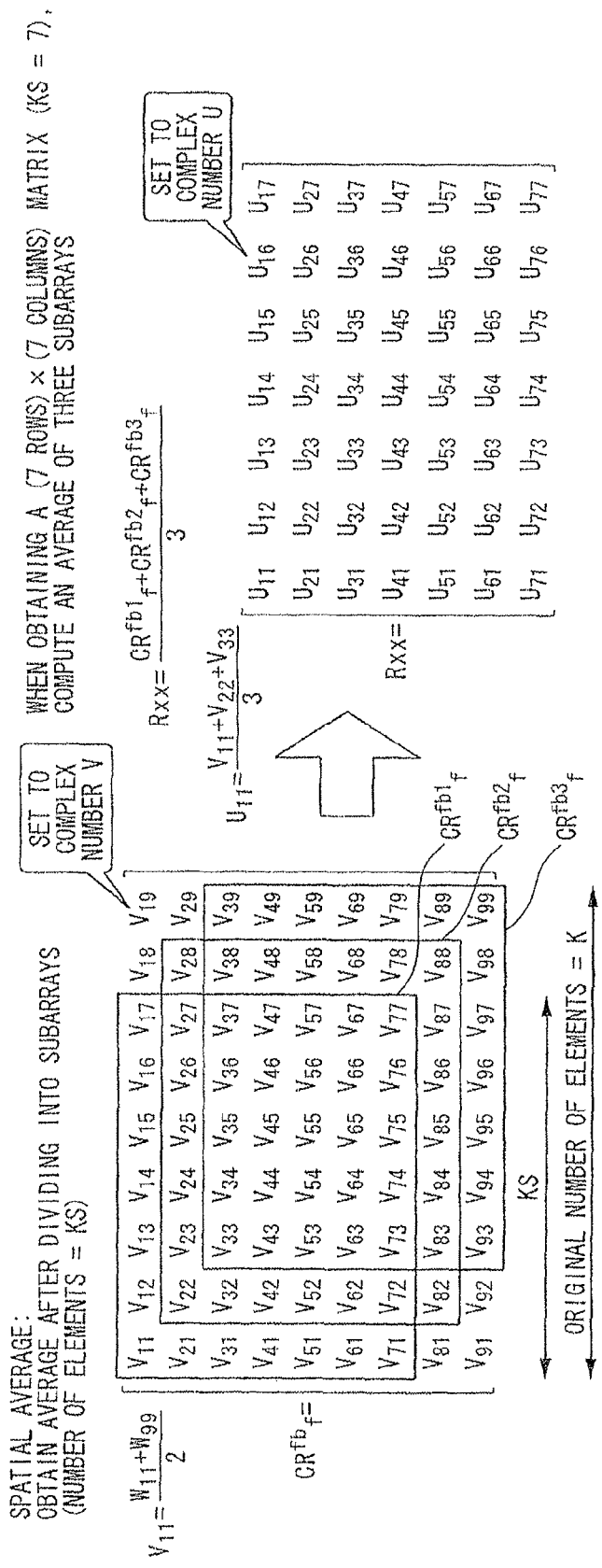
FIG. 9 is a conceptual diagram describing a process executed when a spatial average of a correlation matrix is computed.

For example, as shown in FIG. 9, when the array of reception antennas 11~11$n$ is such that there are nine antennas (n=9), the correlation matrix computation unit 28 obtains the backward correlation matrix $CR^b_f$ in the latter equation (6) with respect to the correlation matrix $CR^f_f$ in the forward equation (5) indicated below. Thus, the correlation matrix computation unit 28 carries out an averaging procedure of the forward/backward elements by averaging the corresponding elements in the correlation matrix in equation (5) and the backward correlation matrix in equation (6) according to the following equation (3).

(Equation 3)

$$CR^{fb}_f = (CR^f_f + CR^b_f)/2 \qquad (3)$$

In this way, the correlation matrix computation unit 28 divides the correlation matrix $CR^{fb}_f$ obtained by the forward/backward averaging process, into subarrays, and computes an average. Thus, the correlation matrix computation unit 28 obtains a correlation matrix Rxx which is used to estimate the arrival direction of the reception wave. In other words, the correlation matrix obtained by the forward/backward spatial averaging process can be expressed as follows by Equation (4).

(Equation 4)

$$Rxx = (CR^{fb1}_f + CR^{fb2}_f + CR^{fb3}_f)/3 \qquad (4)$$

Here, the correlation matrix computation unit 28 obtains the correlation matrix Rxx by dividing the nine reception antennas 11~19 into three subarrays each of which including seven antennas 11~17, 12~18, and 13~19, and by averaging the corresponding elements of each matrix in the subarray.

(Equation 5)

$$CR^f_f = \begin{bmatrix} W_{11} & W_{12} & W_{13} & W_{14} & W_{15} & W_{16} & W_{17} & W_{18} & W_{19} \\ W_{21} & W_{22} & W_{23} & W_{24} & W_{25} & W_{26} & W_{27} & W_{28} & W_{29} \\ W_{31} & W_{32} & W_{33} & W_{34} & W_{35} & W_{36} & W_{37} & W_{38} & W_{39} \\ W_{41} & W_{42} & W_{43} & W_{44} & W_{45} & W_{46} & W_{47} & W_{48} & W_{49} \\ W_{51} & W_{52} & W_{53} & W_{54} & W_{55} & W_{56} & W_{57} & W_{58} & W_{59} \\ W_{61} & W_{62} & W_{63} & W_{64} & W_{65} & W_{66} & W_{67} & W_{68} & W_{69} \\ W_{71} & W_{72} & W_{73} & W_{74} & W_{75} & W_{76} & W_{77} & W_{78} & W_{79} \\ W_{81} & W_{82} & W_{83} & W_{84} & W_{85} & W_{86} & W_{87} & W_{88} & W_{89} \\ W_{91} & W_{92} & W_{93} & W_{94} & W_{95} & W_{96} & W_{97} & W_{98} & W_{99} \end{bmatrix} \quad (5)$$

(Equation 6)

$$CR^b_f = \begin{bmatrix} W_{99} & W_{89} & W_{79} & W_{69} & W_{59} & W_{49} & W_{39} & W_{29} & W_{19} \\ W_{98} & W_{88} & W_{78} & W_{68} & W_{58} & W_{48} & W_{38} & W_{28} & W_{18} \\ W_{97} & W_{87} & W_{77} & W_{67} & W_{57} & W_{47} & W_{37} & W_{27} & W_{17} \\ W_{96} & W_{86} & W_{76} & W_{66} & W_{56} & W_{46} & W_{36} & W_{26} & W_{16} \\ W_{95} & W_{85} & W_{75} & W_{65} & W_{55} & W_{45} & W_{35} & W_{25} & W_{15} \\ W_{94} & W_{84} & W_{74} & W_{64} & W_{54} & W_{44} & W_{34} & W_{24} & W_{14} \\ W_{93} & W_{83} & W_{73} & W_{63} & W_{53} & W_{43} & W_{33} & W_{23} & W_{13} \\ W_{92} & W_{82} & W_{72} & W_{62} & W_{52} & W_{42} & W_{32} & W_{22} & W_{12} \\ W_{91} & W_{81} & W_{71} & W_{61} & W_{51} & W_{41} & W_{31} & W_{21} & W_{11} \end{bmatrix} \quad (6)$$

Meanwhile, in the case of the forward spatial averaging, the matrices from $V_{11}$ to $V_{99}$ can be kept as the matrices from $W_{11}$ to $W_{99}$ in equation (5). Thus, it is not necessary to average each element as shown, for example, in equation (7).

(Equation 7)

$$V_{11} = (W_{11} + W_{99})/2 \qquad (7)$$

Regarding the use in which the arrival direction of the reception wave regarding the radar is estimated, all of the incoming reception waves are reflection waves caused by the transmitted transmission wave reflecting from the target. Therefore, the data of the reception waves received by each antenna exhibits a strong correlation with one another. Thus, the results of the eigen value computation in the latter phase are not obtained accurately. In this way, spatial averaging has an effect of restraining the correlation, extracting a self correlation, and accurately estimating the direction of the incoming wave.

Next, the correlation matrix computation unit 28 performs a unitary conversion in order to convert the correlation matrix of complex data, which underwent a spatial averaging process as described above, into a correlation matrix of real numbers.

Here, by converting into a correlation matrix of real numbers, the eigen value computation in a subsequent step which has the heaviest computation load can be executed using real numbers only. In this way, the computation load can be greatly reduced.

Meanwhile, FIG. 8B shows a variation in which the eigen value computation in the subsequent step is executed using complex numbers without converting into a correlation matrix of real numbers by performing a unitary conversion as indicated in FIG. 8A.

Further, in step S103, regarding the correlation matrix Rxx obtained by the step S103_3 in FIG. 8A and the step S103_2 in FIG. 8B, the values of each element can be normalized (i.e., divided by the maximum value) based on the maximum value of the correlation matrix (or the diagonal element of the correlation matrix).

Next, the direction detection unit 30 computes the eigen value of the correlation matrix Rxx obtained in step S103 (in actuality, the correlation matrix obtained after the correlation matrix filtering process described below) and its corresponding eigen vector as an eigen value λ and an eigen vector e which satisfies the following characteristic equation (step S104).

(Equation 8)

$$Rxxe = \lambda e \qquad (8)$$

Then, based on the eigen value λ obtained above, the direction detecting unit 30 estimates the number of incoming waves necessary to remove the signal component vector (step S105).

Next, the direction detection unit 30 generates a spectrum of angles by computing an inner product of a vector with only the noise components after removing the signal vector, and a vector for each direction and angle which is predetermined internally (step S106). As a result, it is possible to associate a null with a directional characteristic to the arrival direction of the incoming wave.

Further, the direction detection unit 30 detects a peak from the spectrum of angles which exceeds a predetermined threshold value. In this way, the direction detection unit 30 detects the peak and computes the direction of the incoming wave (angle θ) (step S107).

In addition, the direction detection unit 30 can make a conversion to a position in the lateral direction with respect to the vertical axis of the array of antennas of the electronic scanning type radar device based on the angle (i.e., the arrival direction of the reception wave) and the distance computed by the distance detection unit 25.

A standard MUSIC Method has been described above. In the MUSIC spectrum computation in step S106, it is possible to use a method called the Root-MUSIC Method which computes a solution from the root of the polynomial, instead of a type searching with a direction vector.

In addition, after the step S107 in FIG. 7, it is possible to add a process computing the received electronic power and deleting an unnecessary wave (data of an unnecessary reception wave).

In other words, the direction detection unit 30 compares the electronic power indicated in the diagonal component of the matrix S in the following equation with a predetermined threshold value, and detects whether or not the electronic power exceeds the threshold value. Further, the direction detection unit 30 has a process which makes a determination of necessary reception wave when the electronic power exceeds the threshold value, and, meanwhile, makes a determination of unnecessary reception wave when the electronic power is less than or equal to the threshold value.

(Equation 9)

$$S=(A^H A)^{-1} A^H (Rxx-\sigma^2 I) A (A^H A)^{-1} \tag{9}$$

Here, S indicates the correlation matrix of the signal of the reception wave, A indicates the directional matrix, $A^H$ indicates the conjugate transpose matrix of A, I indicates the unit matrix, Rxx indicates the correlation matrix computed by the correlation matrix computation unit 28, and $\sigma^2$ indicates the dispersion of the noise vector.

By adding the process, described above, of computing the received electronic power and deleting an unnecessary wave, it is possible to delete the unnecessary incoming reception wave, when the number of reception waves was overestimated in the estimation of the number of reception waves in step S105.

<The Present and Past Averaging Process by the Correlation Matrix Filtering Unit 29>

Next, following is a description of the averaging process of the present and past correlation matrices according to the first embodiment. This averaging process is conducted primarily by the correlation matrix calculation unit 28, the correlation matrix filtering unit 29, and the target consolidation processing unit 32 in FIG. 1.

Figures 10, 11:
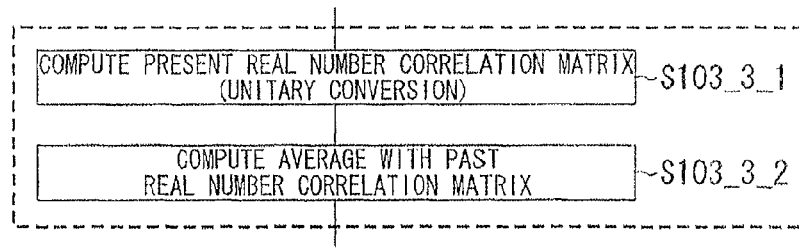
FIG. 10 is a conceptual diagram used when a correlation is made between a present detection cycle and a past detection cycle, and shows a configuration of a table in which a correlation matrix is entered corresponding to a distance and a relative velocity of the past detection cycle.
FIG. 11 is a flowchart showing a substep of step S103_3 in FIG. 8A.

In order to perform the averaging process in the correlation matrix filtering unit 29, the target consolidation processing unit 32 conducts the following operation so that, in the table shown in FIG. 10, a consolidation is made for each target among the present target cluster (t), a target (t) predicted from the confirmed past target data, and a target confirmed in the past (t−1, t−2, t−3).

The t−1 shown in FIG. 10 indicates a result of the detected cycle which is one cycle prior (immediately prior) to the present. The t−2 indicates a result of the detected cycle which is two cycles prior to the present. The t−3 indicates a result which is three cycles prior to the present.

As a result of each detection cycle, respectively for each confirmed target, the distance r, the longitudinal position Long_d (a vertical direction with respect to the direction in which the antenna is aligned), the lateral position Late_d (a position parallel to the direction in which the antenna is aligned), the relative velocity with respect to the target velo (i.e., v), a descending peak frequency point f_dwn, and the correlation matrix mat_dwn at the time of the descending peak frequency (i.e., Rxx), are stored in the memory 21 in the form of the table shown in FIG. 10 (A case, for example, in which the descending data is used for detecting the direction. In addition, more accurately, the memory region of mat_dwn is larger than others. However, the memory region of mat_dwn is presumed to be the same for convenience, for ease of displaying on the table). Here, the longitudinal position Long_d of the target and the lateral position Late_d can be obtained from the angle with the target (the angle of the arriving direction of the reception wave) and the distance r. When the angle is θ and the distance is r, the longitudinal position Long_d is computed by r·cos θ, and the lateral position is computed by Long_d·sin θ.

In addition, the target consolidation processing unit 32 predicts a distance r of each target at the time of the present cycle, the longitudinal position Long_d and the lateral position Late_d, the relative velocity, and the peak frequency point based on the target distance r which was confirmed in the past, the longitudinal position Long_d, the lateral position Late_d, and the relative velocity velo. For example, in order to predict the longitudinal position Long_d, the lateral position Late_d, and the frequency point, a movable range during the time after the detected cycle is determined based on the previous distance r, the longitudinal position Long_d, the lateral position Late_d, and the relative velocity. The relative velocity can be predicted by computing, for example, the slope of the change in the transition of the value of the relative velocity for several cycles in the past.

For instance, the target consolidation processing unit 32 sets a predetermined movable range, a frequency point range, and a relative velocity range corresponding to each of the distance r predicted from the results confirmed in the past, the longitudinal position Long_d, the lateral position Late_d, the peak frequency point, and the relative velocity. In addition, the target consolidation processing unit 32 determined whether or not each value, computed in the present cycle, is within the range. If the value computed in the present cycle is outside the range, the target consolidation processing unit 32 determines that the target is a different one.

Further, in the table shown in FIG. 10, if the target in the present detection cycle is consolidated with a past target, the target consolidation processing unit 32 moves the result of t−2 to t−3, moves the result of t−1 to t−2, and moves the result of the present detection cycle to the result of t−1. In this way, the target consolidation processing unit 32 computes the result of the estimation in the next cycle.

Meanwhile, the target consolidation processing unit 32 regards the present target, which is not linked with any of the results of the target in the past, as a new target. In order to estimate the direction without conducting a filtering with the past correlation matrix, the correlation matrix Rxx is directly outputted to the direction detection unit 30.

When there is a past target that cannot be linked to the result of the present target cluster, the target consolidation processing unit 32 clears all of the information of such a past target.

Therefore, when a target enters a distance under the influence of a multipass, and when the detection cycle is such that a peak detection of the beam frequency is not made, the filtering effect using the result of the past target cluster is reset. In the case of the first embodiment shown in FIG. 10, the results of the target in three past detection cycles are stored in the memory 21.

Moreover, in another embodiment, the target consolidation processing unit 32 may be configured so that, even if a past target is detected which was not linked to the target in the present detection cycle, the confirmed result of the past target is maintained for a predetermined number of cycles.

In addition, the target consolidation unit 32 may be configured so that the prediction result, estimated based on a past result, is updated in series. Further, the target consolidation unit 32 may be configured so that, even if a target in the present detection cycle is not detected due to the influence of a multipass, and when a linkage is made subsequent to the next detection cycle, the past data, other than the number of cycles for which the peak cannot be detected due to the influence of the multipass, can be used in the filtering process.

In addition, similar to the extrapolation method in tracking, the prediction result may be used as a result of the present detection cycle in a detection cycle in which the peak value is not detected. In this way, the existence of the target can be maintained.

Further, as shown in FIG. 11, the correlation matrix filtering unit 29 performs an averaging operation of the correlation matrix Rxx regarding the process in the step S103_3 in FIG. 8A. Thus, a correlation matrix for estimating the arrival direction of the reception wave is generated.

Here, after the computation of the present correlation matrix of real numbers computed from the complex number data of the present detection cycle (unitary conversion, step S103_3_1), the correlation matrix filtering unit 29 performs a weighted averaging process with a correlation matrix for one past detection cycle or more in the table shown in FIG. 10 and stored in the memory 21 (step S103_3_2).

Incidentally, the same value can be ultimately obtained by storing the condition of the complex number correlation matrix of the step S103_1 of FIG. 8A in the memory 21, and performing the averaging process, described above, before the spatial averaging process in step S103_2 and before the unitary conversion in step S103_3. However, since the amount of data stored in the memory 21 increases, it is preferred to use a method in which a correlation matrix of real numbers, obtained by unitary conversion, is stored.

Figure 12:
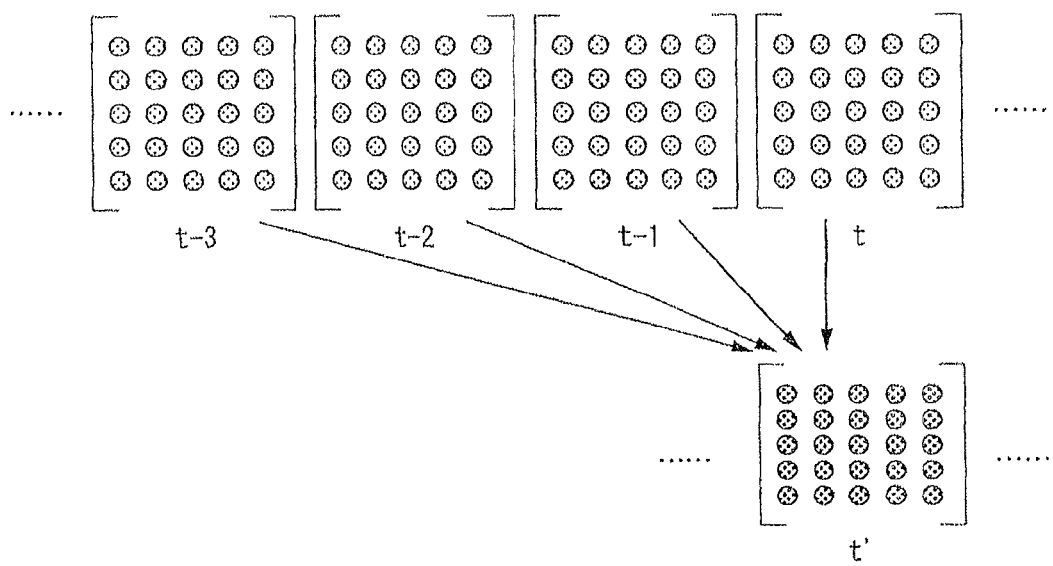
FIG. 12 is a conceptual diagram describing an averaging operation of a present detection cycle and a past (multiple) detection cycle(s).

For instance, FIG. 12 shows an example in which a 5-by-5 correlation matrix (real numbers) is created by performing a subarraying operation in the spatial averaging process.

In this example, the result of the past detection cycle stored in the memory 21 is a result up to three cycles prior to the present, and can be expressed by the following equation (10).

(Equation 10)

$$Rxx'(t')=K1 \cdot Rxx(t)+K2 \cdot Rxx(t-1)+K3 \cdot Rxx(t-2)+K4 \cdot Rxx(t-3) \quad (1)$$

Further, when the weighting coefficient in the above equation (10) is such that K1 (Present)=K2 (one cycle prior to the present)=K3 (two cycles prior to the present)=K4 (three cycles prior to the present)=0.25, a simple average of the four correlation matrices is obtained.

In addition, it is possible to change the magnitude of the weighting coefficient for each cycle. For example, it is possible to increase the weighting coefficient closer to the present cycle, or multiply a cycle not included in the average with a coefficient zero. There is not particular limit on the number of past cycles. However, considering the filtering effect and the memory capacity, it is presumed that up to three past cycles prior to the present in the first embodiment is appropriate.

The correlation matrix filtering unit 29 outputs the correlation matrix Rxx', described above, to the direction detection unit 30 as a correlation matrix used to estimate the arrival direction of the reception wave.

Figure 13:
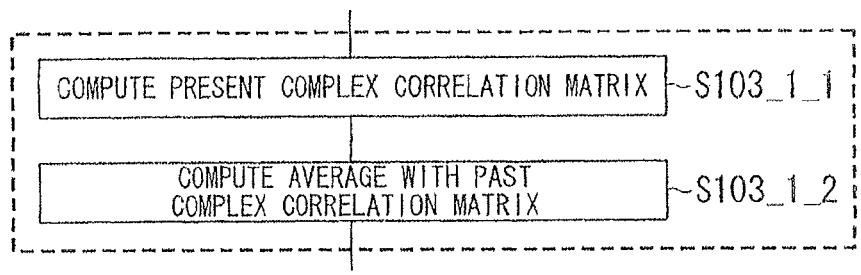
FIG. 13 is a flowchart showing a substep of step S103_1 in FIG. 8B.

Meanwhile, when the averaging process is performed using the complex correlation matrix shown in FIG. 8B, the processing step shown in FIG. 13 is executed in the step S103_1.

The correlation matrix filtering unit 29 computes the present complex correlation matrix (step S103_1_1) calculated by the complex number data of the present detection cycle. Then, the correlation matrix filtering unit 29 performs a weighted-averaging process (step S103_1_2) with a complex number correlation matrix for one or more past cycles stored in the memory 21. In FIG. 13, as another embodiment different from the example in FIG. 11, a correlation matrix filtering process was conducted on the complex number correlation matrix which has not yet been spatially averaged.

However, in this case as well, the amount of computation and the amount of data stored in the memory can be kept small if a correlation matrix filtering process is performed on the complex number correlation matrix after being spatially-averaged, as shown in step S103_2 in FIG. 8B.

Here, when the relative velocity with respect to the target is extremely large, the change in the distance for each detection cycle of the target becomes large.

Therefore, the range of the beat frequency filtered by the correlation matrix filtering unit 29 (i.e., the distance range) may widen, and the change in the angle θ may increase between the cycles of linked targets.

Figure 14A:
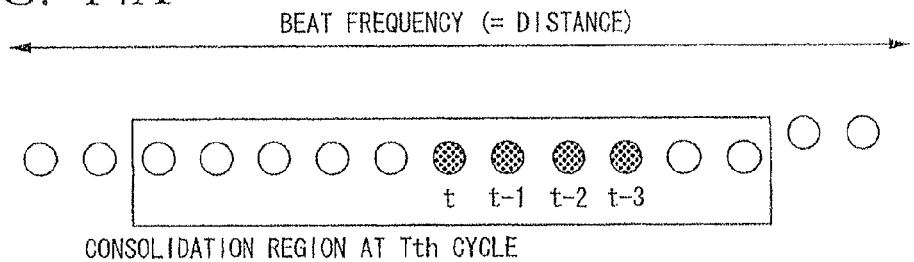
FIG. 14A is a conceptual diagram describing a number of detection cycles corresponding to a detection cycle.
Figure 14B:
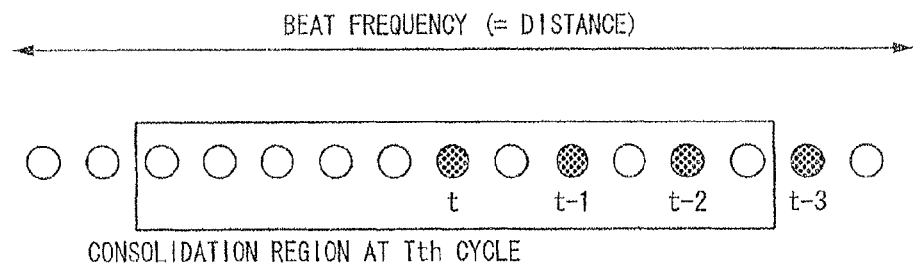
FIG. 14B is a conceptual diagram describing a number of detection cycles corresponding to a detection cycle.

In response to such cases, when the correlation matrices of a same target in the past detection cycle is linked as shown in FIGS. 14A and 14B, the past detection cycle of the stored correlation matrix can be kept intact by setting the beat frequency point range which can be linked from the result of the present detection cycle, and thus it is possible to select the number of past cycles that will be used when the averaging process is performed. It is also possible to reduce the substantive number of linkage by varying the weighing coefficient.

Incidentally, FIG. 14B shows an example where the target is approaching with a fast relative velocity. In this case, the peak of the beat frequency moves quickly. As a result, the cycle t−3 falls outside the range of data that will be averaged. Therefore, the number of past detection cycles of the correlation matrix stored as the table in FIG. 10 may be kept intact, the number of past cycles used at the time of averaging may be selected, or the number of linkage can be reduced substantively by varying the weighting coefficient (for example, changing the weighing coefficient of the correlation matrix to "0").

In addition, a threshold value may be set for the relative velocity regarding the result concerning the target in the past detection cycle and regarding the result concerning the target in the present detection cycle.

In this case, when either of the relative velocity regarding the result concerning the target in the past detection cycle and regarding the result concerning the target in the present detection cycle is greater than or equal to a relative velocity of the predetermined threshold value, the correlation matrix filtering unit 29 may be configured so that the number of past cycles that are averaged is reduced, or the number of linkage is reduced substantively by varying the weighing coefficient.

In addition, according to yet another configuration of the correlation matrix filtering unit 29, the change in the value of the lateral position which is confirmed in the target in the past detection cycle may be directly calculated, then, whether or not the predetermined prescriptive value was exceeded may be calculated, and if the predetermined prescriptive value is exceeded, the number of cycles that are averaged may be reduced, or, the weighting coefficient may be varied such that the number of elements in the series may be substantively reduced. For example, in each of the present cycle and the past cycle, a threshold value ΔLate_d may be set, and, for example, when a lateral movement of greater than or equal to ΔLate_d is detected between t−1 and t−2, the weighting coefficient of the data of t−2 and t−3 may be set to be 0. After a direction is detected by the direction detection unit 30, the target confirmation unit 31 stores the distance of the target, the longitudinal position, the lateral position, the relative velocity, the descending peak frequency point, and the correlation matrix, with respect to the table shown in FIG. 10 of the memory 21 via the target consolidation processing unit 32, as described above, as information of t−1 for the next detection cycle, and deletes information of t−3.

Figure 15:
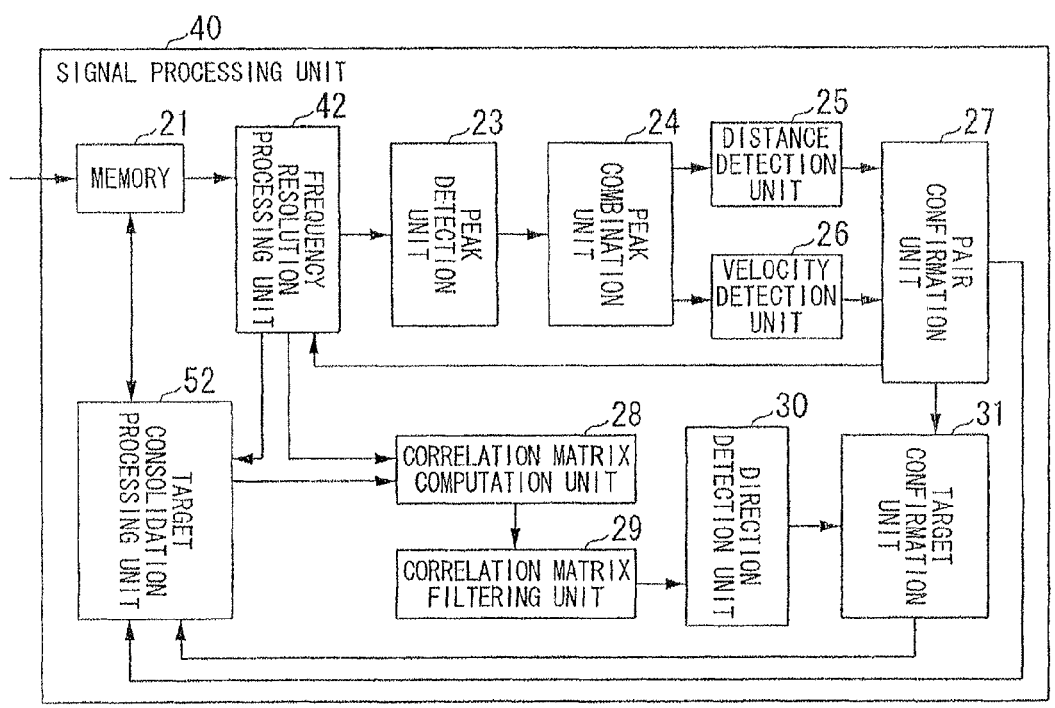
FIG. 15 is a block diagram showing an example of a configuration of an electronic scanning type radar device according to a variation of the first embodiment of the present invention.

In addition, the signal processing unit 40 shown in FIG. 15 is a configuration corresponding to the signal processing unit 20 shown in FIG. 1. In the result of each target cluster shown in the table in FIG. 10 in the memory 21, the configuration may be such that the complex number data after the frequency resolution is stored instead of the correlation matrix. The same reference numeral is used for the configuration performing a similar process. Only the aspects which are different from the configuration in FIG. 1 are described.

The frequency dissolution processing unit 42 outputs the frequency data to the target consolidation processing unit 52, which is a complex number data after the frequency dissolution. The remaining process of the frequency dissolution processing unit 22 is similar to what is shown in FIG. 1.

In addition, regarding the distance, longitudinal position, lateral position, relative velocity, the descending peak frequency point confirmed by the target confirmation unit 31, and the correlation matrix, the target consolidation processing unit 52 converts the complex number data corresponding to this correlation matrix into a correlation matrix, and stores it into table 10. The remaining process of the target consolidation processing unit 52 is similar to the target consolidation processing unit 32 shown in FIG. 1.

Figure 16:
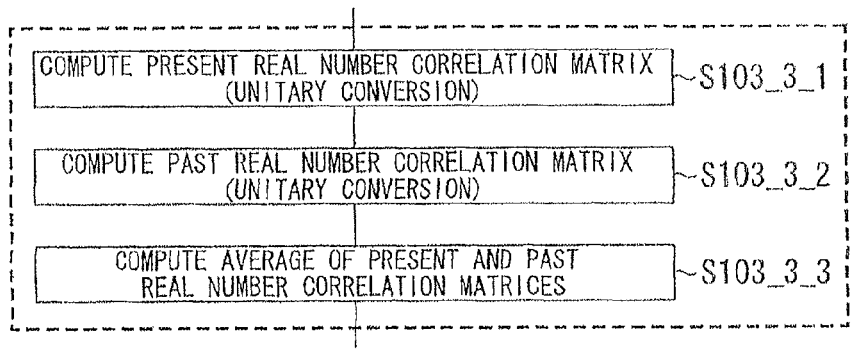
FIG. 16 is a flowchart showing a substep of step S103_3 in FIG. 8A.
Figure 17:
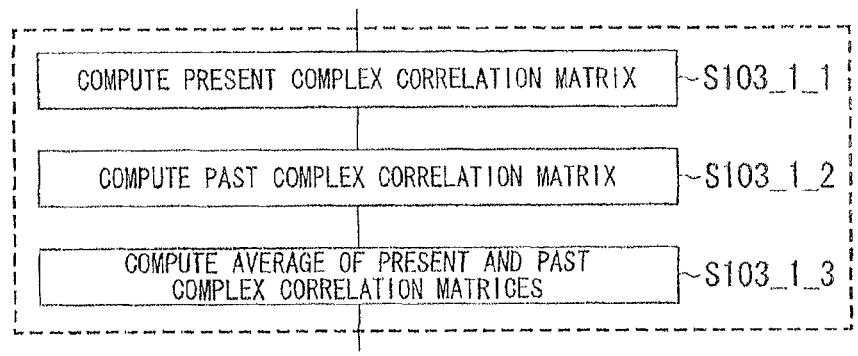
FIG. 17 is a flowchart showing a substep of step S103_1 in FIG. 8B.

According to the configuration shown in FIG. 15 described above, the data stored in the memory 21 becomes less compared to the correlation matrix. However, in the correlation matrix filtering unit 29, when the present correlation matrix and the past correlation matrix are averaged, the it is necessary that the correlation matrix filtering unit 29 recalculate the correlation matrix Rxx from the complex number data of the result of the past detection cycle. FIG. 16 shows the processing flow corresponding to FIG. 11. FIG. 17 shows the processing flow corresponding to FIG. 13. In this case in FIG. 16, as in the example in FIG. 17, the averaging process by the correlation matrix filter was conducted before the spatial averaging operation and the unitary conversion, which is preferable because the amount of computation is small.

Second Embodiment

Figure 18:
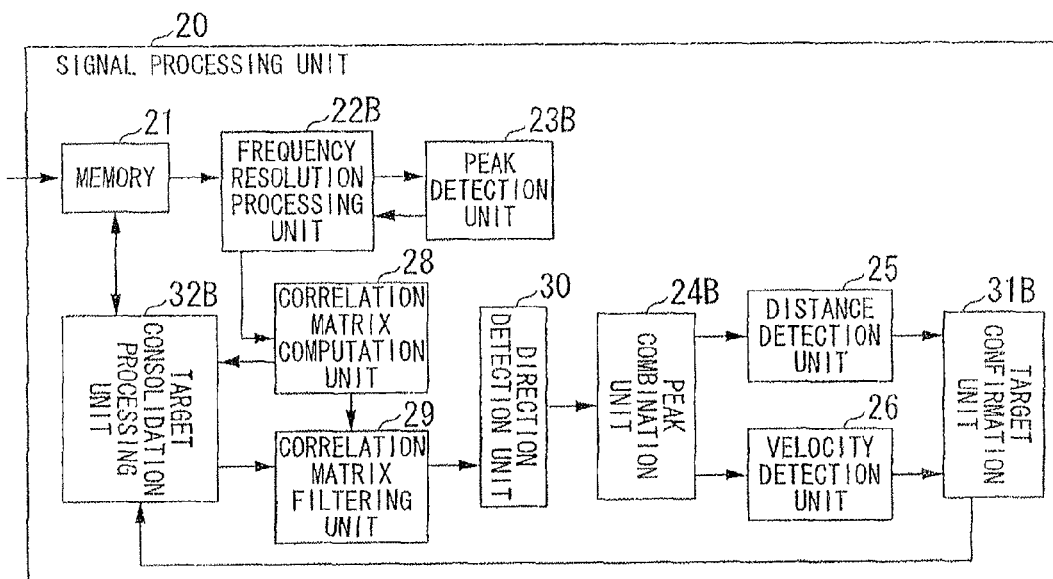
FIG. 18 is a block diagram showing an example of a configuration of an electronic scanning type radar device according to a second embodiment of the present invention.

Hereinafter, an electronic scanning type radar device according to a second embodiment of the present invention is described with reference to FIG. 18. FIG. 18 is a block diagram showing an example of a configuration of the electronic scanning type radar device according to the second embodiment.

Similar to the first embodiment, the second embodiment is configured so that the direction is estimated only with a super-resolution algorithm. The same reference numeral is used for the configuration which is similar to the first embodiment shown in FIG. 1. Hereinafter, the aspects which are different from the first embodiment are described.

The frequency dissolution processing unit 22B converts the beat signal of the ascending region and the descending region for each antenna into complex number data, and outputs the frequency point indicating its heat frequency and the complex number data to the peak detection unit 23B.

Then, the peak detection unit 23B detects the peak value of each of the ascending region and the descending region, and the frequency point for which the peak value exists, and outputs the frequency point to the frequency dissolution processing unit 22B.

Next, the frequency dissolution processing unit 22B outputs the complex number data corresponding to each of the ascending region and the descending region to the next correlation matrix computation unit 28.

The correlation matrix computation unit 28 generates a correlation matrix from the inputted complex number data.

This complex number data becomes the target cluster of the ascending region and the descending region (the beat frequency which has a peak in the ascending region and the descending region).

Since it is necessary that target confirmed in the past and both ascending and descending target clusters be consolidated by the target consolidation processing unit 32B, the table shown in FIG. 19 is stored in the memory 21. The table shown in FIG. 19 stores, in addition to the configuration of FIG. 10, the frequency point (peak frequency) in the ascending region (ascent) and the descending region (descent) for each target cluster, and the correlation matrix corresponding to the frequency point of the ascending region and the descending region.

The target consolidation unit 32B performs a consolidation operation of the present detection cycle and the past detection cycle based on a process similar to the target consolidation 32 in FIG. 1.

Further, in each of the ascending region and the descending region, the correlation matrix filtering unit 29 performs an averaging operation on the correlation matrix in the present detection cycle and the correlation matrix in the past detection cycle, and outputs to the direction detection unit 29.

Next, the direction detection unit 30 detects an angle θ for each of the correlation matrix of the ascending region and the correlation matrix of the descending region, and outputs to the peak combination unit 24B as a table shown in FIG. 20.

Further, based on the information of the table shown in FIG. 20, the peak combination unit 24B creates a combination having similar angles, and outputs a combination of the beat frequency of the ascending region and the descending region to the distance detection unit 25 and the velocity detection unit 26.

Similar to the first embodiment, the distance detection unit 25 computes a distance based on the beat frequency of the ascending region and the descending region of the combination.

In addition, similar to the first embodiment, the velocity detection unit 26 computes the relative velocity based on the beat frequency of the ascending region and the descending region of the combination.

Here, regarding the values of the distance and the relative velocity, it is not necessary to perform an averaging process and a filtering process on the present detection cycle and the past detection cycle as in the direction detection, each of the distance detection unit 25 and the velocity detection unit 26 performs a calculation based on a combination of the ascending region and the descending region of the beat frequency of the present detection cycle.

The target confirmation unit 31B confirms the above described correlation matrix of the ascending region and the descending region, the frequency point, the distance, and the relative velocity in the ascending region and the descending region as the present condition.

In addition, the target consolidation processing unit 32B stores, for each target, the frequency point of the ascending region and the descending region, the correlation matrix, the distance, the longitudinal position, the lateral position, and the relative velocity of the ascending region and the descending region, which are inputted from the target confirmation unit 31B, into a table in FIG. 19 by a similar process conducted in the first embodiment.

In addition, in the second embodiment, a configuration may be made such that a complex number data of the beat frequency for which a peak value was detected is stored in the table in FIG. 19, instead of the correlation matrix. Here, in the second embodiment, not only the complex number data corresponding to the descending region in the first embodiment, but also the complex number data of both the ascending region and the descending region are stored in the table of FIG. 19 with a correspondence to the frequency point of each beat frequency.

According to this configuration of storing the complex number data, when the correlation matrix filtering unit performs, for each target cluster, an averaging operation of the correlation matrix of the present detection cycle and the correlation matrix of the past detection cycle, the correlation matrix computation unit 28 the correlation matrix computation unit 28 computes a correlation matrix based on the complex number data of the past detection cycle read from the memory 21.

Third Embodiment

Hereinafter, an electronic scanning type radar device according to a third embodiment of the present invention is described with reference to FIG. 21. FIG. 21 is a block diagram showing an example of a configuration of the electronic scanning type radar device according to the third embodiment.

According to this third embodiment, different from the first embodiment, an estimation of a direction is first made using a DBF (Digital Beam Forming) which has a lower resolution performance compared to a super-resolution algorithm such as the MUSIC Method. Next, a super-resolution algorithm is used to estimate the direction from a correlation matrix which has undergone an averaging process. The same reference numeral is used for the configuration which is similar to the first embodiment shown in FIG. 1. Hereinafter, the aspects which are different from the first embodiment are described.

As shown in FIG. 21, a DBF processing unit 40 is provided between the frequency dissolution processing unit 22 in the first embodiment shown in FIG. 1 and the peak detection unit 23. As described above, the third embodiment differs from the first embodiment in that an arrival direction of the reception wave is first estimated using DBF.

Similar to the first embodiment, the frequency dissolution processing unit 22 performs a frequency resolution on the inputted beat signal (temporal axis Fourier transform), and outputs a frequency point indicating the beat frequency and the complex number data to the DBF processing unit 40.

Next, the DBF processing unit 40 performs a Fourier transform on the inputted complex number data corresponding to each antenna in the direction in which the antenna is aligned. In other words, the DBF processing unit 40 performs a spatial axis Fourier transform.

Then, the DBF processing unit 40 computes the spatial complex number data for each angular channel corresponding to the angular resolution, which, said differently, depends on the angle, and outputs to the peak detection unit 23 for each beat frequency.

Therefore, the spectrum, indicated by the spatial complex number data (with a unit of beat frequency) for each angular channel outputted from the DBF processing unit 40, depends on the estimation of the arrival direction of the reception wave by the beam scanning resolution.

In addition, since a Fourier transform is conducted in the direction in which the antenna is aligned, the same effect can be obtained as when the complex number data is added between the angular channels. Furthermore, the S/N ratio of the complex number data for each angular channel is improved. Thus, the accuracy with which the peak value is detected can be enhanced in a manner similar to the first embodiment.

As in the first embodiment, the above described complex number data and the spatial complex number data are computed in both the ascending region and the descending region of the triangular wave.

Next, after the processing by the DBF processing unit 40, the peak detection unit 23 performs a peak detection for each angular channel based on the DBF results, and outputs the detected peak value for each channel to the next peak combination unit 24 for each angular channel (in the case of a spatial axis Fourier transform with a 16-resolution, 15 angular channels).

Similar to the first embodiment, the peak combination unit 24 combines a beat frequency in the ascending region and the descending region which has a peak value, with this peak value, and outputs to the distance detection unit 25 and the velocity detection unit 26 for each angular channel.

Then, the pair confirmation unit 27 generates a table shown in FIG. 5 for each angular channel based on the distance r and the relative velocity v which are inputted in series from each of the distance detection unit 25 and the velocity detection unit 26. Furthermore, similar to the first embodiment, the pair confirmation unit 27 determines an appropriate combination of the peak for each of the ascending region and the descending region corresponding to each target for each angular channel. Here, according to the resolution of the DBF, the existence of the target is indicated over multiple angular channels. Therefore, it is possible to make an appropriate combination of the peak of each of the ascending region and the descending region for each angular channel while also considering the consistency with the adjacent angular channels (matrices). Then, the pair confirmation unit 27 confirms a pair of the peak of each of the ascending region and the descending region, outputs a target cluster number indicating the confirmed distance r and the relative velocity v to the target confirmation unit 31, and creates a table shown in FIG. 22.

In addition, the pair confirmation unit 27 can obtain not only the distance r and the relative velocity v, but also the longitudinal position and the lateral position by getting information of the angular channel of each target. Therefore, the pair confirmation unit 27 can create a table shown in FIG. 22 which has a result corresponding to each target cluster of the present detection cycle including a longitudinal position and a lateral position with respect to the table shown in FIG. 6.

Figures 22, 23:
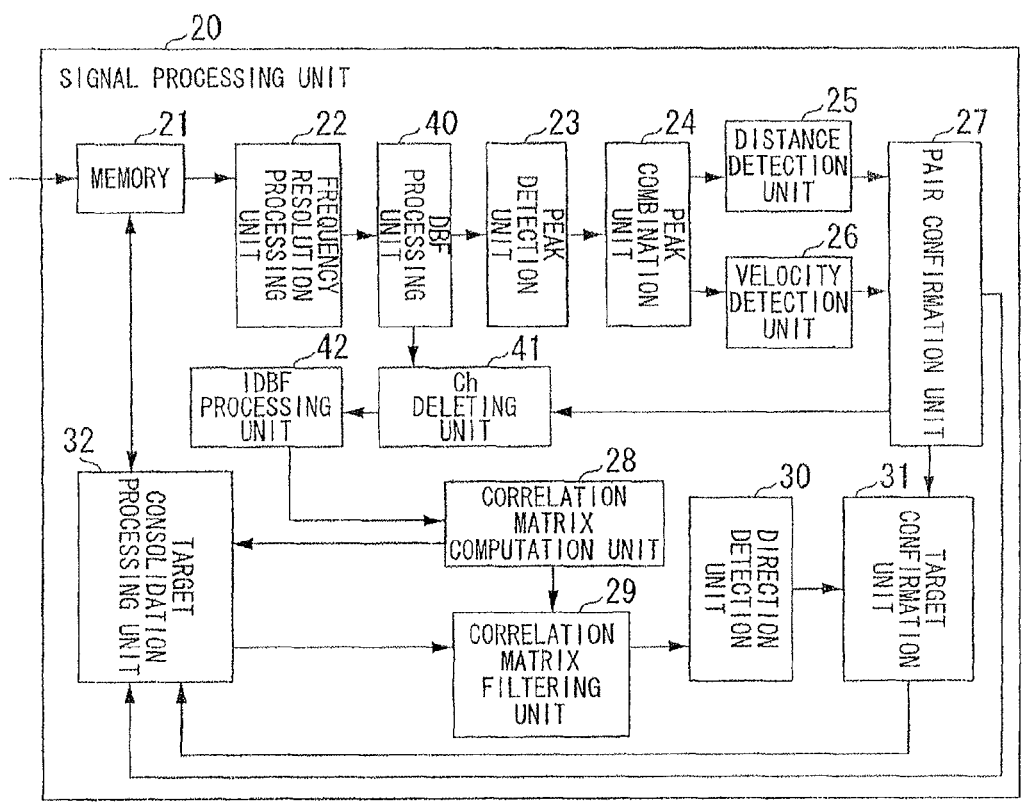
FIG. 22 is a table showing a distance, a longitudinal position, a lateral position, and a relative velocity for each target in a present detection cycle.
FIG. 23 is a block diagram showing an example of a configuration of an electronic scanning type radar device according to a fourth embodiment of the present invention.

In addition, the target consolidation unit 32 performs a process linking the target in the present detection cycle with the target in the past detection cycle shown in FIG. 10, using the information in the table shown in FIG. 22. Here, the target consolidation unit 32 uses the longitudinal position and the lateral position, as a parameter for the consolidation, in addition to the distance, the relative velocity, and the peak frequency point. Therefore, the consolidation process can be performed with a greater accuracy.

Furthermore, by performing an estimation based on the AND Theory according to the information on the direction obtained from the direction detection unit 30 and the information on the direction obtained from the DBF, it is possible to enhance the reliability of the detection of the direction. In addition, it is possible to assign the information on the direction of one another by, for example, using the information on the angle of the DBF in a close distance, even if the angular resolution is rough.

Further, in the third embodiment, a configuration may be made in which the complex number data of the beat frequency for which a peak value has been detected is stored with respect to the table shown in FIG. 10, instead of the correlation matrix.

According to this configuration in which the complex number data is stored, when the correlation matrix filtering unit 25 performs an averaging process on the correlation matrix of the present detection cycle and the correlation matrix of the past detection cycle for each target cluster, similar to the first embodiment, the correlation matrix computation unit 24 computes a correlation matrix from the complex number data of the past detection cycle read from the memory 21.

Fourth Embodiment

Hereinafter, an electronic scanning type radar device according to a fourth embodiment of the present invention is described with reference to FIG. 23. FIG. 23 is a block diagram showing an example of a configuration of the electronic scanning type radar device according to the fourth embodiment.

According to this fourth embodiment, different from the first embodiment, an estimation of a direction is first made using a DBF (Digital Beam Forming) which has a lower resolution performance compared to a super-resolution algorithm such as the MUSIC Method. In this way, the angular range of the target is narrowed, an IDBF (inverse DBF, in other words, an inverse spatial axis Fourier transform) is performed, thus reconverting to the complex number data of a temporal axis. Therefore, the fourth embodiment is configured so that the accuracy of the estimation of the direction conducted in the subsequent super-resolution algorithm is enhanced. The same reference numeral is used for the configuration which is similar to the third embodiment shown in FIG. 21. Hereinafter, the aspects which are different from the third embodiment are described.

The fourth embodiment is configured so that a Ch (Channel) deleting unit 41 and an IDBF processing unit 42 are added to the third embodiment.

The DBF processing unit 40 performs, similar to the third embodiment, a spatial axis Fourier transform, and outputs the spatial complex number data to the peak detection unit 23, and outputs to the Ch deleting unit 41 as well.

Figure 24A:
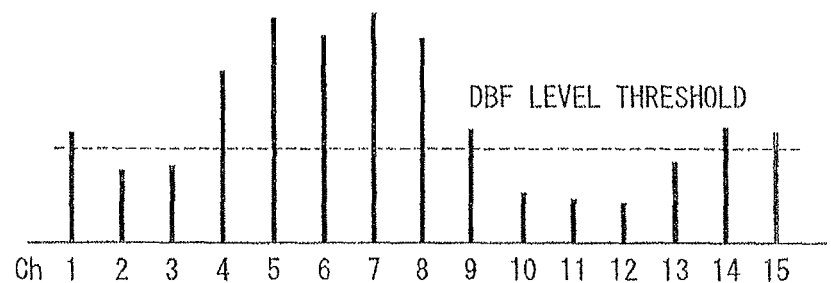
FIG. 24A is a conceptual diagram describing a processing of a spectrum intensity for each angle channel.

Here, in the fourth embodiment in the direction in which the reception antennas are aligned, as shown in FIG. 24A, the DBF processing unit 40 performs a spatial axis Fourier transform based on a 16-point resolution, for instance, and, as a result, creates a spectrum with an angle unit of 15 angular channels, and outputs to the Ch deleting unit 41.

Then, the Ch deleting unit 41 detects whether or not the level of the spectrum of the spatial complex number data corresponding to the peak frequency point (for example, the descending portion) of the DBF target which was confirmed by the pair confirmation unit 27 is continuous while being adjacent to the predetermined angular range, and, whether or not the level of the predetermined DBF threshold value is exceeded. Furthermore, the Ch deleting unit 41 performs a process converting the spectrum of the angular channel which does not exceed the DBF threshold value to "0," and thus outputs a narrowed spatial complex number data.

Figure 24B:
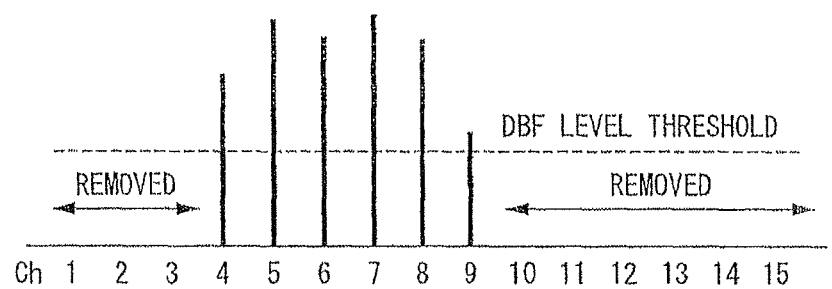
FIG. 24B is a conceptual diagram describing a processing of a spectrum intensity for each angle channel.

According to the process described above, when, for example, four adjacent angular channels as shown in FIG. 24B have a level exceeding the DBF threshold value, the Ch deleting unit 41 determines that one or more targets exist(s) in the range, and leaves the spectrum of these angular channels intact, while converting the intensity of a spectrum of another angle to "0."

Further, the IDBF processing unit 42 performs an inverse spatial axis Fourier transform on a spatial complex number data such that the spectrum was narrowed, i.e., only the data of the angular channel region being continuous for the predetermined number of angular channels and exceeding the DBF threshold value is left, and the intensity of the rest of the region is converted to "0." Thus, the IDBF processing unit 42 restores the spatial complex number data to a complex number data of a temporal axis, and outputs to the correlation matrix computation unit 28.

Figure 24C:
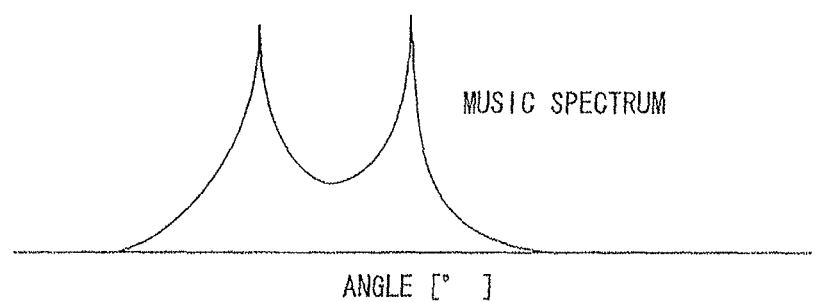
FIG. 24C is a conceptual diagram describing a processing of a spectrum intensity for each angle channel.

Furthermore, in order to compute a correlation matrix from the inputted complex number data, the correlation matrix computation unit 28 can obtain a correlation matrix with a good orthogonal characteristic such that objects on the roadside and the like are removed and the noise element is deleted. FIG. 24C shows an example in which a correlation matrix is created by the above described method with respect to the target cluster of the DBF resolution in FIG. 24B (the term "target cluster" is used because, in actuality, two or more targets may exist), and the target is divided even further by a super-resolution algorithm.

Figure 25A:
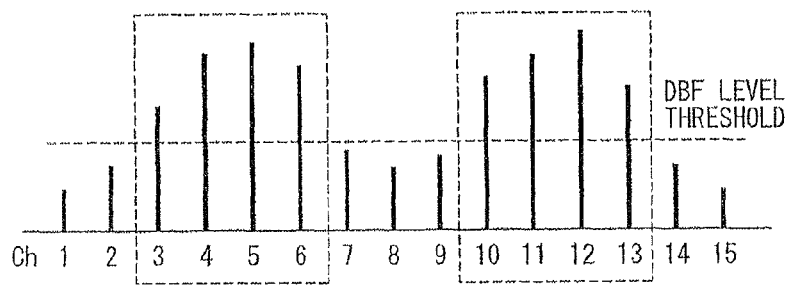
FIG. 25A is a conceptual diagram describing a processing of a spectrum intensity for each angle channel.

In addition, as shown in FIG. 25A, when a reception wave including a reflection component from a plurality of target clusters is received, there are a plurality of angular channel ranges, which exceed the DBF level at continuous angular channels, in the spatial complex number data outputted from the DBF processing unit 40.

Figure 25B:
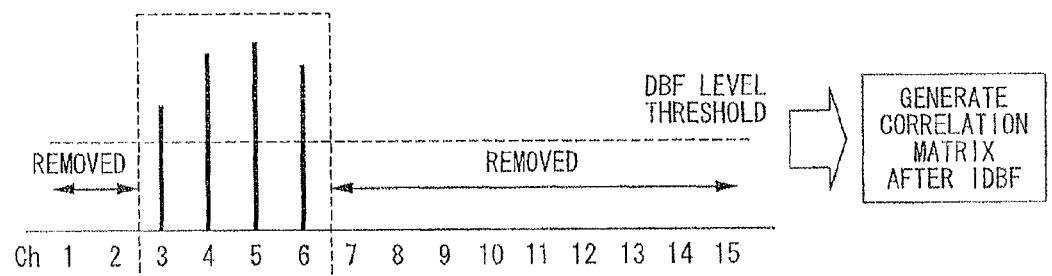
FIG. 25B is a conceptual diagram describing a processing of a spectrum intensity for each angle channel.
Figure 25C:
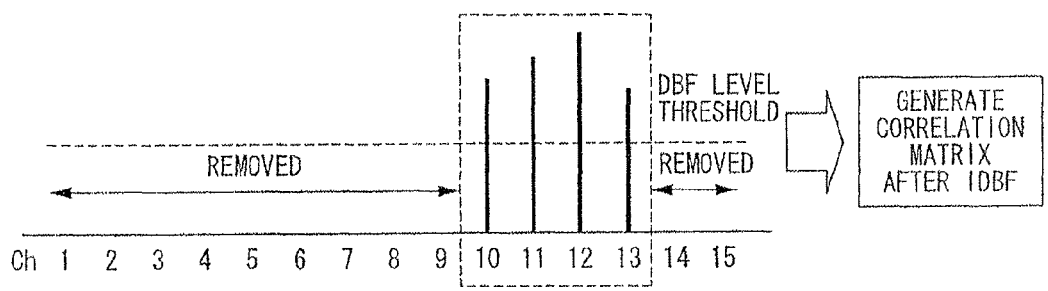
FIG. 25C is a conceptual diagram describing a processing of a spectrum intensity for each angle channel.

Furthermore, regarding the inputted spatial complex number data, within the predetermined angular channel range, when the level of the spectrum of the adjacent angular channels continuously exceeds the level of the DBF threshold value, the Ch deleting unit 41 extracts each of the exceeded angular channel region, and converts the intensity of the spectrum outside this angular channel region to "0." Thus, as shown in FIGS. 25B and 25C, the Ch deleting unit 41 makes a division into separate spatial complex number data which is recognized in the angular channel region.

Here, as in the third embodiment, the pair confirmation unit 27 obtains the distance, the relative velocity, the longitudinal position, and the lateral position, outputs to the Ch deleting unit 41, and outputs to the target consolidation processing unit 32.

The Ch deleting unit 41 selects the spatial complex number data corresponding to the frequency point of the DBF target, and, after performing the above described Ch deletion, outputs to the IDBF processing unit 42.

In addition, the IDBF processing unit 42 performs an inverse spatial Fourier transform on the inputted spatial complex number data, and outputs the obtained temporal axis complex number data to the correlation matrix computation unit 28.

As a result, the correlation matrix computation unit 28 calculates the correlation matrix from the inputted complex number data, and outputs to the correlation matrix filtering unit 29 as a correlation matrix in the present detection cycle.

The target consolidation processing unit 32 extracts the correlation matrix of the past detection cycle corresponding to the inputted distance, the relative velocity, the longitudinal position, and the lateral position from the table of FIG. 10 in the memory 21, and outputs to the correlation matrix filtering unit 29.

The correlation matrix filtering unit 29 performs an averaging process of the inputted correlation matrix of the present detection cycle and the corresponding correlation matrix of the past detection cycle (the data which was IDBF-processed in the past). Then, the correlation matrix filtering unit 29 outputs the obtained averaged correlation matrix to the direction detection unit 30.

According to the process described above, the range of the detection direction can be narrowed when the spectrum of the MUSIC is computed in the direction detection unit 30. Thus, compared to the first, second, and third embodiments, the resolution can be further enhanced.

Furthermore, according to the above described configuration, regarding the direction detection unit 30, the reception wave divided into reflection components for each target cluster is hypothetically received in the correlation matrix used in the eigen value computation. Therefore, even if the received reception wave includes a reflection component from a number of targets which is equal to or exceeded by, for example, the number of reception antennas and the number of subarrays, the eigen value computation can be carried out without any errors.

Furthermore, in the fourth embodiment, a configuration may be made in which the IDBF-processed complex number data of the beat frequency for which a peak value was detected may be stored with respect to the table shown in FIG. 10 instead of the correlation matrix.

In this configuration in which the complex number data is stored, similar to the first embodiment, when the correlation matrix filtering unit 29 performs an averaging process of the correlation matrix of the present detection cycle and the correlation matrix of the past detection cycle for each target cluster, the correlation matrix computation unit 28 computes the correlation matrix from the complex number data of the past detection cycle read from the memory 21.

Heretofore, the first, second, third and fourth embodiments have been described based on a configuration used in the FMCW-type radar shown in FIG. 1. However, an application to other antenna configurations of an FMCW-type is also possible.

In addition, an application is possible to a format other than an FMCW-type such as a multi-frequency CW and a pulse radar.

Furthermore, the fourth embodiment was described with, the MUSIC Method, which is a super-resolution algorithm, as an example of the direction detection unit. However, it is also possible to similarly create a correlation matrix (or a covariance matrix) and apply a configuration to the present invention, which is an algorithm based on the principle that the more noise is removed from this portion, the more accurate the detection becomes.

Furthermore, a program executing an operation of the signal processing unit 20 shown in FIG. 1, FIG. 15, FIG. 18, FIG. 21, and FIG. 23 may be recorded in a recording medium which can be read by a computer. The program recorded to this recording medium may then be read by a computer system, and may be executed to perform a signal processing which detects the direction based on a reception wave. Incidentally, the "computer system" here includes hardware such as OS and peripheral devices. In addition, the "computer system" includes a www-system which possesses an environment to provide websites (or, an environment for displaying). In addition, a "recording medium which can be read by a computer" indicates a transportable medium such as a flexible disc, an optical magnetic disc, a ROM, a CD-ROM, and the like, as well as a memory device such as a hard disc which is embedded in a computer system. Furthermore, a "recording medium which can be read by a computer" also indicates those which retain a program for a certain period of time such as a network like an internet, a server when a program is transmitted via a transmission line such as a telephone line, or a volatile memory (RAM) inside a client computer system.

In addition, the program may be transmitted to another computer system from a computer system which stores this program inside a memory device and the like, to another computer system through a transmission medium or a transmission wave inside a transmission medium. Here, a "transmission medium" transmitting the program includes a medium having an operation of transmitting information, such as a network (communication network) like the internet, or a communication line (communication wire) such as a telephone line. In addition, the program may be such that a part of the above described operation is executed. Furthermore, the program may be a so-called difference file (difference program) which executes the above described operation in combination with a program already recorded in the computer system.

Fifth Embodiment

Figure 26:
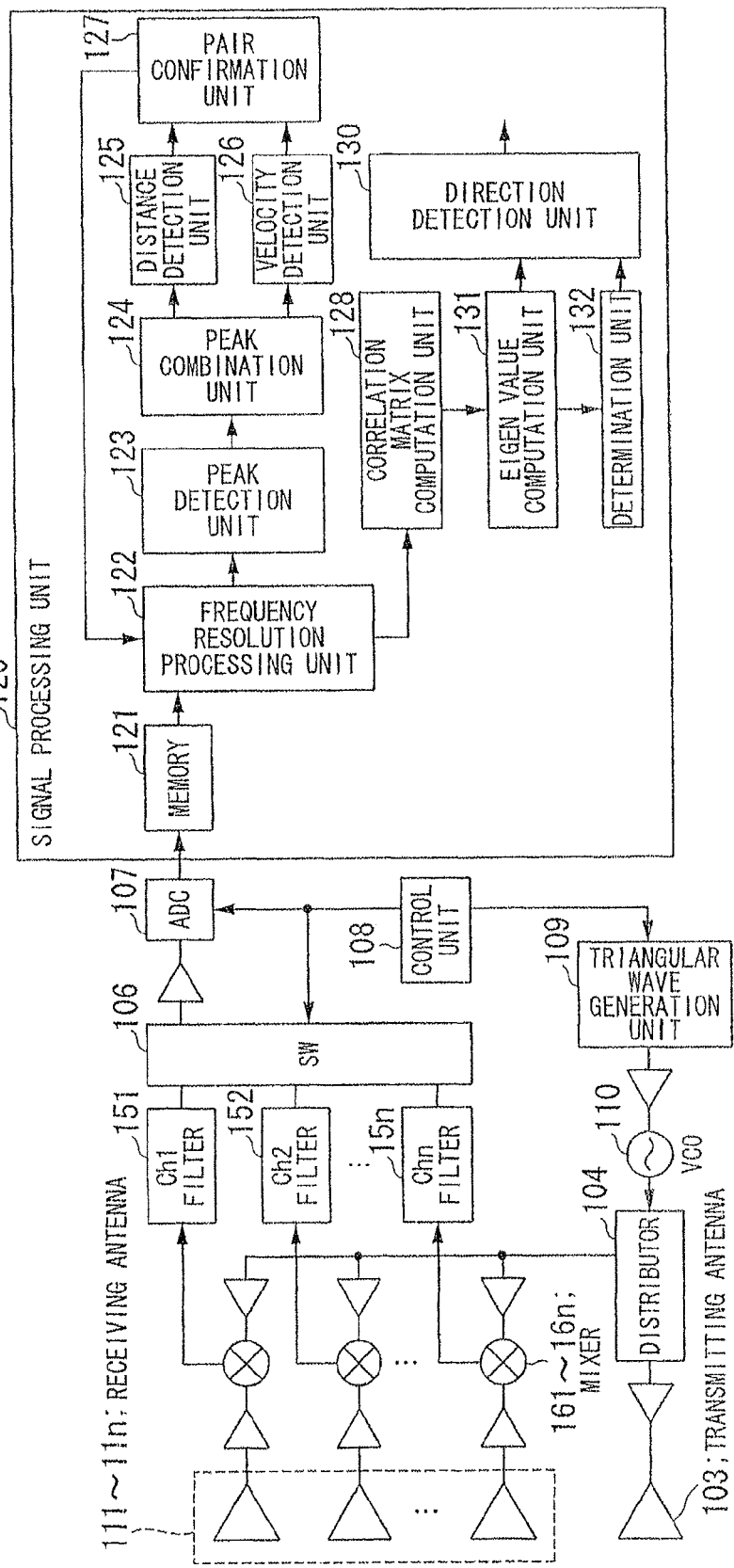
FIG. 26 is a block diagram showing an example of a configuration of an electronic scanning type radar device according to a fifth embodiment of the present invention.

Hereinafter, a fifth embodiment of an electronic scanning type radar device (FMCW type miliwave radar) according to the present invention is described with reference to the diagrams. FIG. 26 is a block diagram showing an example of a configuration of the fifth embodiment.

In this diagram, the electronic scanning type radar device according to the fifth embodiment includes a reception antenna $111\sim 11n$, a mixer (beat signal generation unit) $161\sim 16n$, a transmission antenna 103, a distributor 104, a filter $151\sim 15n$, a SW (switch) 106, an ADC (A/D converter) 107, a control unit 108, a triangular wave generation unit 109, a VCO 110, and a signal processing unit 120.

The signal processing unit 120 includes a memory (memory unit) 121, a frequency resolution processing unit 122, a peak detection unit 123, a peak combination unit 124, a distance detection unit 125, a velocity detection unit 126, a pair confirmation unit 127, a correlation matrix computation unit 128, a direction detection unit 130, an eigen value computation unit 131, and a determination unit 132.

Next, an operation of the electronic scanning type radar device according to the fifth embodiment is described with reference to FIG. 26.

The reception antenna $111\sim 11n$ receives a reflection wave, i.e., a reception wave, which comes from a target at which a transmission wave reflects.

Each of the mixers $161\sim 16n$ mixes a transmission wave, transmitted by the transmission antenna 103, and a signal obtained by an amplifier amplifying a reception wave received by each of the reception antennas $111\sim 11n$. Thus, each of the mixers $161\sim 16n$ generates a beat signal corresponding to each difference in frequency.

The transmission antenna 103 transmits to a target, a transmission wave, which is a transmission signal obtained by the VCO (Voltage Controlled Oscillator) 110 frequency-modulating a triangular wave signal generated by the triangular wave generation unit 109.

The distributor 104 distributes a frequency-modulated transmission signal from the VCO 110 to the mixers $161\sim 16n$ and to the transmission antenna 103.

Each of the filters $151\sim 15n$ executes a band limitation on beat signals Ch1~Chn, each of which were generated respectively by the mixers $161\sim 16n$, corresponding to each reception antenna $111\sim 11n$. In this way, each of the filters $151\sim 15n$ outputs the band-limited beat signal to the SW (switch) 106.

The SW 106 outputs to the ADC (A/D converter) 107, a beat signal of Ch1~Chn corresponding to each reception antennas $111\sim 11n$ which traveled through each of the filters 151~15$n$ corresponding to a sampling signal entered by the control unit 108, switching in succession.

The ADC 107 converts the beat signals of Ch1~Ch$n$, corresponding to each of the reception antennas 111~11$n$ and entered by the SW 106 in synchrony with the sampling signal, to a digital signal by performing an A/D conversion in synchrony with the sampling signal. The ADC 107 also stores the digital signal in series into a wave form memory region of the memory 121 of the signal processing unit 120.

The control unit 108 includes a micro computer and the like. The control unit 108 controls the overall electronic scanning type radar device shown in FIG. 26 based on a control program stored in a ROM, not diagramed, and the like.

<Principle of Detecting the Distance, Relative Velocity, and Angle (Direction)>

Figure 27A:
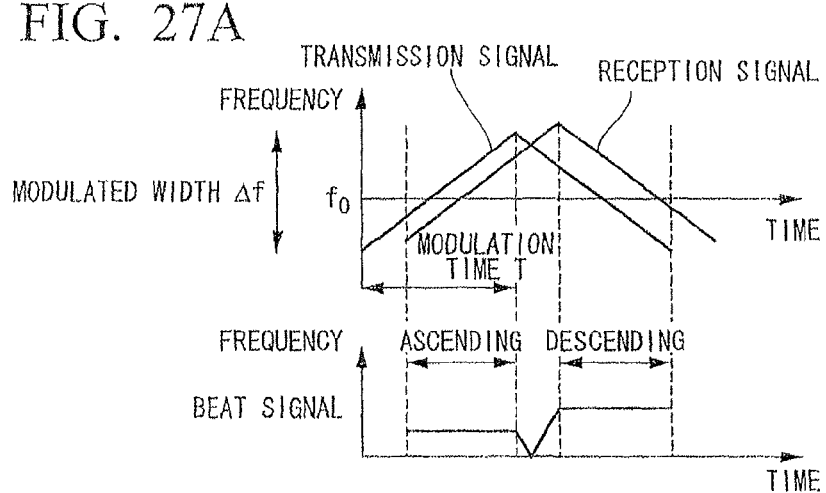
FIG. 27A is a conceptual diagram describing a generation of a beat signal in an ascending region and a descending region of a triangular wave by a transmission wave and a reception wave.
Figure 27B:
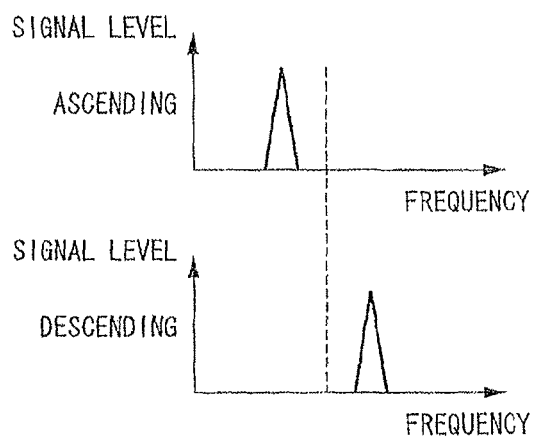
FIG. 27B is a conceptual diagram describing a generation of a beat signal in an ascending region and a descending region of a triangular wave by a transmission wave and a reception wave.

Next, the principle of detecting a distance between the electronic scanning type radar device and a target, a relative velocity, and an angle (direction) is briefly described using FIGS. 27A and 27B. This principle is utilized by the signal processing unit 120 in the fifth embodiment.

FIGS. 27A and 27B show a transmission signal, which was obtained by the VCO 110 frequency-modulating a signal generated by the triangular wave generation unit 109 shown in FIG. 26, and a condition in which the transmission signal is reflected from the target and is entered as a reception signal. The example in FIGS. 27A and 27B shows an instance in which there is one target.

As FIG. 27A indicates, a reception signal, which is a reflection wave from a target, is received, with respect to the transmitted signal, with a lag in the right direction (direction of time lag) in proportion to the distance from the target. In addition, the reception signal fluctuates in the longitudinal direction (frequency direction) with respect to the transmission signal in proportion to the relative velocity with respect to the target. Furthermore, after the frequency modulation (such as a Fourier transform, DTC, Hadamard transform, and wavelet transformation) of the beat signal obtained in FIG. 27A, the signal has a peak value in each of the ascending region and the descending region, as shown in FIG. 27B, when there is one target. Here, the horizontal axis of FIG. 27B represents the frequency, and the vertical axis represents the intensity.

The frequency resolution processing unit 122 performs a frequency resolution on each of the ascending portion (ascending) and the descending portion (descending) of the triangular wave from the sampled data of the beat signal stored in the memory 121. For example, the frequency resolution processing unit 122 performs a frequency modulation into a discrete time by, for example, a Fourier transform.

As a result, in the ascending portion and the descending portion, a graph of the signal level for each beat frequency, which was frequency-resolved in each of the ascending portion and in the descending portion, is obtained, as shown in FIG. 27B.

Then, the peak detection unit 123 detects the peak value from a signal level for each beat frequency shown in FIG. 27B, and detects the existence of a target. At the same time, the peak detection unit 123 outputs the beat frequency (both the ascending portion and the descending portion) of the peak value as a target frequency.

Next, the distance detection unit 125 computes the distance from Equation (11) shown below from the target frequency $fu$ of the ascending portion and a target frequency $fd$ of the descending portion inputted from the peak combination unit 124.

(Equation 11)

$$r=\{C \cdot T/(2 \cdot \Delta f)\} \cdot \{(fu+fd)/2\} \quad (11)$$

Further, the velocity detection unit 126 computes the relative velocity from Equation (12) show below from the target frequency $fu$ of the ascending portion and the target frequency $fd$ of the descending portion inputted from the peak combination unit 124.

(Equation 12)

$$v=\{C/(2 \cdot f0)\} \cdot \{(fu-fd)/2\} \quad (12)$$

In the above equations for computing the distance r and the relative velocity v, C: optical velocity $\Delta f$: width of the frequency modulation of the triangular wave $f0$: central frequency of the triangular wave T: modulation time (ascending portion/descending portion)

Figure 28:
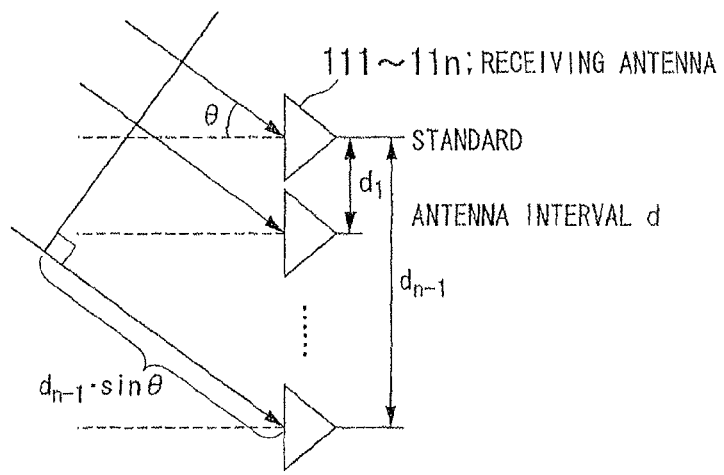
FIG. 28 is a conceptual diagram describing a reception wave by a reception antenna.

$fu$: target frequency in the ascending portion $fd$: target frequency in the descending portion Next, the reception antenna 111~11$n$ according to the fifth embodiment is an array-type antenna which is placed at an interval d, as shown in FIG. 28.

An incoming wave from a target (incident wave, which is a reflection wave from the target with respect to the transmission wave transmitted by the transmission antenna 103) enters the reception antenna 111~11$n$ from a direction at an angle of $\theta$ degrees from the axis perpendicular to the surface of the antenna which is lined up.

At this time, the incoming wave is received by the reception antenna 111~11$n$ at the same angle.

A phase difference "$d_{n-1} \cdot \sin \theta$," which is obtained by this same angle such as the angle $\theta$ and the interval d between each antenna, occurs between each adjacent antenna.

This phase difference can be used to perform a digital beam forming (DBF), which is an additional Fourier transform, in the antenna direction, of the value which underwent a frequency resolution processing for each antenna in the temporal direction. The phase difference can also be used to detect the angle $\theta$ in a signal processing of a super resolution algorithm and the like.

<Signal Processing of a Reception Wave by the Signal Processing Unit 120>

Next, the memory 121 stores a time-series data (the ascending portion and the descending portion), which was obtained by A/D modulating the reception signal by the ADC 107 with respect to the wave form storing region, so that each time-series data corresponds to each antenna 111~11$n$. For example, when 256 pieces are sampled in each of the ascending portion and the descending portion, 2×256(pieces)× (number of antennas) numbers of data are stored in the wave form storing region.

The frequency resolution processing unit 122 outputs a frequency point indicating a beat frequency, and also outputs a complex number data of the beat frequency. The frequency point is obtained by performing a Fourier transform, for example, and modulating each beat signal corresponding to each of Ch1~Ch$n$ (each antenna 111~11$n$) into a frequency at a predetermined resolution performance. For example, when each of the ascending portion and the descending portion for each antenna has 256 pieces of sampled data, the beat signal is modulated into a beat frequency as a frequency region data of the complex number for each antenna. Thus, the beat signal becomes 128 pieces of complex number data (2×128 pieces× data for the number of antennas) for each of the ascending portion and the descending portion. In addition, the beat frequency is indicated by the frequency point.

Here, the only difference between each of the complex number data for each antenna is the phase difference which depends on the angle θ. The absolute value (such as the reception intensity or the amplitude) of each complex number data on the complex plane is equal.

The peak combination part 124 selects the target frequency and detects the existence of a target for each beat frequency by detecting a beat frequency, which has a peak value exceeding a predetermined value, from a peak of the signal intensity (or the amplitude) using a complex number data with respect to the peak value of each intensity for the ascending region and the descending region of the triangular wave of the beat frequency which was frequency-modulated.

Therefore, the peak detection unit 123 can detect each peak value of the spectrum as a beat frequency, in other words, an existence of a target which depends on the distance, by converting the complex number data for either one of the antennas, or the added value of the complex number data for all of the antennas, into a frequency spectrum. By the addition of the complex number data for all of the antennas, the noise element is averaged, and the SN ratio increases.

Figure 29:
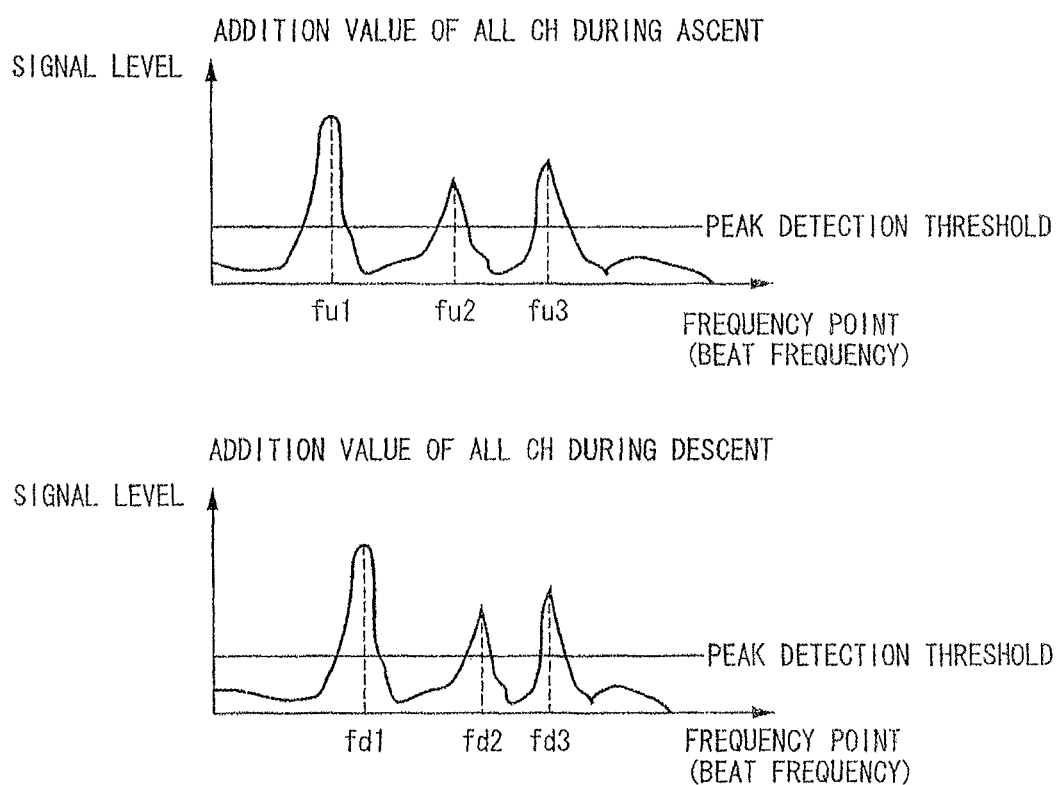
FIG. 29 is a graph showing a beat frequency (horizontal axis) and its peak value (vertical axis) which is a result of a frequency resolution of a beat signal.

The peak combination unit 124 combines the beat frequency and its peak value, entered by the peak detection unit 123 and shown in FIG. 29, with a beat frequency of each ascending region and the descending region and its peak value, in a matrix fashion in a round-robin matter. In other words, the peak combination unit 124 combines all of the beat frequencies in each of the ascending region and the descending direction. Thus, the peak combination unit 123 outputs, in series, to the distance detection unit 125 and the velocity detection unit 126, and confirms the combination at the pair confirmation unit 127. Here, the horizontal axis of FIG. 29 indicates the frequency point of the beat frequency, while the vertical axis indicates the level (intensity) of the signal.

The distance detection unit 125 computes the distance r to the target based on a value obtained by adding the beat frequency of the combination for each ascending region and the descending region, which are inputted in series.

Further, the velocity detection unit 126 computes the relative velocity v with respect to the target by the difference in the beat frequency of the combination for each ascending region and the descending region, which are inputted in series.

In addition, the correlation matrix computation unit 128 selects the beat frequency, which underwent a frequency resolution by the frequency resolution processing unit 122, according to the frequency point of the beat frequency of the pair whose combination was confirmed. Thus, the correlation matrix computation unit 128 generates a correlation matrix corresponding to the beat frequency of either one of the ascending portion and the descending portion (in the fifth embodiment, the descending portion) regarding this combination.

<Super-Resolution Algorithm in the Estimation of the Arrival Direction of an Incoming Wave>

Figure 30:
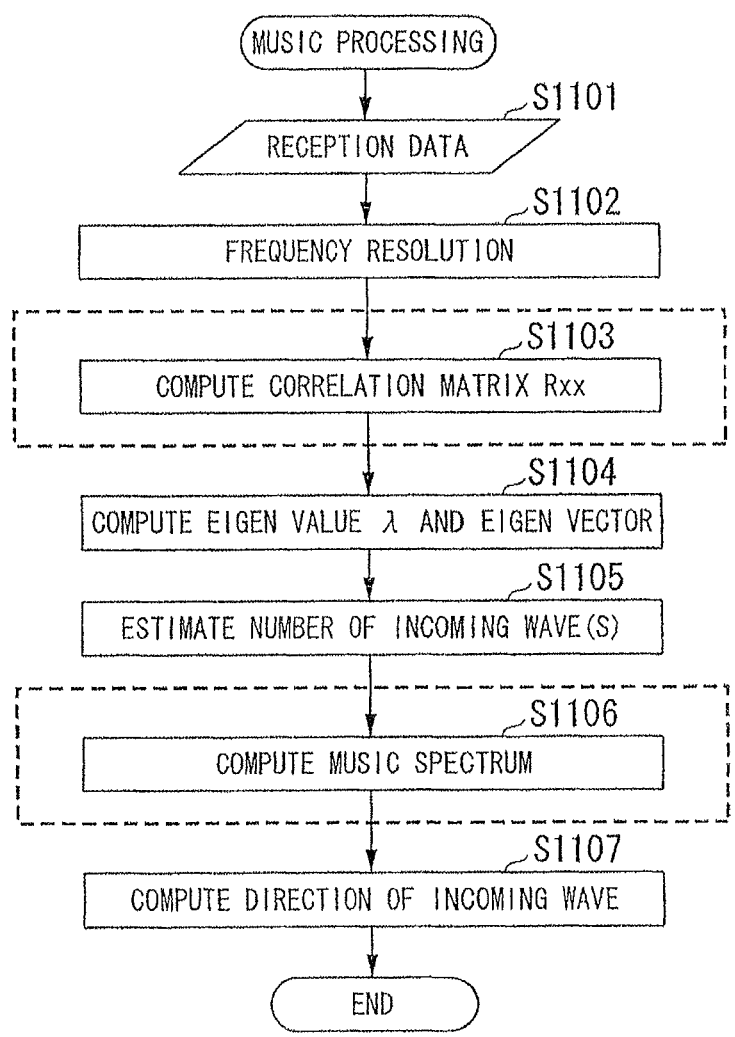
FIG. 30 is a flowchart describing a MUSIC operation.

Next, a super-resolution algorithm estimating the arrival direction of an incoming wave according to the correlation matrix computation unit 128, the eigen value computation unit 131, the determination unit 132, and the direction detection unit 130, is described with MUSIC as an example with reference to FIG. 30. FIG. 30 is a flowchart describing the flow of the operating process of a general MUSIC Method. Since the process of the MUSIC Method itself is used in general (for example, in Non-Patent Documents 1 and 2, or, Patent Documents 3, 4, 8, and 9), only the aspects of the MUSIC Method which are necessary in the fifth embodiment are described.

The frequency resolution processing unit 122 reads in the beat signal of the reception wave stored in the memory 121 (step S1101), and performs a frequency-modulation on the beat signal for each antenna (step S1102).

Further, as described above, the correlation matrix computation unit 128 reads in the complex number frequency region data (hereinafter referred to as complex number data) by making a selection from the frequency resolution processing unit 122. The complex number data has undergone a frequency resolution, and corresponds to the frequency point of the target in the descending region for which a pair has been confirmed by the pair confirmation unit 127. In addition, regarding the descending region, the correlation matrix computation unit 128 generates a correlation matrix indicating the correlation for each antenna (step S1103).

Figure 31A:
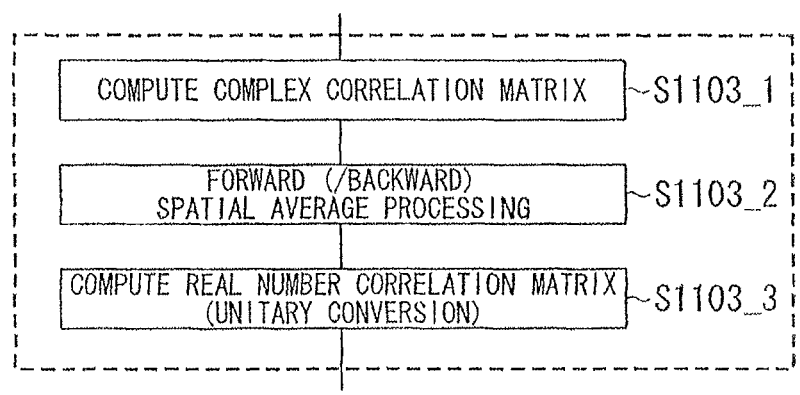
FIG. 31A is a flowchart showing a substep executed in step S1103 of the flowchart shown in FIG. 30.
Figure 31B:
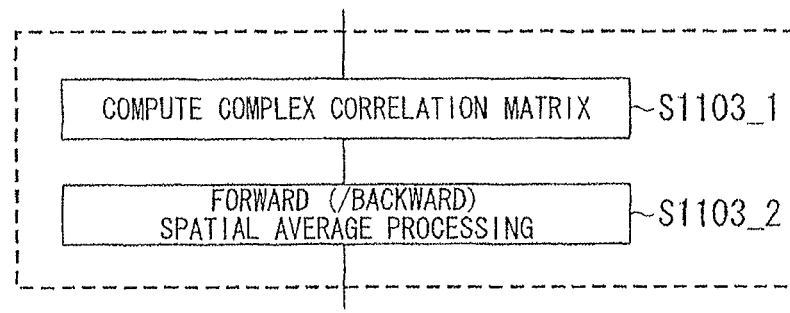
FIG. 31B is a flowchart showing a substep executed in step S1103 of the flowchart shown in FIG. 30.

The generation of the correlation matrix by the correlation matrix computation unit 128 in step S1103 is conducted, for example, according to the methods shown in FIGS. 31A and 31B. The methods shown in FIGS. 31A and 31B are briefly described below.

According to the method shown in FIG. 31A, the correlation matrix computation unit 128 generates a correlation matrix (complex correlation matrix) based on the bare complex number data (step S1103_1), and processes with a forward-only spatial average (Forward Spatial Averaging Method) or a forward-and-backward spatial average (Forward-Backward Spatial Averaging Method) (step S1103_2).

Spatial averaging refers to a process in which the number of antennas in the array of the original reception antennas is divided into subarrays which has a lesser amount of antennas, and the subarrays are averaged. The phase relation of waves having a correlation differs according to the position at which the wave was received. Thus, according to this basic principle of spatial averaging, the correlation matrix is obtained by moving the reception point in an appropriate manner. In this way, the basic principle of spatial averaging is such that the correlation of the correlated interference wave is restrained due to the effect of the averaging process. In general, the averaging is conducted by taking out a plurality of subarrays having the same alignment from the overall array of reception antennas without moving the array of reception antennas, and then obtaining the average of each correlation matrix.

Figure 32:
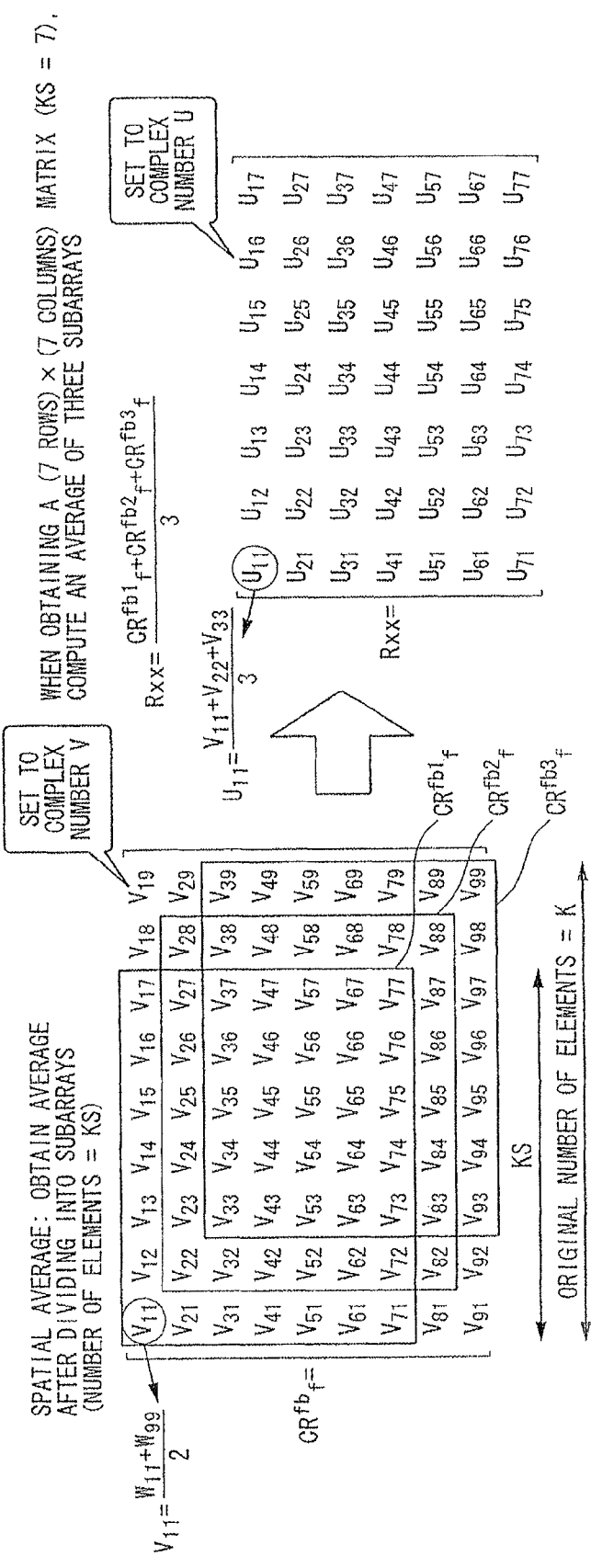
FIG. 32 is a conceptual diagram describing a process executed when a spatial average of a correlation matrix is computed.

For example, as shown in FIG. 32, when the array of reception antennas 111~111n is such that there are nine antennas (n=9), the correlation matrix computation unit 128 obtains the backward correlation matrix $CR^b_f$ in the latter equation (6) with respect to the correlation matrix $CR^f_f$ in the forward equation (5) indicated below. Thus, the correlation matrix computation unit 128 carries out an averaging procedure of the forward/backward elements by averaging the corresponding elements in the correlation matrix in equation (5) and the backward correlation matrix in equation (6) according to the following equation (13).

(Equation 13)

$$CR^{fb}_f = (CR^f_f + CR^b_f)/2 \qquad (13)$$

In this way, the correlation matrix computation unit 128 divides the correlation matrix $CR^{fb}_f$ obtained by the forward/backward averaging process, into subarrays, and computes an average. Thus, the correlation matrix computation unit 128 obtains a correlation matrix Rxx which is used to estimate the arrival direction of the reception wave. In other words, the correlation matrix obtained by the forward/backward spatial averaging process can be expressed as follows by Equation (14).

(Equation 14)

$$Rxx(CR^{fb1}_f + cR^{fb2}_f + CR^{fb3}_f)/3 \quad (14)$$

Here, the correlation matrix computation unit 128 obtains the correlation matrix Rxx by dividing the nine reception antennas 111~119 into three subarrays each of which including seven antennas 111~117, 112~118, and 113~119, and by averaging the corresponding elements of each matrix in the subarray.

Meanwhile, in the case of the forward spatial averaging, the matrices from $V_{11}$ to $V_{99}$ can be kept as the matrices from $W_{11}$ to $W_{99}$ in equation (5). Thus, it is not necessary to average each element as shown, for example, in equation (15).

(Equation 15)

$$V_{11} = (W_{11} + W_{99})/2 \quad (15)$$

Regarding the use in which the arrival direction of the reception wave regarding the radar is estimated, all of the incoming reception waves are reflection waves caused by the transmitted transmission wave reflecting from the target. Therefore, the data of the reception waves received by each antenna exhibits a strong correlation with one another. Thus, the results of the eigen value computation in the latter phase are not obtained accurately. In this way, spatial averaging has an effect of restraining the correlation, extracting a self correlation, and accurately estimating the direction of the incoming wave.

Next, the correlation matrix computation unit 128 performs a unitary conversion in order to convert the correlation matrix of complex data, which underwent a spatial averaging process as described above, into a correlation matrix of real numbers.

Here, by converting into a correlation matrix of real numbers, the eigen value computation in a subsequent step which has the heaviest computation load can be executed using real numbers only. In this way, the computation load can be greatly reduced.

Meanwhile, FIG. 31B shows a variation in which the eigen value computation in the subsequent step is executed using complex numbers without converting into a correlation matrix of real numbers by performing a unitary conversion as indicated in FIG. 31A.

Further, in step S1103, regarding the correlation matrix Rxx obtained by the step S1103_3 in FIG. 31A and the step S1103_2 in FIG. 31B, the values of each element can be normalized (i.e., divided by the maximum value) based on the maximum value of the correlation matrix (or the diagonal element of the correlation matrix).

Next, the eigen value computation unit 131 computes the eigen value of the correlation matrix Rxx obtained in step S1103 and its corresponding eigen vector as an eigen value λ and an eigen vector e which satisfies the following characteristic equation, outputs to the direction detection unit 130, and outputs the eigen value λ to the determination unit 132 (step S1104).

(Equation 16)

$$Rxxe = \lambda e \quad (16)$$

Then, based on the eigen value λ obtained above by the eigen value computation unit 131, the determination unit 132 estimates the number of incoming waves necessary to remove the signal component vector (step S1105).

Here, the determination unit 132 performs the above estimation of the incoming wave according to the incoming wave estimation process, described later.

Next, the direction detection unit 130 generates a spectrum of angles by computing an inner product of a vector with only the noise components after removing the signal vector, and a vector for each direction and angle which is predetermined internally (step S1106). As a result, it is possible to associate a null with a directional characteristic to the arrival direction of the incoming wave.

Further, the direction detection unit 130 detects a peak from the spectrum of angles which exceeds a predetermined threshold value. In this way, the direction detection unit 130 detects the peak and computes the direction of the incoming wave (angle θ) (step S1107).

In addition, the direction detection unit 130 can make a conversion to a position in the lateral direction with respect to the vertical axis of the array of antennas of the electronic scanning type radar device based on the angle (i.e., the arrival direction of the reception wave) and the distance computed by the distance detection unit 125.

A standard MUSIC Method has been described above. In the MUSIC spectrum computation in step S1106, it is possible to use a method called the Root-MUSIC Method which computes a solution from the root of the polynomial, instead of a type searching with a direction vector.

In addition, after the step S1107 in FIG. 30, it is possible to add a process computing the received electronic power and deleting an unnecessary wave (data of an unnecessary reception wave).

In other words, the determination unit 132 compares the electronic power indicated in the diagonal component of the matrix S in the following equation with a predetermined threshold value, and detects whether or not the electronic power exceeds the threshold value. Further, the determination unit 132 has a process which makes a determination of necessary reception wave when the electronic power exceeds the threshold value, and, meanwhile, makes a determination of unnecessary reception wave when the electronic power is less than or equal to the threshold value.

(Equation 17)

$$S = (A^H A)^{-1} A^H (Rxx - \sigma^2 I) A (A^H A)^{-1} \quad (17)$$

Here, S indicates the correlation matrix of the signal of the reception wave, A indicates the directional matrix, $A^H$ indicates the conjugate transpose matrix of A, I indicates the unit matrix, Rxx indicates the correlation matrix computed by the correlation matrix computation unit 128, and $\sigma^2$ indicates the dispersion of the noise vector.

By adding the process, described above, of computing the received electronic power and deleting an unnecessary wave, it is possible to delete the unnecessary incoming reception wave, when the number of reception waves was overestimated in the estimation of the number of reception waves in step S1105. Therefore, it is possible to retain a margin of the setting of the threshold value λth and the threshold value λth' in the estimation process of the number of incoming waves described below (in other words, even if each threshold value is not set rigidly, the reception wave that does not have an adequate reception electric power is deleted).

<Incoming Wave Estimation Process>

Figure 33:
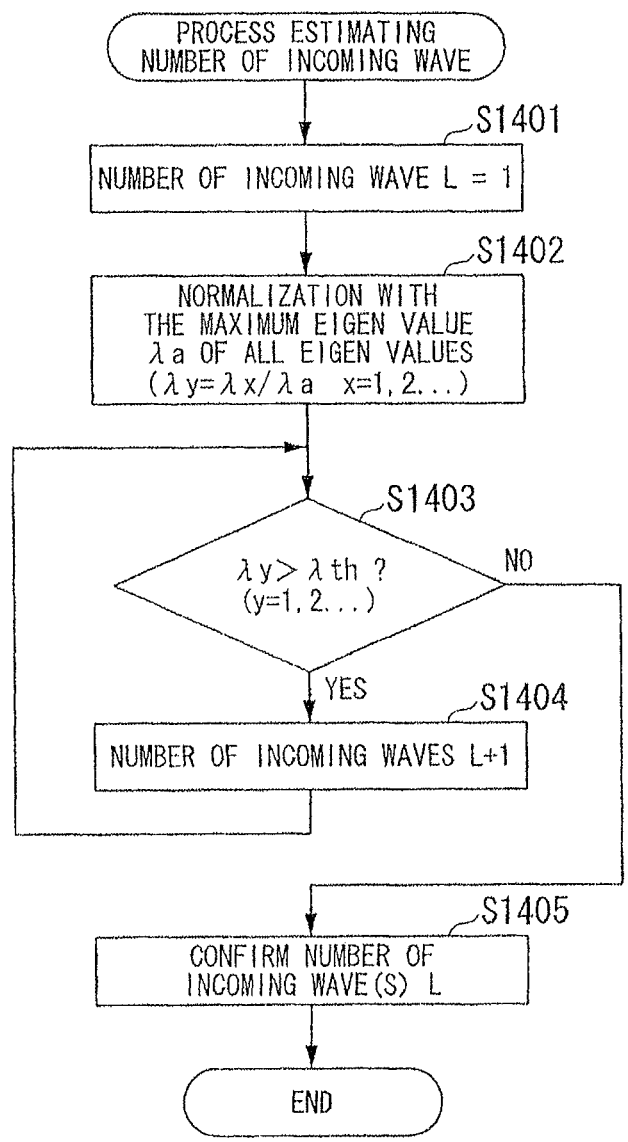
FIG. 33 is a flowchart describing in detail a process estimating a number of incoming waves, executed in step S1105 shown in FIG. 30.

Next, an incoming wave estimation process in step S1105 of FIG. 30 is described with reference to FIG. 33. This incoming wave estimation process is a process characteristic of the fifth embodiment. The process of estimating the number of incoming waves, shown in the flowchart in this FIG. 33, is a process in which primarily the determination unit 132 in FIG. 26 uses the eigen value inputted from the eigen value computation unit 131.

As already described in the flowchart in FIG. 30, at the time when step S1105 in FIG. 30 begins to be executed, the peak combination unit 124 has detected the target, and the eigen value computation unit 131 has already computed the eigen value and the eigen vector of the correlation matrix Rxx.

Therefore, the determination unit 132 assumes that there is at least one incoming wave, and therefore enters the number 1 into the number of incoming waves L (step S1401).

Then, the determination unit 132 detects, from among the eigen values obtained by the correlation matrix, a maximum eigen value λa which has a maximum value. The determination unit 132 next performs a normalization of the eigen value λx by dividing all of the eigen values λx (x=1, 2, 3) by the maximum eigen value λa (determining the ratio between the maximum eigen value λa and all of the eigen values λx which includes this maximum eigen value λa). In this way, the determination unit 132 sets λy (y=1, 2, 3) as the normalized eigen value (step S1402). At this time, the determination unit 132 rearranges the normalized eigen values λy from the largest to the smallest.

Next, the determination unit 132 compares in series, the predetermined threshold λth and the eigen value λy, in the order from the largest of the eigen value λy (step S1403). Then, when the determination unit 132 detects that the eigen value λy is greater than or equal to the threshold value λth, the determination unit 132 proceeds the operation to step S1404.

Then, the determination unit 132 increments the number of incoming waves L (by adding 1), and returns the operation to step S1403.

Meanwhile, when the determination unit 132 detects that the eigen value λy is less than the threshold value λth, it is no longer necessary to later make a comparison between the eigen value λy and the threshold value λth (because the subsequent eigen value λy is smaller than the eigen value λy which is presently being compared). Therefore, the determination unit 132 proceeds the operation to step S1405 (step S1403).

Then, the determination unit 132 confirms the present number of incoming waves L as the detected number of incoming waves L. The determination unit 132 next outputs this confirmed number of incoming waves L to the direction detection unit 130 (step S1405).

In this process estimating the number of incoming waves, the determination unit 132 performs the process from step S1401 to S1405 described above, every time an eigen value is inputted from the eigen value computation unit 131.

Figure 34:
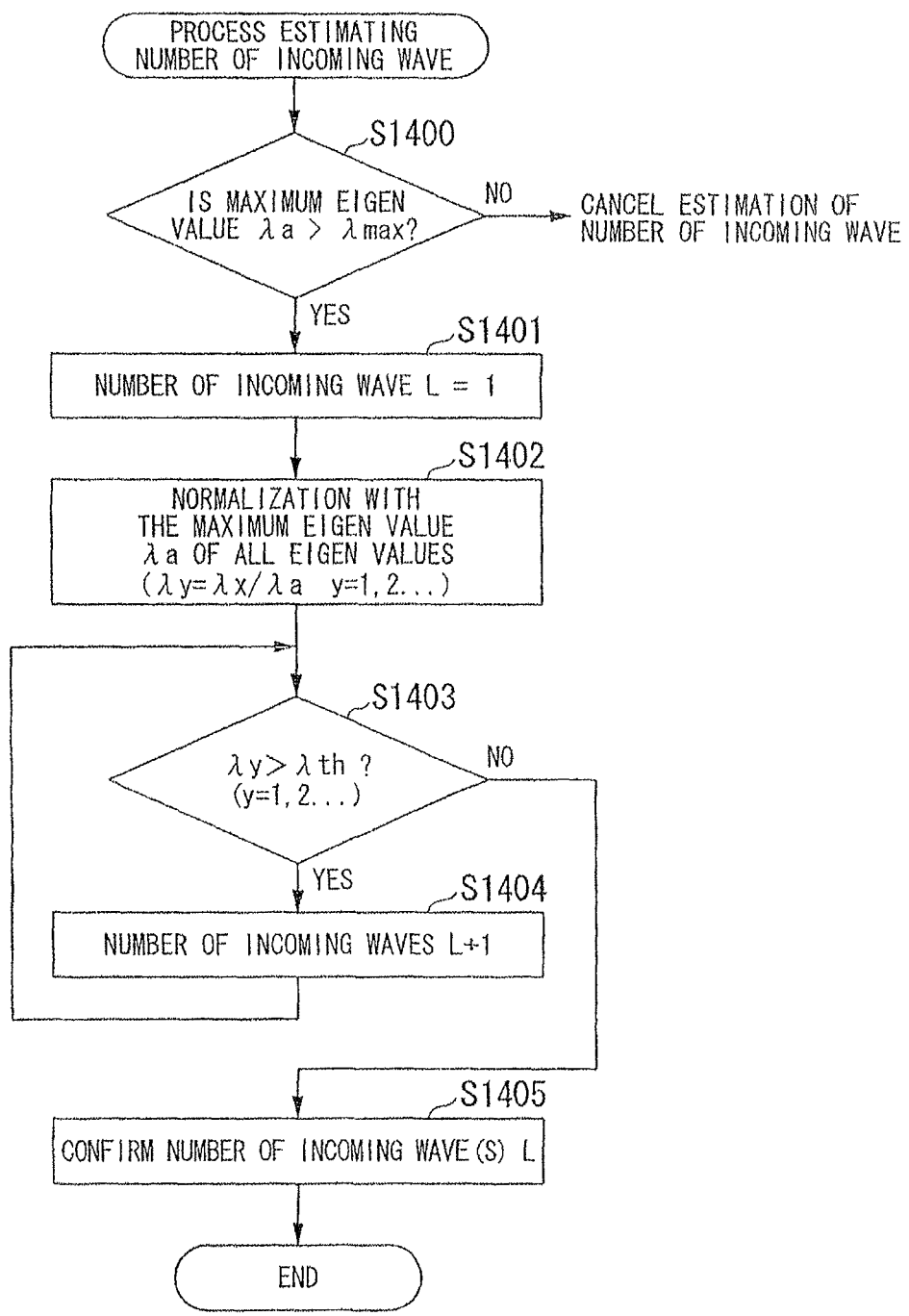
FIG. 34 is a flowchart describing in detail another process estimating a number of incoming waves, executed in step S1105 shown in FIG. 30.

In addition, as shown in the flowchart in FIG. 34, before the process of estimating the number of incoming waves is executed, the determination unit 132 detects the maximum eigen value λa from the eigen value λx inputted from the eigen value computation unit 131.

Further, the determination unit 132 detects whether or not this detected maximum eigen value λa is greater than or equal to a predetermined threshold λmax (step S1400). When the determination unit 132 detects that the maximum eigen value λa is greater than or equal to the threshold value λmax, the determination unit 132 performs step S1401 shown in FIG. 33 and the steps subsequent to step S1401 in the process for determining the number of incoming waves. Meanwhile, when the determination unit 132 detects that the maximum eigen value λa is less than the threshold value λmax, the determination unit 132 does not execute the process for estimating the number of incoming waves. Thus, the determination unit 132 does not output the number of incoming waves L to the direction detection unit 130.

In other words, even in embodiments such that an eigen value is obtained from a correlation matrix of the entire frequency point or within a range of the frequency point, it is possible to cancel (halt) the process of estimating the number of incoming waves during the estimation of the number of incoming waves. Thus, even if the level of reception is low due to the influence of multipass on the road surface, it is possible to avoid making an erroneous estimation of the number of incoming waves.

Figure 35:
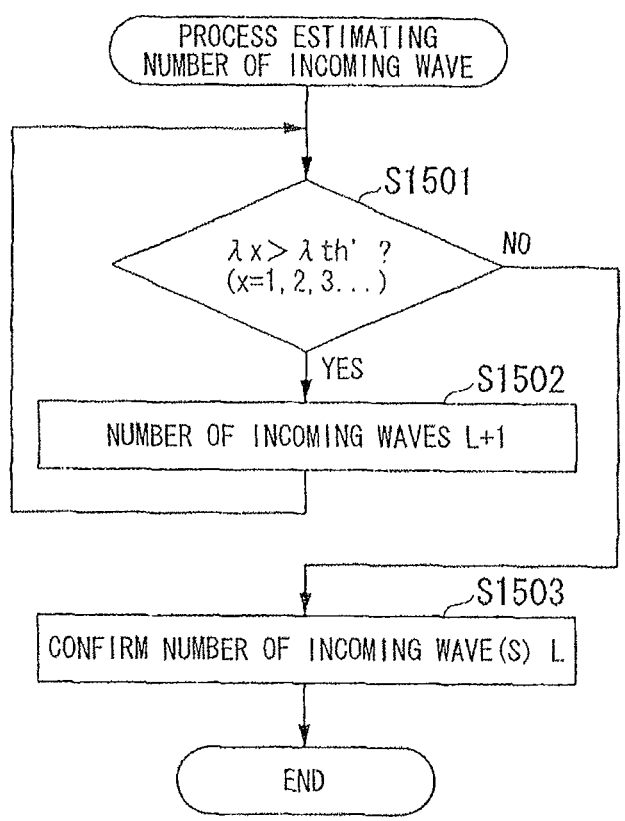
FIG. 35 is a flowchart describing in detail another process estimating a number of incoming waves, executed in step S1105 shown in FIG. 30.

Next, another process for estimating a number of an incoming wave is described with reference to the flowchart shown in FIG. 35. This FIG. 35 is different from the flowchart shown in FIG. 33 and FIG. 34 in that a normalization is not made after the eigen value is computed. Instead, as described in the description of the correlation matrix computation unit 128, a configuration may be made such that the correlation matrix computation unit 128 performs a normalization by dividing each element of the correlation matrix Rxx by the maximum value of the diagonal element among each element of the correlation matrix Rxx, and then, the eigen value computation unit 131 computes the eigen value and the eigen vector.

In addition, instead of normalizing the correlation matrix Rxx at the correlation matrix computation unit 128, the normalization process may be carried out before the eigen value computation unit 131 computes the eigen value, and then, the eigen value and the eigen vector may be computed.

As a result, the accuracy of the floating point calculation of the eigen value computation increases. In addition, it is possible to reduce the number of computations necessary for the conversion of the arithmetic algorithm (such as the Jacobi Method and the QR Method) of the eigen value and the eigen vector. In this way, it is possible to reduce the time spent on the calculation. Further, it is not necessary to normalize the eigen value in the process for estimating the number of incoming waves. In addition, among each element of the correlation matrix Rxx, when the maximum value of all of the elements including the diagonal element is set to be the standard for the normalization, the normalization process of the eigen value in step S1402 shown in FIG. 33 may be executed before the step S1501 shown in FIG. 35.

In either case, the eigen value λx (x=1, 2, 3, ...) computed by the normalized correlation matrix is inputted into the determination unit 132, and the process for determining the number of incoming waves shown in the flowchart in FIG. 35 begins. At this time, the determination unit 132 resets the number of incoming waves L to 0.

The determination unit 132 sorts the inputted eigen value λx from the largest to the smallest. Then, the determination unit 132 makes a comparison between each eigen value λx and the predetermined threshold value λth' in the order from the largest eigen value λx to the smallest (step S1501).

At this time, when the determination unit 132 detects that the eigen value λx is greater than or equal to the predetermined threshold value λth', the determination unit 132 proceeds the operation to step S1502. Meanwhile, when the determination unit 132 finds that the eigen value λx is less than the predetermined threshold value λth', the determination unit 132 proceeds the operation to step S1503.

Further, when the determination unit 132 finds that the eigen value λx is greater than or equal to the predetermined threshold value λth', the determination unit 132 increments the number of incoming waves L (step S1502), and returns the operation to step S1501.

Further, when the eigen value λx is less than the predetermined threshold value λth', the determination unit 132 confirms the present number of incoming waves L as the estimated number of incoming waves, and outputs to the direction detection unit 130 (step S1503).

In this process for estimating the number of incoming waves, the determination unit 132 executes the above described process from step S1501 to step S1503 every time an eigen value is inputted from the eigen value computation unit 131.

Figure 36:
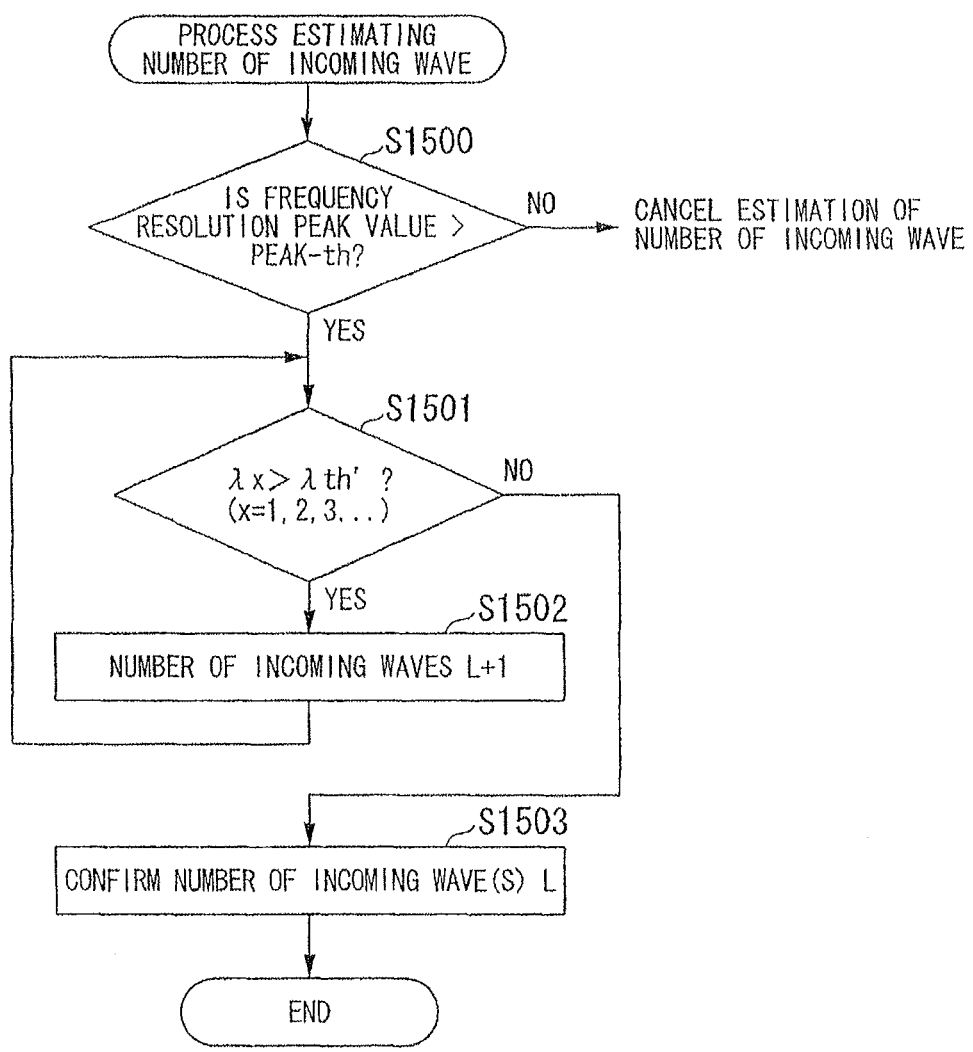
FIG. 36 is a flowchart describing in detail another process estimating a number of incoming waves, executed in step S1105 shown in FIG. 30.

Furthermore, as shown in FIG. 36, it is possible to place a step S1500 before the comparison process of step S1501 in the flowchart shown in FIG. 35. In the step S1500, the peak value detected by the peak detection unit 123 after the frequency resolution is compared with the predetermined threshold value PEAK-th.

Further, the determination unit 132 detects whether or not the peak value inputted from the peak detection unit 123 is greater than or equal to a predetermined threshold PEAK-th (step S1500). When the determination unit 132 detects that the peak value is greater than or equal to the threshold value PEAK-th, the determination unit 132 performs step S1501 shown in FIG. 35 and the steps subsequent to step S1501 in the process for determining the number of incoming waves. Meanwhile, when the determination unit 132 detects that the peak value is less than the threshold value PEAK-th, the determination unit 132 does not execute the process for estimating the number of incoming waves. Thus, the determination unit 132 does not output the number of incoming waves L to the direction detection unit 130.

Figure 37:
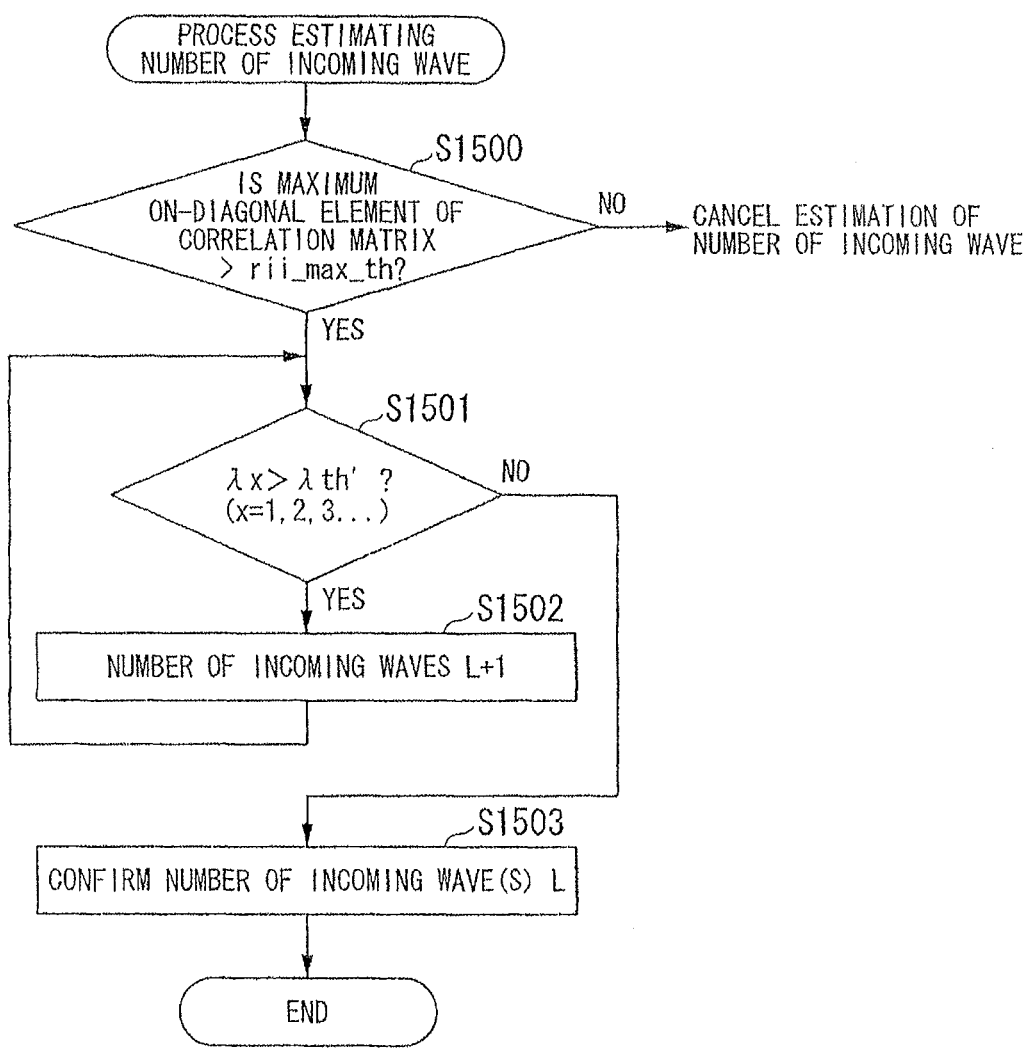
FIG. 37 is a flowchart describing in detail another process estimating a number of incoming waves, executed in step S1105 shown in FIG. 30.

In other words, even in embodiments such that an eigen value is obtained from a correlation matrix of the entire frequency point or within a specific range of the frequency point, it is possible to cancel (halt) the process of estimating the number of incoming waves during the estimation of the number of incoming waves. Thus, even if the level of reception is low due to the influence of multipass on the road surface, it is possible to avoid making an erroneous estimation of the number of incoming waves. Moreover, as shown in FIG. 37, instead of the step S1500 in FIG. 36, it is possible to place a step S1500 in which the maximum value of the diagonal element of the obtained correlation matrix is compared with a predetermined threshold value.

Figure 39A:
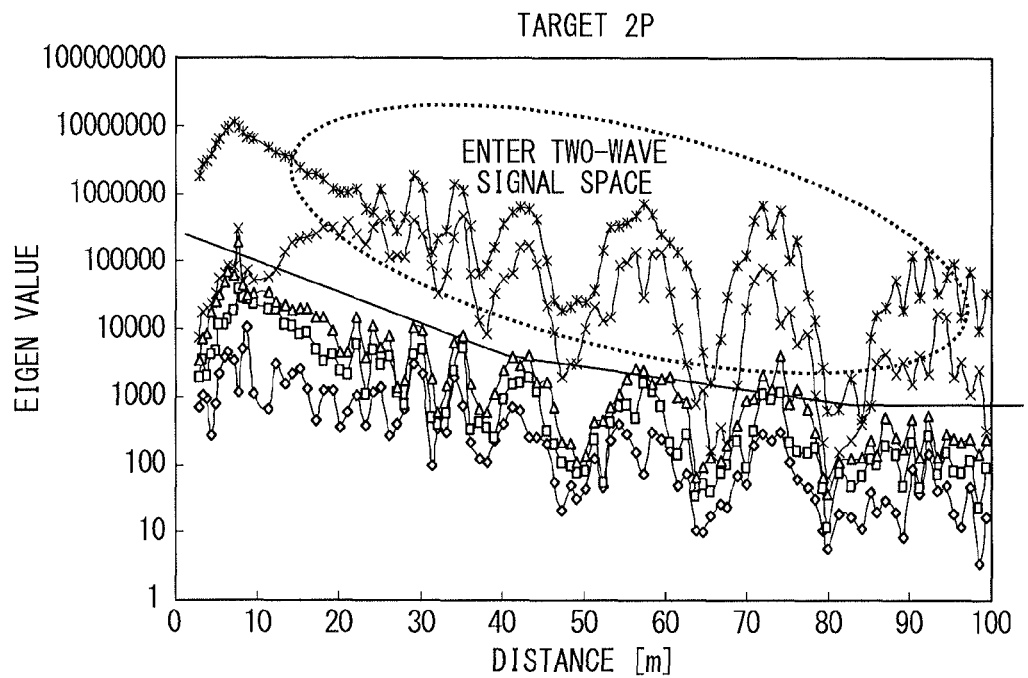
FIG. 39A is a graph showing a distance when a number of incoming waves is 2, also showing a correspondence between an eigen value and each distance.
Figure 39B:
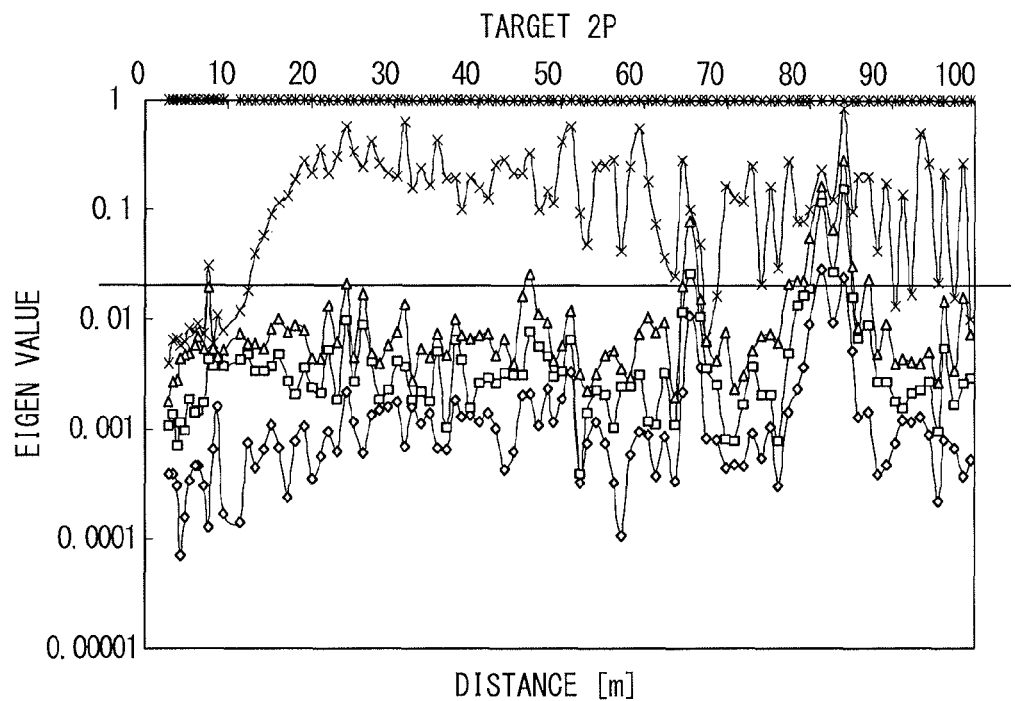
FIG. 39B is a graph showing a distance when a number of incoming waves is 2, also showing a correspondence between an eigen value and each distance.

FIGS. 38A, 38B, 38C, and FIGS. 39A and 39B are graphs showing a condition in which the distribution of the eigen values actually fluctuates for each distance (for each beat frequency). FIGS. 38A, 38B, and 38C present the instance in which one wave has arrived (the number of incoming wave being 1). FIGS. 39A and 39B present the instance in which two waves have arrived (the number of incoming waves being 2).

Here, the horizontal axis of FIGS. 38A and 39A indicates the distance, while the vertical axis indicates the eigen value. In addition, the horizontal axis of FIGS. 38B and 39B indicates the distance, while the vertical axis indicates the value obtained by normalizing the other eigen value λx with the maximum eigen value λa.

FIG. 38A and FIG. 39A indicate that, in an area within a distance of approximately 65 m and 80 m from the target, a region exists such that the eigen value becomes small due to multipass.

In addition, as shown in FIG. 38B and FIG. 39B, even if the value is normalized, the fluctuation of the normalized value itself becomes large, and an erroneous estimation of the incoming waves may be made when the incoming wave estimation is conducted at a region under the influence of multipass.

Therefore, according to the processes of step S1400 of FIG. 34, step S1500 of FIG. 36, and step S1500 of FIG. 37, a configuration is introduced in which an incoming wave estimation is not made. Thus, the estimation of the number of incoming waves and the detection of the direction according to this correlation matrix may be cancelled. Therefore, an erroneous detection result of the direction is not calculated.

FIG. 38C shows the value of the eigen value λx at a distance of 100 (m) in FIG. 39A, in which the number of incoming wave is 1. Thus, FIG. 38C shows the difference between the values of the eigen value λ1 in the signal space and the eigen value in another noise space.

Conventionally, the estimation of the incoming wave was conducted by setting a threshold value Th for each distance by using the eigen values of FIG. 38A and FIG. 39A. However, in the fifth embodiment, the eigen value is normalized, and a comparison with the threshold value Th is made, as shown in FIG. 38B and FIG. 39B. Therefore, as already described, the threshold value λth (or the threshold value λth') is set as one value which is uniform for all distances. Thus, a comparison is made with the eigen value for all distances. Therefore, the estimation of the number of incoming waves is made easily.

In addition, when the estimation of the number of incoming waves cannot be conducted, the direction detection unit 130 copes with this situation by way of a method estimating the present distance based on the past distance, the relative velocity, and the direction.

Sixth Embodiment

Figure 40:
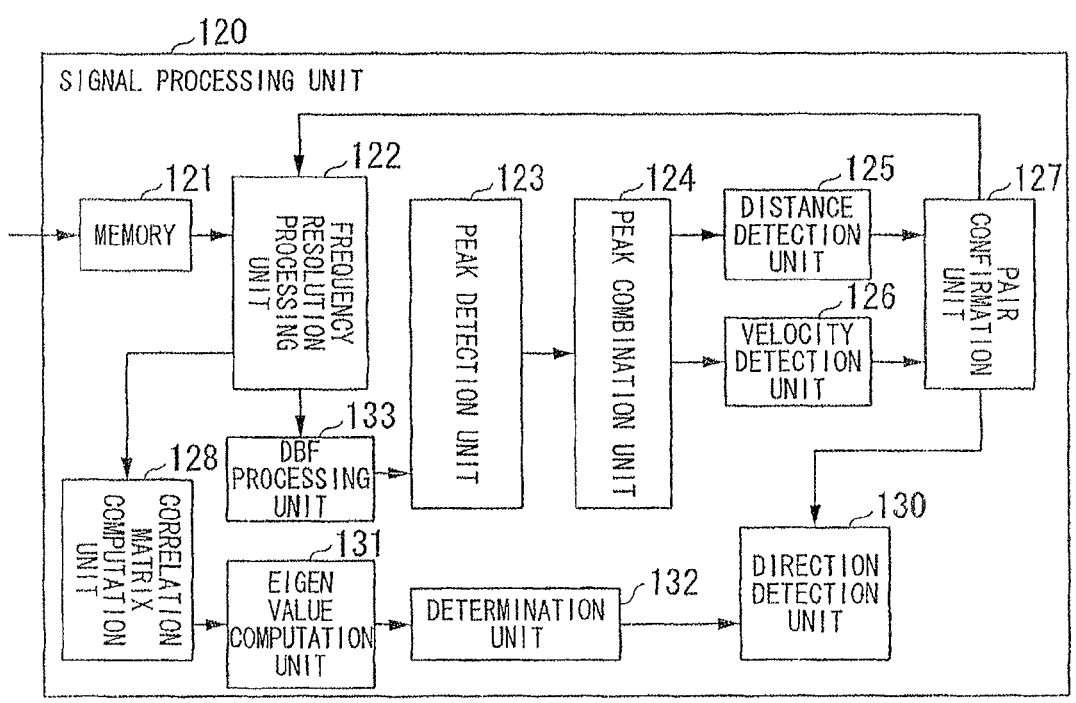
FIG. 40 is a block diagram showing an example of a configuration of a signal processing unit 120 of an electronic scanning type radar device according to a sixth embodiment of the present invention.

Hereinafter, an electronic scanning type radar device according to a sixth embodiment of the present invention is described with reference to FIG. 40. FIG. 40 is a block diagram showing an example of a configuration of a signal processing unit 120 of the electronic scanning type radar device according to the sixth embodiment.

The same reference numeral is used for the configuration which is similar to the fifth embodiment shown in FIG. 26. Hereinafter, the aspects which are different from the fifth embodiment are described.

According to this sixth embodiment, different from the fifth embodiment, an estimation of a direction is first made using a DBF (Digital Beam Forming) which has a lower resolution performance compared to a super-resolution algorithm such as the MUSIC Method. Next, a super-resolution algorithm is used to estimate the direction from a correlation matrix which has undergone an averaging process. The same reference numeral is used for the configuration which is similar to the fifth embodiment shown in FIG. 26. Hereinafter, the aspects which are different from the fifth embodiment are described.

As shown in FIG. 40, a DBF processing unit 133 is provided between the frequency dissolution processing unit 122 in the fifth embodiment shown in FIG. 26 and the peak detection unit 123. As described above, the sixth embodiment differs from the fifth embodiment in that a direction can be estimated in advance at the level of each target cluster, although at a comparatively far distance, a fine separation cannot be made for each target.

Similar to the fifth embodiment, the frequency dissolution processing unit 122 performs a frequency resolution on the inputted beat signal (temporal axis Fourier transform), and outputs a frequency point indicating the beat frequency and the complex number data to the DBF processing unit 133.

Next, the DBF processing unit 133 performs a Fourier transform on the inputted complex number data corresponding to each antenna in the direction in which the antenna is aligned. In other words, the DBF processing unit 133 performs a spatial axis Fourier transform.

Then, the DBF processing unit 133 computes the spatial complex number data for each angular channel corresponding to the angular resolution, which, said differently, depends on the angle, and outputs to the peak detection unit 123 for each beat frequency.

Therefore, the spectrum, indicated by the spatial complex number data (with a unit of beat frequency) for each angular channel outputted from the DBF processing unit 133, depends on the estimation of the arrival direction of the reception wave by the beam scanning resolution.

In addition, since a Fourier transform is conducted in the direction in which the antenna is aligned, the same effect can be obtained as when the complex number data is added between the angular channels. Furthermore, the S/N ratio of the complex number data for each angular channel is improved. Thus, the accuracy with which the peak value is detected can be enhanced in a manner similar to the fifth embodiment.

As in the fifth embodiment, the above described complex number data and the spatial complex number data are computed in both the ascending region and the descending region of the triangular wave.

Figure 41A:
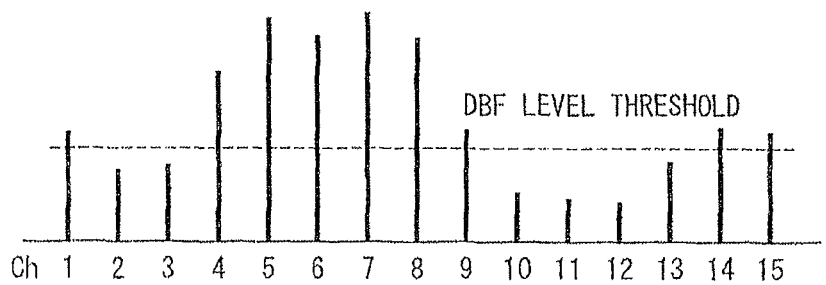
FIG. 41A is a graph describing a focusing process of an angle range for computing a MUSIC spectrum using a DBF process.
Figure 42A:
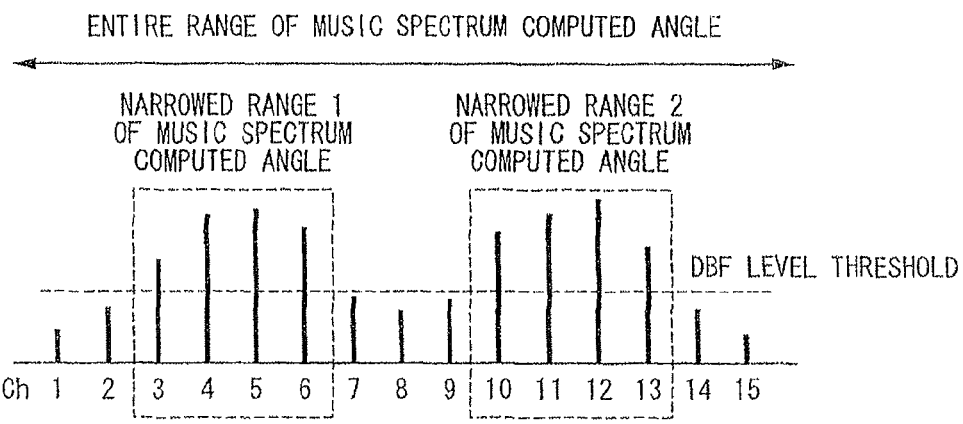
FIG. 42A is a graph describing a focusing process of an angle range for computing a MUSIC spectrum using a DBF process.

Next, the peak detection unit 123 performs a detection of the peak value based on the spectrum intensity indicated by the spatial complex number data for each angular channel which is inputted. The peak detection unit 123 then outputs to the peak combination unit 124. The peak detection unit 124 also outputs the angular channel number (or region) in which the target cluster exists, as information of the direction with a rough (low) resolution level, to the direction detection unit 130. By outputting an angular channel in which a target exists, as shown in FIG. 41A and FIG. 42A, it is possible to narrow down the detection range of the direction to a narrow angular range when the MUSIC spectrum is computed, compared to the above instance when there is no information on the angular channel. Therefore, it is possible to enhance the resolution of the spectrum computation of MUSIC.

Here, FIG. 41A and FIG. 42A shows an instance in which a Fourier transform of 16 bites was conducted in the direction of the channel (in the direction of the antenna) so that the angular dependency Ch (channel) after the DBF becomes 15Ch. Here, in the MUSIC process, when the value of the spectrum intensity has exceeded the DBF level threshold value in the range of 4Ch consecutive Ch (angles), the direction detection unit 130 makes a setting as the above described narrow range, and performs an analysis of the detection range of the direction in this angular range with a high level of accuracy. Further, in FIG. 42A, there are two different groups of the spectrum intensity values which exceed the DBF level threshold value in 4Ch consecutive angular range. Therefore, in each range (the angular ranges of Ch3~Ch6 and Ch10~Ch13), the direction detection unit 130 narrows down the angular range for which the MUSIC spectrum is computed.

Similar to the fifth embodiment, the peak combination unit 124 combines a beat frequency in the ascending region and the descending region and its peak value, and outputs to the distance detection unit 125 and the velocity detection unit 126. The combination is confirmed by the pair combination unit 127.

At this time, the peak combination unit 124 uses the angular channel as the information for the combination. Thus, the peak combination unit 124 outputs the combination of the beat frequency in the ascending region and the descending region to the distance detection unit 125 and the velocity detection unit 126.

In FIGS. 41A, 41B, 41C, and FIGS. 42A, 42B, and 42C, the horizontal axis shows the Ch number of the angular channel, while the vertical axis shows the spectrum intensity for each Ch which was computed during the DBF process.

Seventh Embodiment

Figure 43:
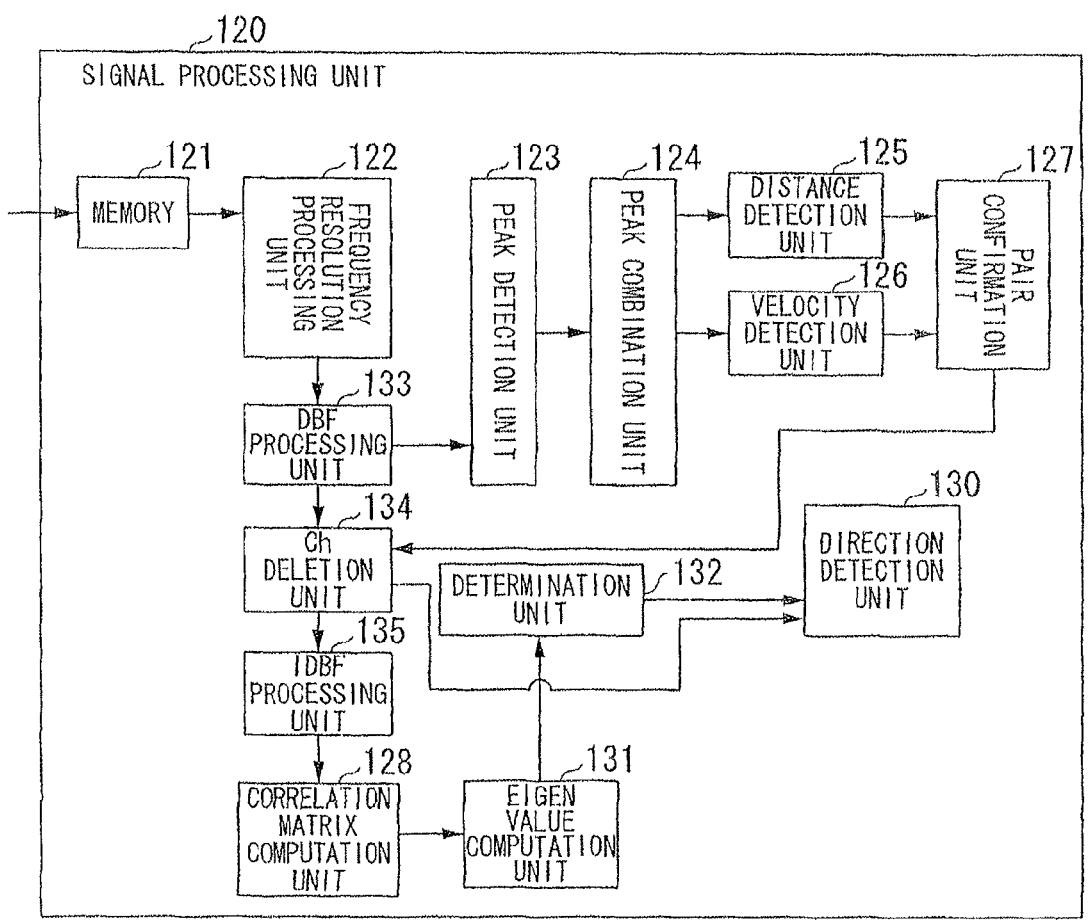
FIG. 43 is a block diagram showing an example of a configuration of a signal processing unit 120 of an electronic scanning type radar device according to a seventh embodiment of the present invention.

Hereinafter, an electronic scanning type radar device according to a seventh embodiment of the present invention is described with reference to FIG. 43. FIG. 43 is a block diagram showing an example of a configuration of the electronic scanning type radar device according to the seventh embodiment.

According to this seventh embodiment, similar to the sixth embodiment, an estimation of a direction is first made using a DBF (Digital Beam Forming) which has a lower resolution performance compared to a super-resolution algorithm such as the MUSIC Method. In this way, the angular range of the target is narrowed, an IDBF (inverse DBF, in other words, an inverse spatial axis Fourier transform) is performed, thus reconverting to the complex number data of a temporal axis. Therefore, the seventh embodiment is configured so that the accuracy of the estimation of the direction conducted in the subsequent super-resolution algorithm is enhanced. The same reference numeral is used for the configuration which is similar to the fifth embodiment shown in FIG. 26. Hereinafter, only the aspects which are different from the fifth embodiment are described.

The seventh embodiment is configured so that a Ch (Channel) deleting unit 134 and an IDBF processing unit 135 are added to the sixth embodiment.

The DBF processing unit 133 performs, similar to the sixth embodiment, a spatial axis Fourier transform, and outputs the spatial complex number data to the peak detection unit 123, and outputs to the Ch deleting unit 134 as well.

Here, in the seventh embodiment in the direction in which the reception antennas are aligned, as shown in FIG. 41A, the DBF processing unit 133 performs a spatial axis Fourier transform based on a 16-point resolution, for instance, and, as a result, creates a spectrum with an angle unit of 15 angular channels, and outputs to the Ch deleting unit 134.

Figure 41B:
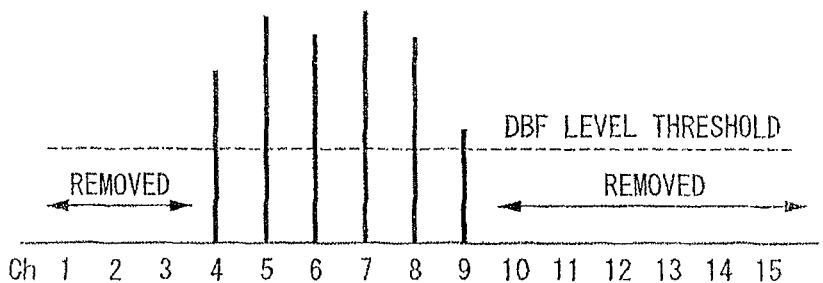
FIG. 41B is a graph describing a focusing process of an angle range for computing a MUSIC spectrum using a DBF process.

Then, the Ch deleting unit 134 selects the spatial complex number data corresponding to the frequency point of the target in the descending region for which a combination was confirmed by the pair confirmation unit 127. In addition, the Ch deleting unit 134 detects whether or not the level of the spectrum is continuous while being adjacent to the predetermined angular range, and, whether or not the level of the predetermined DBF threshold value is exceeded. Furthermore, the Ch deleting unit 134 performs a process converting the spectrum of the angular channel which does not exceed the DBF threshold value to "0," and thus outputs a narrowed spatial complex number data for each beat frequency as shown in FIG. 41B.

According to the process described above, when, for example, four adjacent angular channels have a level which continuously exceeds the DBF threshold value, the Ch deleting unit 134 determines that a target exists, and leaves the spectrum of these angular channels intact, while converting the intensity of a spectrum of another angle to "0."

Further, the IDBF processing unit 135 performs an inverse spatial axis Fourier transform on a spatial complex number data such that the spectrum was narrowed, i.e., only the data of the angular channel region being continuous for the predetermined number of angular channels and exceeding the DBF threshold value is left, and the intensity of the rest of the region is converted to "0." Thus, the IDBF processing unit 135 restores the spatial complex number data to a complex number data of a temporal axis, and outputs to the correlation matrix computation unit 128.

Figure 41C:
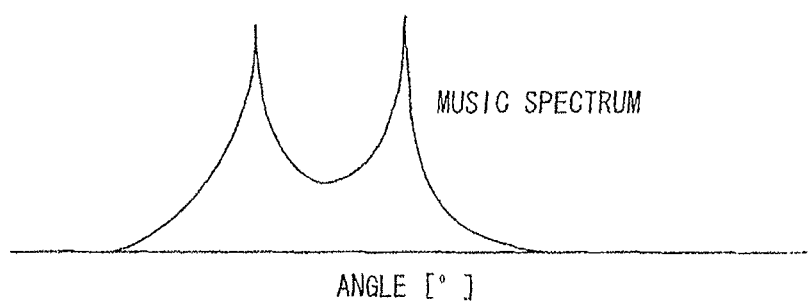
FIG. 41C is a graph describing a focusing process of an angle range for computing a MUSIC spectrum using a DBF process.

Furthermore, in order to compute a correlation matrix from the inputted complex number data, the correlation matrix computation unit 128 can obtain a correlation matrix with a good orthogonal characteristic such that objects on the roadside and the like are removed and the noise element is deleted. FIG. 41C shows an example in which a correlation matrix is created by the above described method with respect to the target cluster of the DBF resolution in FIG. 41B (the term "target cluster" is used because, in actuality, two or more targets may exist), and the target is divided even further by a super-resolution algorithm.

In addition, as shown in FIG. 42A, when a reception wave including a reflection component from a plurality of target clusters is received, there are a plurality of angular channel ranges, which exceed the DBF level at continuous angular channels, in the spatial complex number data outputted from the DBF processing unit 133.

Figure 42B:
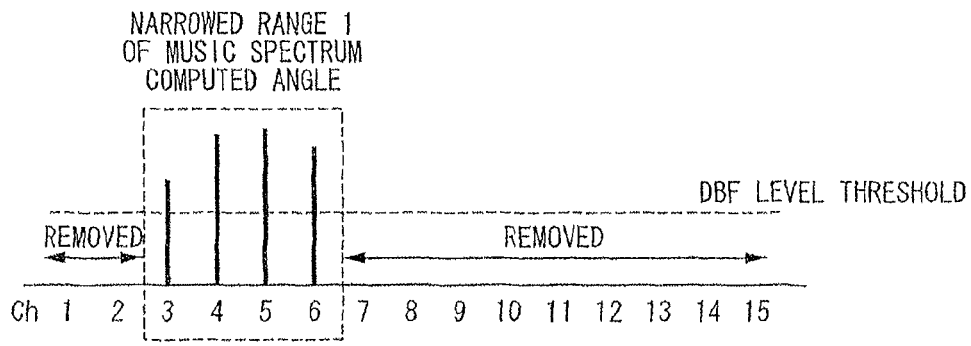
FIG. 42B is a graph describing a focusing process of an angle range for computing a MUSIC spectrum using a DBF process.
Figure 42C:
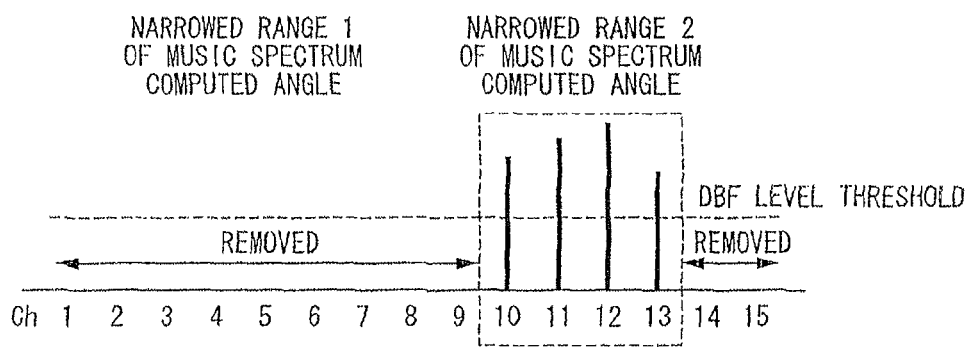
FIG. 42C is a graph describing a focusing process of an angle range for computing a MUSIC spectrum using a DBF process.

Furthermore, regarding the inputted spatial complex number data, within the predetermined angular channel range, when the level of the spectrum of the adjacent angular channels continuously exceeds the level of the DBF threshold value, the Ch deleting unit 134 extracts each of the exceeded angular channel region, and converts the intensity of the spectrum outside this angular channel region to "0." Thus, as shown in FIGS. 42B and 42C, the Ch deleting unit 134 makes a division into separate spatial complex number data which is recognized in the angular channel region.

The Ch deleting unit 134 selects the spatial complex number data corresponding to the frequency point of the target in the descending region for which a combination has been confirmed by the pair confirmation unit 127, and, after performing the above described Ch deletion, outputs to the IDBF processing unit 135.

In addition, the IDBF processing unit 135 performs an inverse spatial Fourier transform on the inputted spatial complex number data, and outputs the obtained temporal axis complex number data to the correlation matrix computation unit 128.

As a result, the correlation matrix computation unit 128 calculates the correlation matrix from the inputted complex number data, and outputs to the eigen value computation unit 131.

The subsequent process for estimating the number of incoming waves is similar to the process described already and shown from FIG. 33 to FIG. 36.

According to the process described above, the range of the detection direction can be narrowed when the spectrum of the MUSIC is computed in the direction detection unit 130. Thus, compared to the fifth embodiment, the resolution can be further enhanced.

Furthermore, according to the above described configuration, regarding the direction detection unit 130, the reception wave divided into reflection components for each target cluster is hypothetically received in the correlation matrix used in the eigen value computation. Therefore, even if the received reception wave includes a reflection component from a number of targets which is equal to or exceeded by, for example, the number of reception antennas and the number of subarrays, the eigen value computation can be carried out without any errors.

In addition, a configuration may be made in which, after the direction of the present target is detected, the direction detection unit 130 stores the direction of this target to the memory 121, regards it as information of a past cycle after the next direction computation cycle, read it from the memory 121, and in the direction computation cycle, perform a spectrum calculation while prioritizing the angular range surrounding the target direction in the past cycle.

Heretofore, the fifth, sixth, and seventh embodiments have been described based on a configuration used in the FMCW-type radar shown in FIG. 26. However, an application to other antenna configurations of an FMCW-type is also possible.

In addition, an application is possible to a format other than an FMCW-type such as a multi-frequency CW and a pulse radar. In addition, according to the seventh embodiment, the estimation of the number of incoming waves and the detection of the direction were conducted concerning the correlation matrix corresponding to the beat frequency of either one of the ascending portion and the descending portion of the triangular wave. However, it is possible to perform the estimation of the number of incoming waves and the detection of the direction in each of the ascending region and the descending region, and, perform a peak combination after detecting the direction. Moreover, the seventh embodiment was described based on the MUSIC Method, which is a super-resolution algorithm, as an example of the direction detection unit. However, it is possible to apply the Minimum Norm Method and the ESPRIT Method and the like, which performs an eigen expansion in a similar manner, and is a detection algorithm based on the principle that the number of incoming waves is estimated in order to detect the direction of the incoming wave.

Furthermore, a program executing an operation of the signal processing unit 120 shown in FIG. 26, FIG. 40, and FIG. 43 may be recorded in a recording medium which can be read by a computer. The program recorded to this recording medium may then be read by a computer system, and may be executed to perform a signal processing which performs a detection of the direction and includes a process estimating the number of incoming waves as shown in FIG. 33 to FIG. 36, in which the number of reception waves is estimated. Incidentally, the "computer system" here includes hardware such as OS and peripheral devices. In addition, the "computer system" includes a www-system which possesses an environment to provide websites (or, an environment for displaying). In addition, a "recording medium which can be read by a computer" indicates a transportable medium such as a flexible disc, an optical magnetic disc, a ROM, a CD-ROM, and the like, as well as a memory device such as a hard disc which is embedded in a computer system. Furthermore, a "recording medium which can be read by a computer" also indicates those which retain a program for a certain period of time such as a network like an internet, a server when a program is transmitted via a transmission line such as a telephone line, or a volatile memory (RAM) inside a client computer system.

In addition, the program may be transmitted to another computer system from a computer system which stores this program inside a memory device and the like, to another computer system through a transmission medium or a transmission wave inside a transmission medium. Here, a "transmission medium" transmitting the program includes a medium having an operation of transmitting information, such as a network (communication network) like the internet, or a communication line (communication wire) such as a telephone line. In addition, the program may be such that a part of the above described operation is executed. Furthermore, the program may be a so-called difference file (difference program) which executes the above described operation in combination with a program already recorded in the computer system.

Eighth Embodiment

Figure 44:
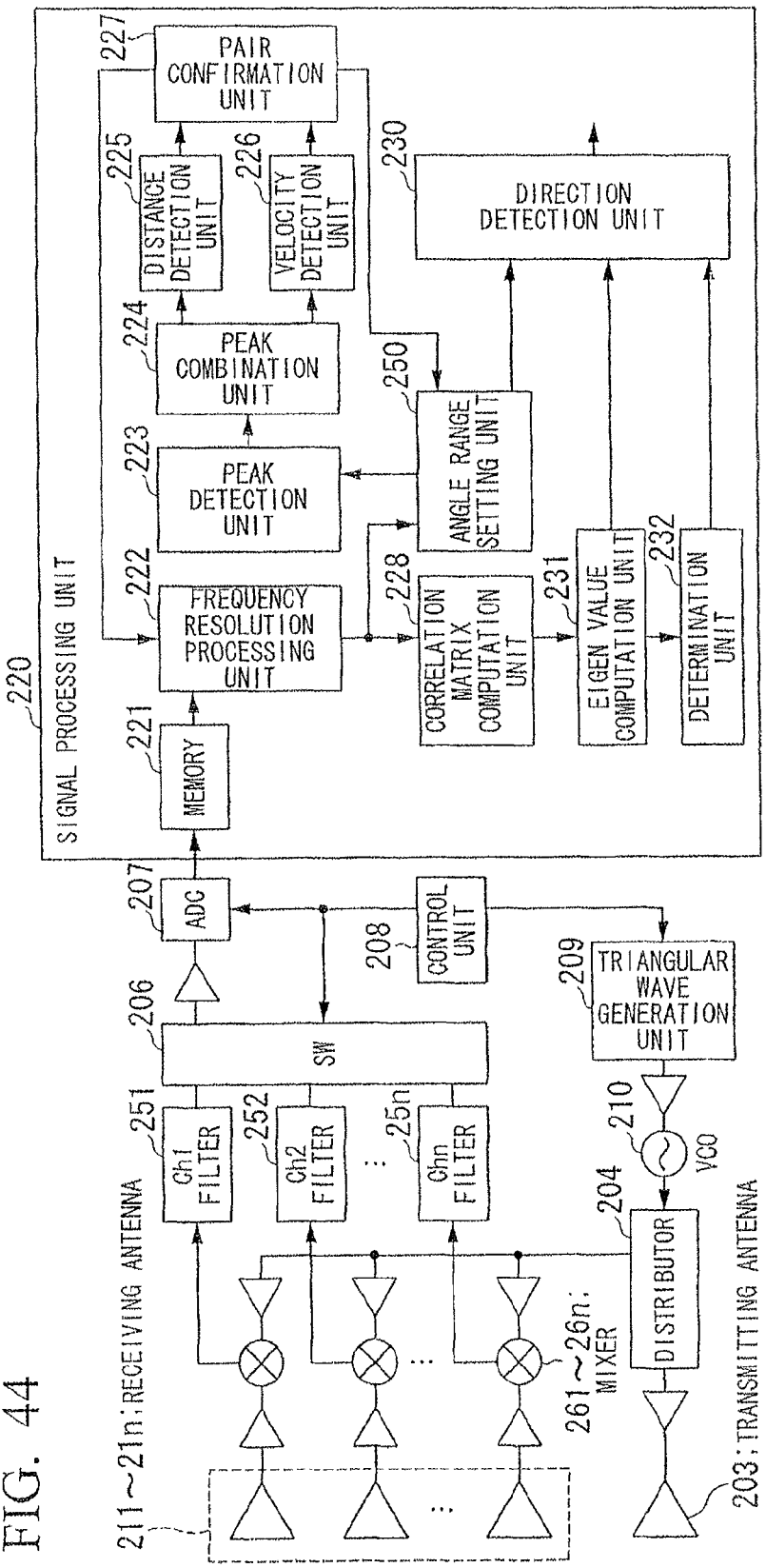
FIG. 44 is a block diagram showing an example of a configuration of an electronic scanning type radar device according to an embodiment of the present invention.

Hereinafter, an eighth embodiment of an electronic scanning type radar device (FMCW type miliwave radar) according to the present invention is described with reference to the diagrams. FIG. 44 is a block diagram showing an example of a configuration of the eighth embodiment.

In this diagram, the electronic scanning type radar device according to the eighth embodiment includes a reception antenna 211~21n, a mixer (beat signal generation unit) 261~26n, a transmission antenna 203, a distributor 204, a filter 251~25n, a SW (switch) 206, an ADC (A/D converter) 207, a control unit 208, a triangular wave generation unit 209, a VCO 210, and a signal processing unit 220.

Figure 45:
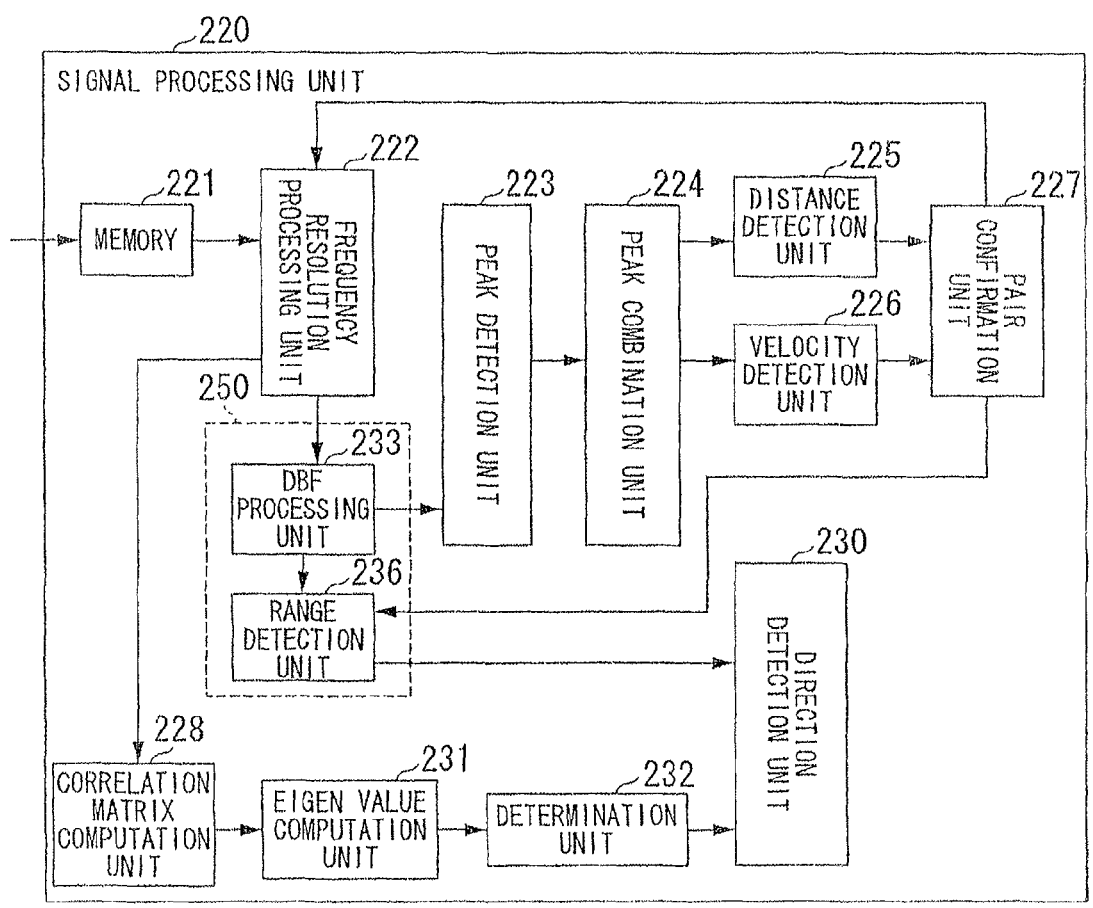
FIG. 45 is a block diagram showing an example of a configuration of a signal processing unit 220 of an electronic scanning type radar device according to an eighth embodiment of the present invention.

The signal processing unit 220 includes a memory (memory unit) 221, a frequency resolution processing unit 222, a peak detection unit 223, a peak combination unit 224, a distance detection unit 225, a velocity detection unit 226, a pair confirmation unit 227, a correlation matrix computation unit 228, a direction detection unit 230, an eigen value computation unit 231, a determination unit 232, and an angular range setting unit 250. Here, the angular range setting unit 250 is configured to estimate the angular range in which a target exists, and is a characteristic part of the present invention. According to the eighth embodiment, as shown in FIG. 45, the angular range setting unit 250 includes the DBF processing unit 233 and the range detection unit 236.

Next, an operation of the electronic scanning type radar device according to the eighth embodiment is described with reference to FIG. 44 and FIG. 45.

The reception antenna 211~21n receives a reflection wave, i.e., a reception wave, which comes from a target at which a transmission wave reflects.

Each of the mixers 261~26n mixes a transmission wave, transmitted by the transmission antenna 203, and a signal obtained by an amplifier amplifying a reception wave received by each of the reception antennas 211~21n. Thus, each of the mixers 261~26n generates a beat signal corresponding to each difference in frequency.

The transmission antenna 203 transmits to a target, a transmission wave, which is a transmission signal obtained by the VCO (Voltage Controlled Oscillator) 210 frequency-modulating a triangular wave signal generated by the triangular wave generation unit 209.

The distributor 204 distributes a frequency-modulated transmission signal from the VCO 210 to the mixers 261~26n and to the transmission antenna 203.

Each of the filters 251~25n executes a band limitation on beat signals Ch1~Chn, each of which were generated respectively by the mixers 261~26n, corresponding to each reception antenna 211~21n. In this way, each of the filters 251~25n outputs the band-limited beat signal to the SW (switch) 206.

The SW 206 outputs to the ADC (A/D converter) 207, a beat signal of Ch1~Chn corresponding to each reception antennas 211~21n which traveled through each of the filters 251~25n corresponding to a sampling signal entered by the control unit 208, switching in succession.

The ADC 207 converts the beat signals of Ch1~Chn, corresponding to each of the reception antennas 211~21n and entered by the SW 206 in synchrony with the sampling signal, to a digital signal by performing an A/D conversion in synchrony with the sampling signal. The ADC 207 also stores the digital signal in series into a wave form memory region of the memory 221 of the signal processing unit 220.

The control unit 208 includes a micro computer and the like. The control unit 208 controls the overall electronic scanning type radar device shown in FIG. 44 based on a control program stored in a ROM, not diagramed, and the like.

<Principle of Detecting the Distance, Relative Velocity, and Angle (Direction)>

Figure 46A:
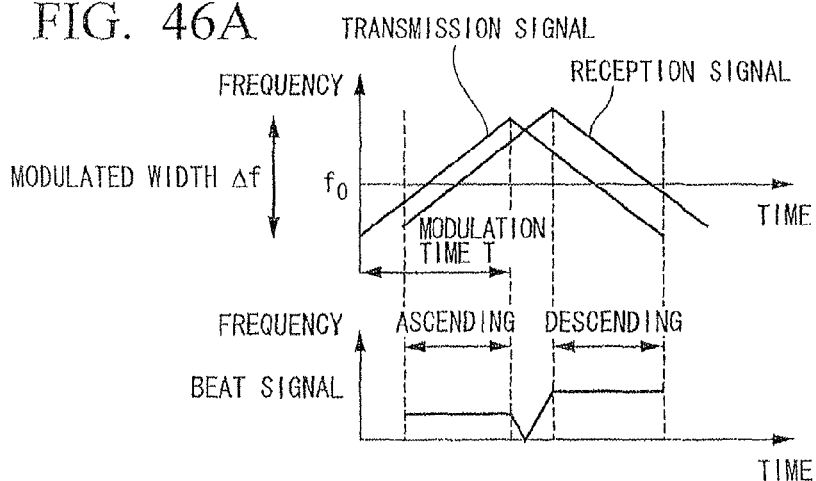
FIG. 46A is a conceptual diagram describing a generation of a beat signal in an ascending region and a descending region of a triangular wave by a transmission wave and a reception wave.
Figure 46B:
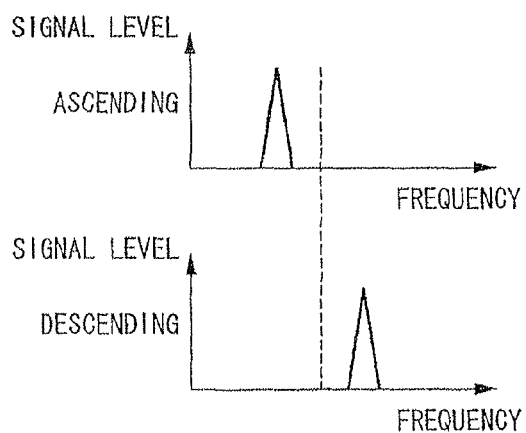
FIG. 46B is a conceptual diagram describing a generation of a beat signal in an ascending region and a descending region of a triangular wave by a transmission wave and a reception wave.

Next, the principle of detecting a distance between the electronic scanning type radar device and a target, a relative velocity, and an angle (direction) is briefly described using FIGS. 46A and 46B. This principle is utilized by the signal processing unit 220 in the eighth embodiment.

FIGS. 46A and 46B show a transmission signal, which was obtained by the VCO 210 frequency-modulating a signal generated by the triangular wave generation unit 209 shown in FIG. 44, and a condition in which the transmission signal is reflected from the target and is entered as a reception signal. The example in FIGS. 46A and 46B shows an instance in which there is one target.

As FIG. 46A indicates, a reception signal, which is a reflection wave from a target, is received, with respect to the transmitted signal, with a lag in the right direction (direction of time lag) in proportion to the distance from the target. In addition, the reception signal fluctuates in the longitudinal direction (frequency direction) with respect to the transmission signal in proportion to the relative velocity with respect to the target. Furthermore, after the frequency modulation (such as a Fourier transform, DTC, Hadamard transform, and wavelet transformation) of the beat signal obtained in FIG. 46A, the signal has a peak value in each of the ascending region and the descending region, as shown in FIG. 46B, when there is one target. Here, the horizontal axis of FIG. 46B represents the frequency, and the vertical axis represents the intensity.

The frequency resolution processing unit 222 performs a frequency resolution on each of the ascending portion (ascending) and the descending portion (descending) of the triangular wave from the sampled data of the beat signal stored in the memory 221. For example, the frequency resolution processing unit 222 performs a frequency modulation into a discrete time by, for example, a Fourier transform.

As a result, in the ascending portion and the descending portion, a graph of the signal level for each beat frequency, which was frequency-resolved in each of the ascending portion and in the descending portion, is obtained, as shown in FIG. 46B.

Then, the peak detection unit 223 detects the peak value from a signal level for each beat frequency shown in FIG. 46B, and detects the existence of a target. At the same time, the peak detection unit 223 outputs the beat frequency (both the ascending portion and the descending portion) of the peak value as a target frequency.

Next, the distance detection unit 225 computes the distance from Equation (18) shown below from the target frequency fu of the ascending portion and a target frequency fd of the descending portion inputted from the peak combination unit 224.

(Equation 18)

$$r = \{C \cdot T/(2 \cdot \Delta f)\} \cdot \{(fu+fd)/2\} \qquad (18)$$

Further, the velocity detection unit 226 computes the relative velocity from Equation (19) show below from the target frequency fu of the ascending portion and the target frequency fd of the descending portion inputted from the peak combination unit 224.

(Equation 19)

$$v=\{C/(2f0)\}\cdot\{(fu-fd)/2\} \quad (19)$$

Figure 47:
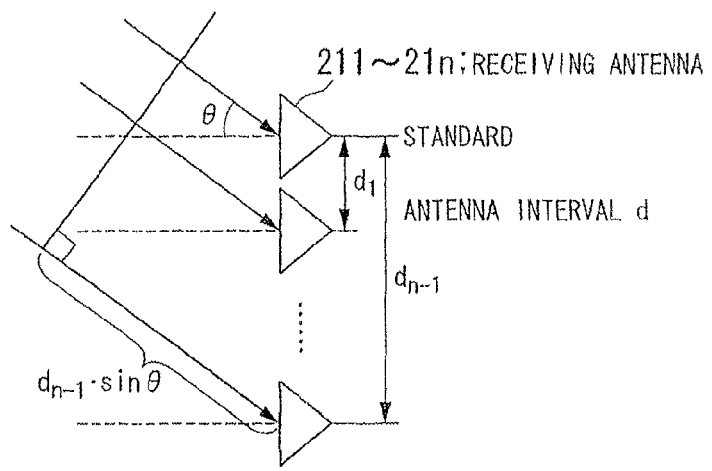
FIG. 47 is a conceptual diagram describing a reception wave by a reception antenna.

In the above equations for computing the distance r and the relative velocity v,
C: optical velocity
Δf: width of the frequency modulation of the triangular wave
f0: central frequency of the triangular wave
T: modulation time (ascending portion/descending portion)
fu: target frequency in the ascending portion
fd: target frequency in the descending portion Next, the reception antenna 211~21n according to the eighth embodiment is an array-type antenna which is placed at an interval d, as shown in FIG. 47.

An incoming wave from a target (incident wave, which is a reflection wave from the target with respect to the transmission wave transmitted by the transmission antenna 203) enters the reception antenna 211~21n from a direction at an angle of θ degrees from the axis perpendicular to the surface of the antenna which is lined up.

At this time, the incoming wave is received by the reception antenna 211~21n at the same angle.

A phase difference "$d_{n-1}\cdot\sin\theta$," which is obtained by this same angle such as the angle θ and the interval d between each antenna, occurs between each adjacent antenna.

This phase difference can be used to perform a digital beam forming (DBF), which is an additional Fourier transform, in the antenna direction, of the value which underwent a frequency resolution processing for each antenna in the temporal direction. The phase difference can also be used to detect the angle θ in a signal processing of a super resolution algorithm and the like.

<Signal Processing of a Reception Wave by the Signal Processing Unit 220>

Next, the memory 221 stores a time-series data (the ascending portion and the descending portion), which was obtained by A/D modulating the reception signal by the ADC 207 with respect to the wave form storing region, so that each time-series data corresponds to each antenna 211~21n. For example, when 256 pieces are sampled in each of the ascending portion and the descending portion, 2×256(pieces)×(number of antennas) numbers of data are stored in the wave form storing region.

The frequency resolution processing unit 222 outputs a frequency point indicating a beat frequency, and also outputs a complex number data of the beat frequency. The frequency point is obtained by performing a Fourier transform, for example, and modulating each beat signal corresponding to each of Ch1~Chn (each antenna 211~21n) into a frequency at a predetermined resolution performance. For example, when each of the ascending portion and the descending portion for each antenna has 256 pieces of sampled data, the beat signal is modulated into a beat frequency as a frequency region data of the complex number for each antenna. Thus, the beat signal becomes 128 pieces of complex number data (2×128 pieces× data for the number of antennas) for each of the ascending portion and the descending portion. In addition, the beat frequency is indicated by the frequency point.

Here, the only difference between each of the complex number data for each antenna is the phase difference which depends on the angle θ. The absolute value (such as the reception intensity or the amplitude) of each complex number data on the complex plane is equal.

Next, the frequency dissolution processing unit 222 performs a frequency resolution on the inputted beat signal (temporal axis Fourier transform), and outputs a frequency point indicating the beat frequency and the complex number data to the DBF processing unit 233.

Next, the DBF processing unit 233 performs a Fourier transform on the inputted complex number data corresponding to each antenna in the direction in which the antenna is aligned. In other words, the DBF processing unit 233 performs a spatial axis Fourier transform.

Then, the DBF processing unit 233 computes the spatial complex number data for each angular channel corresponding to the angular resolution, which, said differently, depends on the angle, and outputs to the peak detection unit 223 for each beat frequency.

Therefore, the spectrum, indicated by the spatial complex number data (with a unit of beat frequency) for each angular channel outputted from the DBF processing unit 233, depends on the estimation of the arrival direction of the reception wave by the beam scanning resolution.

In addition, since a Fourier transform is conducted in the direction in which the antenna is aligned, the same effect can be obtained as when the complex number data is added between the angular channels. Furthermore, the S/N ratio of the complex number data for each angular channel is improved. Thus, the accuracy with which the peak value is detected can be enhanced.

The above described complex number data and the spatial complex number data are computed in both the ascending region and the descending region of the triangular wave.

The peak combination unit 124 combines the beat frequency and its peak value, entered by the peak detection unit 123 and shown in FIG. 29, with a beat frequency of each ascending region and the descending region and its peak value, in a matrix fashion in a round-robin matter. In other words, the peak combination unit 124 combines all of the beat frequencies in each of the ascending region and the descending direction. Thus, the peak combination unit 123 outputs, in series, to the distance detection unit 125 and the velocity detection unit 126, and confirms the combination at the pair confirmation unit 127. Here, the horizontal axis of FIG. 29 indicates the frequency point of the beat frequency, while the vertical axis indicates the level (intensity) of the signal.

Next, the peak detection unit 223 detects the peak value based on the spectrum intensity indicated by the spatial complex number data for each angular channel which is inputted. The peak detection unit 223 then outputs to the peak combination unit 224.

When the above detection result is inputted, the peak combination unit 224 combines the beat frequency in the ascending region and the descending region and its peak value, and outputs to the distance detection unit 225 and velocity detection unit 226. The combination is thus confirmed by the pair confirmation unit 227.

The distance detection unit 225 computes the distance r to the target based on a value obtained by adding the beat frequency of the combination for each ascending region and the descending region, which are inputted in series.

Further, the velocity detection unit 226 computes the relative velocity v with respect to the target by the difference in the beat frequency of the combination for each ascending region and the descending region, which are inputted in series.

In addition, the correlation matrix computation unit 228 selects the beat frequency, which underwent a frequency resolution by the frequency resolution processing unit 222, according to the frequency point of the beat frequency of the pair whose combination was confirmed. Thus, the correlation matrix computation unit 228 generates a correlation matrix corresponding to the beat frequency of either one of the ascending portion and the descending portion (in the fifth embodiment, the descending portion) regarding this combination.

Next, the range detection unit 236 outputs an angular range information to the direction detection unit 230 as information on a direction which has a rough (low) level of resolution compared to the MUSIC Method and the like, based on the angular channel corresponding to the spatial complex number data of the frequency point which is the same as the output to the correlation matrix computation unit 228 concerning the pair confirmed by the pair confirmation unit 227. For example, the range detection unit 236 compares the peak value of each angular channel with a predetermined threshold value. Thus, the range detection unit 236 detects an angular channel having a peak value greater than or equal to this threshold value. When the detected angular channel exists being adjacent to one another for a number greater than or equal to the predetermined plurality of channel numbers (for example, four angular channels), the range detection unit 236 outputs this range to the direction detection unit 230 as angular range information.

Figure 49A:
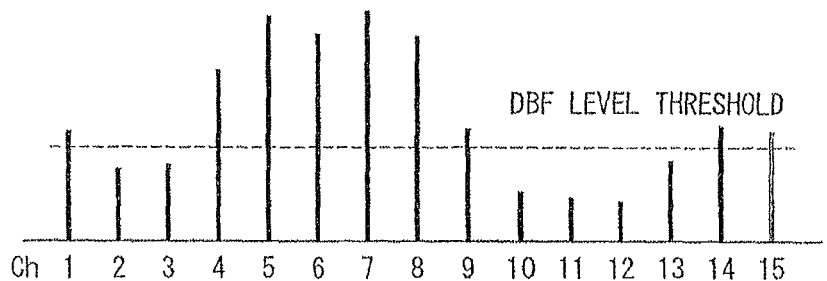
FIG. 49A is a graph describing a focusing process of an angle range for computing a MUSIC spectrum using a DBF process.
Figure 50A:
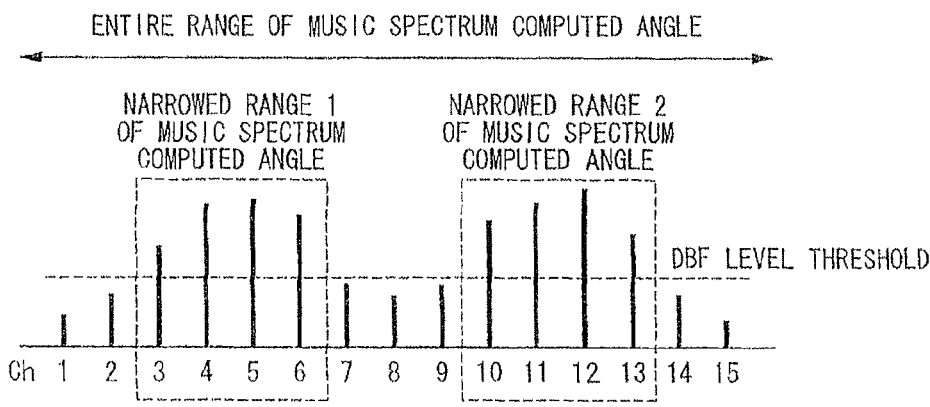
FIG. 50A is a graph describing a focusing process of an angle range for computing a MUSIC spectrum using a DBF process.

By using the angular range information described above, the direction detection unit 230 can narrow the detected range of the direction to a narrow angular range by using the spatial complex number data for each angular channel while performing a computation of the MUSIC spectrum, as shown in FIG. 49A and FIG. 50A, compared to case in which there is no information regarding the angular channel. In this way, the resolution of the calculation of the MUSIC spectrum can be enhanced.

Here, FIG. 49A and FIG. 50A shows an instance in which a Fourier transform of 16 bites was conducted in the direction of the channel (in the direction of the antenna) so that the angular dependency Ch (channel) after the DBF becomes 15Ch. Here, when the value of the spectrum intensity exceeds the DBF level threshold value in the range of 4Ch consecutive Ch (angles), as described above, the range detection unit 236 makes a setting of the above described angular range information, i.e., a narrowed range. The range detection unit 236 thus outputs this angular range information to the direction detection unit 230.

As a result, the direction detection unit 230 performs an analysis of the narrowed detection range of the direction with a high level of accuracy based on the angular range information inputted by the range detection unit 236.

Further, in FIG. 50A, there are two different groups of the spectrum intensity values which exceed the DBF level threshold value in 4Ch consecutive angular range. The range detection unit 236 outputs each range (the angular ranges of Ch3~Ch6 and Ch10~Ch13) to the direction detection unit 230 as a first angular range information (the angular range in FIG. 50B) and a second angular range information (the angular range in FIG. 50C).

In addition, the direction detection unit 230 detects the MUSIC spectrum in series, with each range of the first and second angular range information separately (independently) regarded as the angular range for computing the MUSIC spectrum. Therefore, it is possible to analyze the detection range of the direction, narrowed by the angular range information inputted from the range detection unit 236, with a high level of accuracy.

In FIGS. 49A, 49B, and FIGS. 50A, 50B, and 50C, the horizontal axis shows the Ch number of the angular channel, while the vertical axis shows the spectrum intensity for each Ch which was computed during the DBF process.

<Super-Resolution Algorithm in the Estimation of the Arrival Direction of an Incoming Wave>

Figure 51:
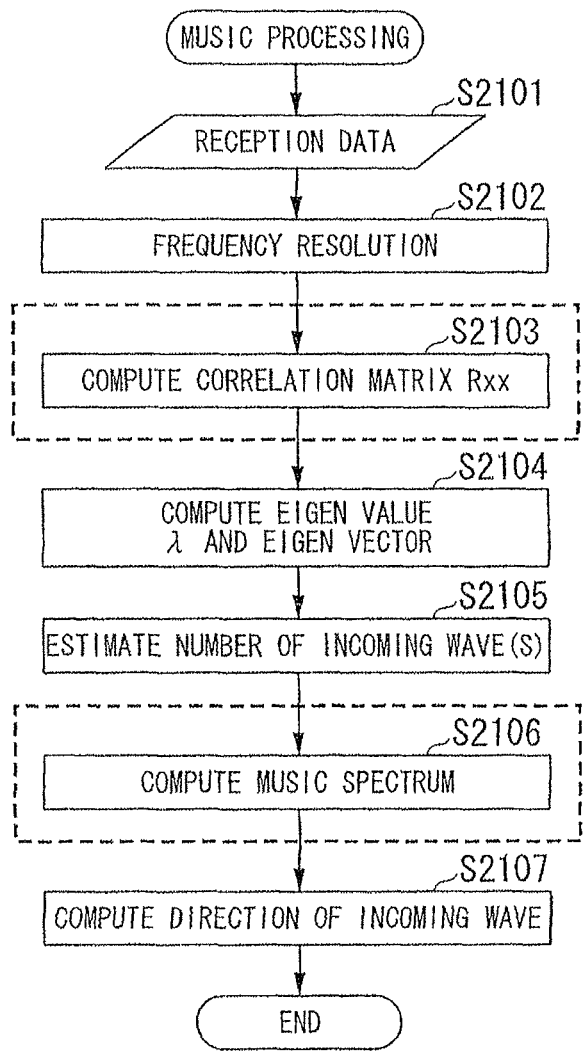
FIG. 51 is a flowchart explaining a MUSIC process.

Next, a super-resolution algorithm estimating the arrival direction of an incoming wave according to the correlation matrix computation unit 228, the eigen value computation unit 231, the determination unit 232, and the direction detection unit 230, is described with MUSIC as an example with reference to FIG. 51. FIG. 51 is a flowchart describing the flow of the operating process of a general MUSIC Method. Since the process of the MUSIC Method itself is used in general (for example, in Non-Patent Documents 1 and 2, or, Patent Documents 3, 4, 8, and 9), only the aspects of the MUSIC Method which are necessary in the eighth embodiment are described.

The frequency resolution processing unit 222 reads in the beat signal of the reception wave stored in the memory 221 (step S2101), and performs a frequency-modulation on the beat signal for each antenna (step S2102).

Further, as described above, the correlation matrix computation unit 228 reads in the complex number frequency region data (hereinafter referred to as complex number data) by making a selection from the frequency resolution processing unit 222. The complex number data has undergone a frequency resolution, and corresponds to the frequency point of the target in the descending region for which a pair has been confirmed by the pair confirmation unit 227. In addition, regarding the descending region, the correlation matrix computation unit 228 generates a correlation matrix indicating the correlation for each antenna (step S2103).

Figure 52A:
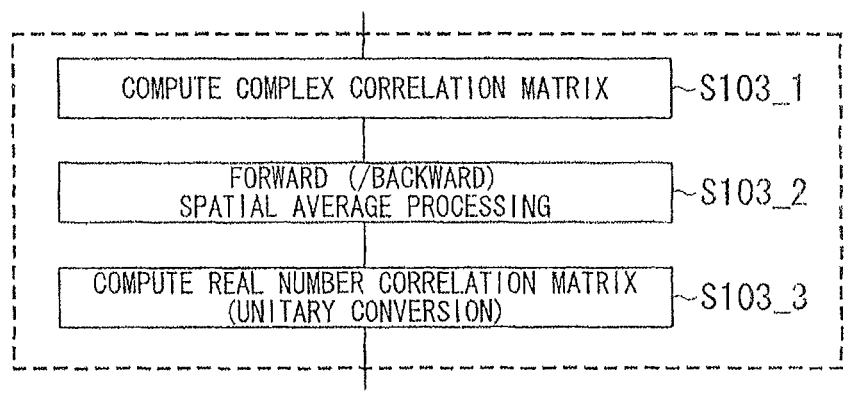
FIG. 52A is a flowchart showing a substep executed in step S2103 in the flowchart shown in FIG. 51.
Figure 52B:
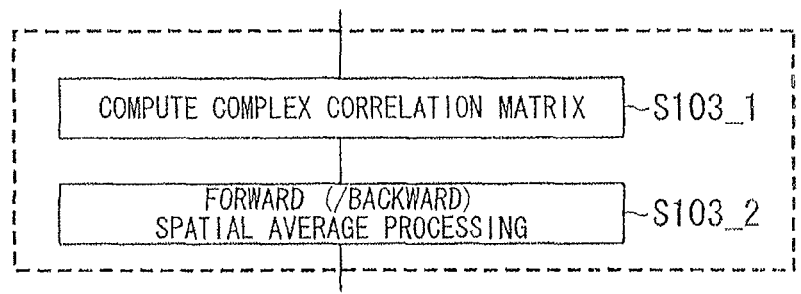
FIG. 52B is a flowchart showing a substep executed in step S2103 in the flowchart shown in FIG. 51.

The generation of the correlation matrix by the correlation matrix computation unit 228 in step S2103 is conducted, for example, according to the methods shown in FIGS. 52A and 52B. The methods shown in FIGS. 52A and 52B are briefly described below.

According to the method shown in FIG. 52A, the correlation matrix computation unit 228 generates a correlation matrix (complex correlation matrix) based on the bare complex number data (step S2103_1), and processes with a forward-only spatial average (Forward Spatial Averaging Method) or a forward-and-backward spatial average (Forward-Backward Spatial Averaging Method) (step S2103_2).

Spatial averaging refers to a process in which the number of antennas in the array of the original reception antennas is divided into subarrays which has a lesser amount of antennas, and the subarrays are averaged. The phase relation of waves having a correlation differs according to the position at which the wave was received. Thus, according to this basic principle of spatial averaging, the correlation matrix is obtained by moving the reception point in an appropriate manner. In this way, the basic principle of spatial averaging is such that the correlation of the correlated interference wave is restrained due to the effect of the averaging process. In general, the averaging is conducted by taking out a plurality of subarrays having the same alignment from the overall array of reception antennas without moving the array of reception antennas, and then obtaining the average of each correlation matrix.

Figure 53:
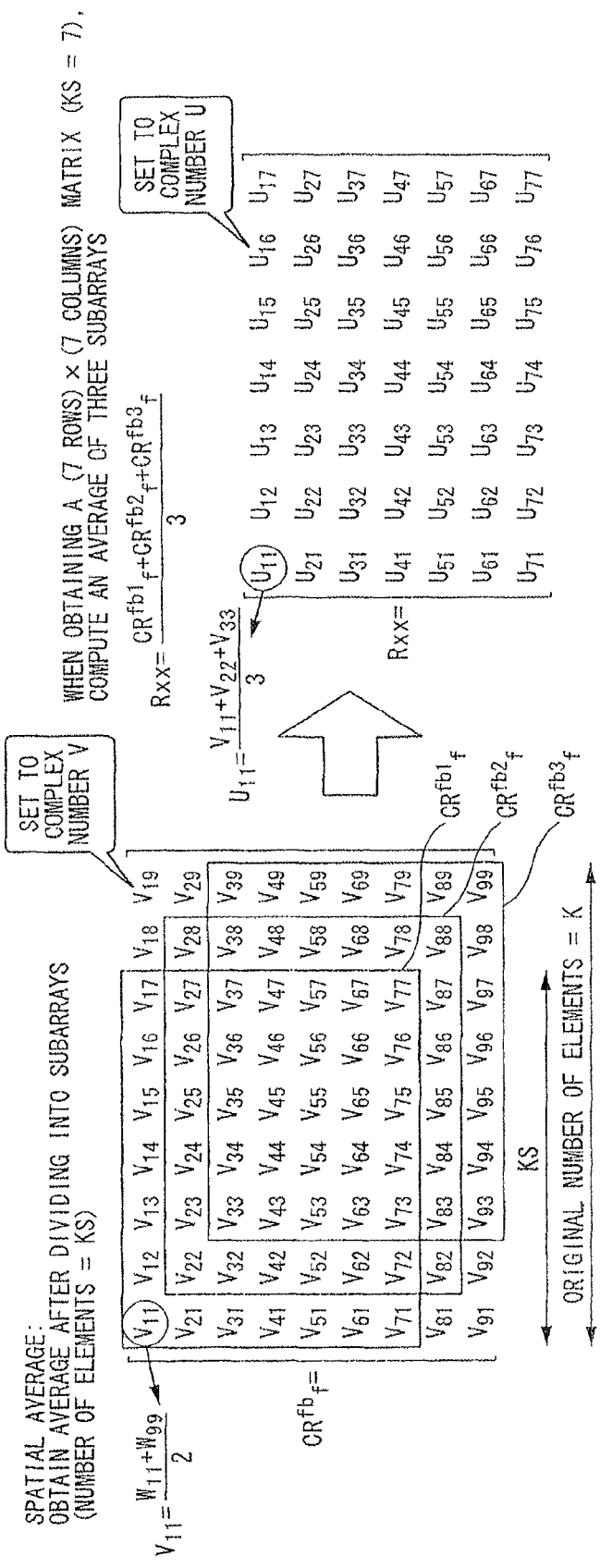
FIG. 53 is a conceptual diagram describing a process executed when a spatial average of a correlation matrix is computed.

For example, as shown in FIG. 53, when the array of reception antennas $211$~$211n$ is such that there are nine antennas (n=9), the correlation matrix computation unit 228 obtains the backward correlation matrix $CR^b_f$ in the latter equation (6) with respect to the correlation matrix $CR^f_f$ in the forward equation (5) indicated below. Thus, the correlation matrix computation unit 228 carries out an averaging procedure of the forward/backward elements by averaging the corresponding elements in the correlation matrix in equation (5) and the backward correlation matrix in equation (6) according to the following equation (20).

(Equation 20)

$$CR^{fb}_f = (CR^{f}_f + CR^{b}_f)/2 \tag{20}$$

In this way, the correlation matrix computation unit 228 divides the correlation matrix $CR^{fb}_f$ obtained by the forward/backward averaging process, into subarrays, and computes an average. Thus, the correlation matrix computation unit 228 obtains a correlation matrix Rxx which is used to estimate the arrival direction of the reception wave. In other words, the correlation matrix obtained by the forward/backward spatial averaging process can be expressed as follows by Equation (21).

(Equation 21)

$$Rxx = (CR^{fb1}_f + CR^{fb2}_f + CR^{fb3}_f)/3 \tag{21}$$

Here, the correlation matrix computation unit 228 obtains the correlation matrix Rxx by dividing the nine reception antennas 211~219 into three subarrays each of which including seven antennas 211~217, 212~218, and 213~219, and by averaging the corresponding elements of each matrix in the subarray.

Meanwhile, in the case of the forward spatial averaging, the matrices from $V_{11}$ to $V_{99}$ can be kept as the matrices from $W_{11}$ to $W_{99}$ in equation (5). Thus, it is not necessary to average each element as shown, for example, in equation (22).

(Equation 22)

$$V_{11} = (W_{11} + W_{99})/2 \tag{22}$$

Regarding the use in which the arrival direction of the reception wave regarding the radar is estimated, all of the incoming reception waves are reflection waves caused by the transmitted transmission wave reflecting from the target. Therefore, the data of the reception waves received by each antenna exhibits a strong correlation with one another. Thus, the results of the eigen value computation in the latter phase are not obtained accurately. In this way, spatial averaging has an effect of restraining the correlation, extracting a self correlation, and accurately estimating the direction of the incoming wave.

Next, the correlation matrix computation unit 230 performs a unitary conversion in order to convert the correlation matrix of complex data, which underwent a spatial averaging process as described above, into a correlation matrix of real numbers.

Here, by converting into a correlation matrix of real numbers, the eigen value computation in a subsequent step which has the heaviest computation load can be executed using real numbers only. In this way, the computation load can be greatly reduced.

Meanwhile, FIG. 52B shows a variation in which the eigen value computation in the subsequent step is executed using complex numbers without converting into a correlation matrix of real numbers by performing a unitary conversion as indicated in FIG. 52A.

Further, in step S2103, regarding the correlation matrix Rxx obtained by the step S2103_3 in FIG. 52A and the step S2103_2 in FIG. 52B, the values of each element can be normalized (i.e., divided by the maximum value) based on the maximum value of the correlation matrix (or the diagonal element of the correlation matrix).

Next, the eigen value computation unit 231 computes the eigen value of the correlation matrix Rxx obtained in step S2103 and its corresponding eigen vector as an eigen value and an eigen vector e which satisfies the following characteristic equation, outputs to the direction detection unit 230, and outputs the eigen value λ to the determination unit 232 (step S2104).

(Equation 23)

$$Rxxe = \lambda e \tag{23}$$

Then, based on the eigen value λ obtained above by the eigen value computation unit 231, the determination unit 232 estimates the number of incoming waves necessary to remove the signal component vector (step S2105).

Here, the determination unit 232 performs the above estimation of the incoming wave according to the incoming wave estimation process, described later.

Next, the direction detection unit 230 generates a spectrum of angles by computing an inner product of a vector with only the noise components after removing the signal vector, and a vector for each direction and angle which is predetermined internally (step S2106). As a result, it is possible to associate a null with a directional characteristic to the arrival direction of the incoming wave.

At this time, the direction detection unit 230 performs a computation of the inner product of a vector having only a noise component and a direction vector for each directional angle which is internally predetermined, only in the angular range indicated by the angular range information inputted from the range detection unit 236, as already described above. In this way, the direction detection unit 230 creates a spectrum $P_{MU}(\theta)$.

(Equation 24)

$$P_{MU}(\theta) = a^H(\theta)a(\theta) * \{a^H(\theta)E_N E_N^H a(\theta)\} \tag{24}$$

Here, a(θ) is a directional vector, $E_N$ is a noise sub-space eigen vector, and H represents a conjugate transpose.

Further, the direction detection unit 230 detects a peak from the spectrum of angles which exceeds a predetermined threshold value. In this way, the direction detection unit 230 detects the peak and computes the direction of the incoming wave (angle θ) (step S2107).

In addition, the direction detection unit 230 can make a conversion to a position in the lateral direction with respect to the vertical axis of the array of antennas of the electronic scanning type radar device based on the angle (i.e., the arrival direction of the reception wave) and the distance computed by the distance detection unit 225.

A standard MUSIC Method has been described above. In the MUSIC spectrum computation in step S2106, it is possible to use a method called the Root-MUSIC Method which computes a solution from the root of the polynomial, instead of a type searching with a direction vector.

Here, Root-MUSIC is a method which directly obtains θ that satisfies the following equation (25), and can be carried out without creating a spectrum.

(Equation 25)

$$a^H(\theta)E_N E_N^H a(\theta) = 0 \tag{25}$$

In addition, after the step S2107 in FIG. 51, it is possible to add a process computing the received electronic power and deleting an unnecessary wave (data of an unnecessary reception wave).

In other words, the determination unit 232 compares the electronic power indicated in the diagonal component of the matrix S in the following equation with a predetermined threshold value, and detects whether or not the electronic power exceeds the threshold value. Further, the determination unit 232 has a process which makes a determination of necessary reception wave when the electronic power exceeds the threshold value, and, meanwhile, makes a determination of unnecessary reception wave when the electronic power is less than or equal to the threshold value.

(Equation 26)

$$S=(A^H A)^{-1} A^H (Rxx - \sigma^2 I) A (A^H A)^{-1} \qquad (26)$$

Here, S indicates the correlation matrix of the signal of the reception wave, A indicates the directional matrix, $A^H$ indicates the conjugate transpose matrix of A, I indicates the unit matrix, Rxx indicates the correlation matrix computed by the correlation matrix computation unit 228, and $\sigma^2$ indicates the dispersion of the noise vector.

By adding the process, described above, of computing the received electronic power and deleting an unnecessary wave, it is possible to delete the unnecessary incoming reception wave, when the number of reception waves was overestimated in the estimation of the number of reception waves in step S2105. Therefore, it is possible to retain a margin of the setting of the threshold value λth and the threshold value λth' in the estimation process of the number of incoming waves described below (in other words, even if each threshold value is not set rigidly, the reception wave that does not have an adequate reception electric power is deleted).

As described above, the eighth embodiment is configured so that the direction is first estimated using DBF (Digital Beam Forming) which has a resolution lower than super-resolution algorithms such as the MUSIC Method, thus narrowing the angular range in which the target exists, and a super-resolution algorithm is used to estimate the direction in this angular range based on the correlation matrix.

<Incoming Wave Estimation Process>

Figure 54:
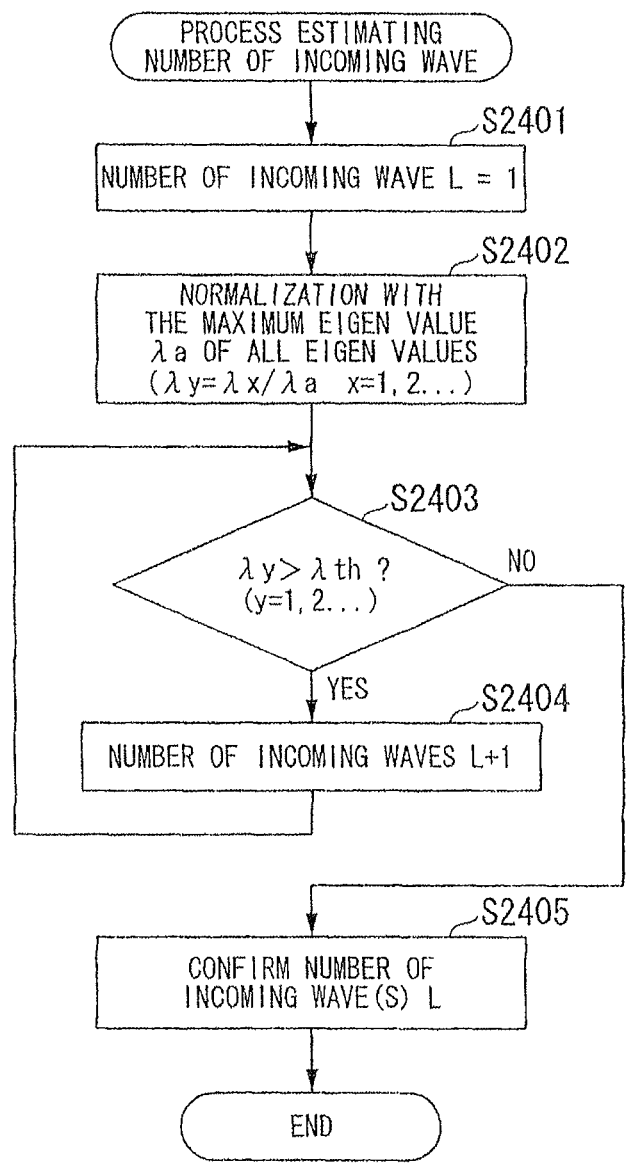
FIG. 54 is a flowchart describing in detail a process estimating a number of incoming waves, executed in step S2105 shown in FIG. 51.

Next, an incoming wave estimation process in step S2105 of FIG. 51 is described with reference to FIG. 54. This incoming wave estimation process is used in the detection of the MUSIC spectrum by the direction detection unit 230. The process of estimating the number of incoming waves, shown in the flowchart in this FIG. 54, is a process in which primarily the determination unit 232 in FIG. 44 uses the eigen value inputted from the eigen value computation unit 231.

As already described in the flowchart in FIG. 51, at the time when step S2105 in FIG. 51 begins to be executed, the peak combination unit 224 has detected the target, and the eigen value computation unit 231 has already computed the eigen value and the eigen vector of the correlation matrix Rxx.

Therefore, the determination unit 232 assumes that there is at least one incoming wave, and therefore enters the number 1 into the number of incoming waves L (step S2401).

Then, the determination unit 232 detects, from among the eigen values obtained by the correlation matrix, a maximum eigen value λa which has a maximum value. The determination unit 232 next performs a normalization of the eigen value by dividing all of the eigen values λx (x=1, 2, 3) by the maximum eigen value λa (determining the ratio between the maximum eigen value λa and all of the eigen values λx which includes this maximum eigen value λa). In this way, the determination unit 232 sets λy (y=1, 2, 3) as the normalized eigen value (step S2402). At this time, the determination unit 232 rearranges the normalized eigen values λy from the largest to the smallest.

Next, the determination unit 232 compares in series, the predetermined threshold λth and the eigen value λy, in the order from the largest of the eigen value λy (step S2403). Then, when the determination unit 232 detects that the eigen value λy is greater than or equal to the threshold value λth, the determination unit 232 proceeds the operation to step S2404.

Then, the determination unit 232 increments the number of incoming waves L (by adding 1), and returns the operation to step S2403.

Meanwhile, when the determination unit 232 detects that the eigen value λy is less than the threshold value λth, it is no longer necessary to later make a comparison between the eigen value λy and the threshold value λth (because the subsequent eigen value λy is smaller than the eigen value λy which is presently being compared). Therefore, the determination unit 232 proceeds the operation to step S2405 (step S2403).

Then, the determination unit 232 confirms the present number of incoming waves L as the detected number of incoming waves L. The determination unit 232 next outputs this confirmed number of incoming waves L to the direction detection unit 230 (step S2405).

In this process estimating the number of incoming waves, the determination unit 232 performs the process from step S2401 to S2405 described above, every time an eigen value is inputted from the eigen value computation unit 231.

Figure 55:
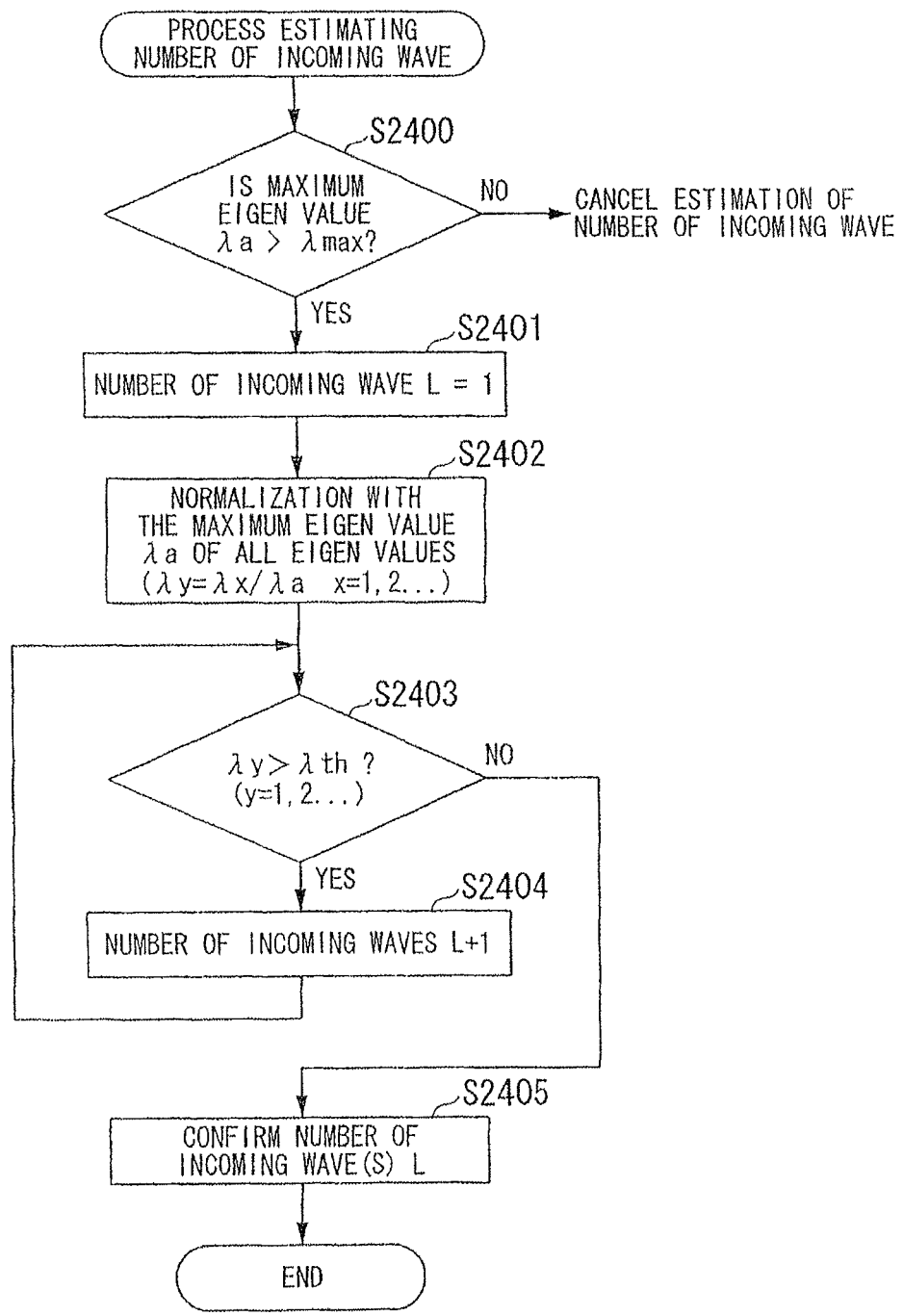
FIG. 55 is a flowchart describing in detail another process estimating a number of incoming waves, executed in step S2105 shown in FIG. 51.

In addition, as shown in the flowchart in FIG. 55, before the process of estimating the number of incoming waves is executed, the determination unit 232 detects the maximum eigen value λa from the eigen value λx inputted from the eigen value computation unit 231.

Further, the determination unit 232 detects whether or not this detected maximum eigen value λa is greater than or equal to a predetermined threshold λmax (step S2400). When the determination unit 232 detects that the maximum eigen value λa is greater than or equal to the threshold value λmax, the determination unit 232 performs step S2401 shown in FIG. 51 and the steps subsequent to step S2401 in the process for determining the number of incoming waves. Meanwhile, when the determination unit 232 detects that the maximum eigen value λa is less than the threshold value λmax, the determination unit 232 does not execute the process for estimating the number of incoming waves. Thus, the determination unit 232 does not output the number of incoming waves L to the direction detection unit 230.

In other words, even in embodiments such that an eigen value is obtained from a correlation matrix of the entire frequency point or within a range of the frequency point, it is possible to cancel (halt) the process of estimating the number of incoming waves during the estimation of the number of incoming waves. Thus, even if the level of reception is low due to the influence of multipass on the road surface, it is possible to avoid making an erroneous estimation of the number of incoming waves.

Figure 56:
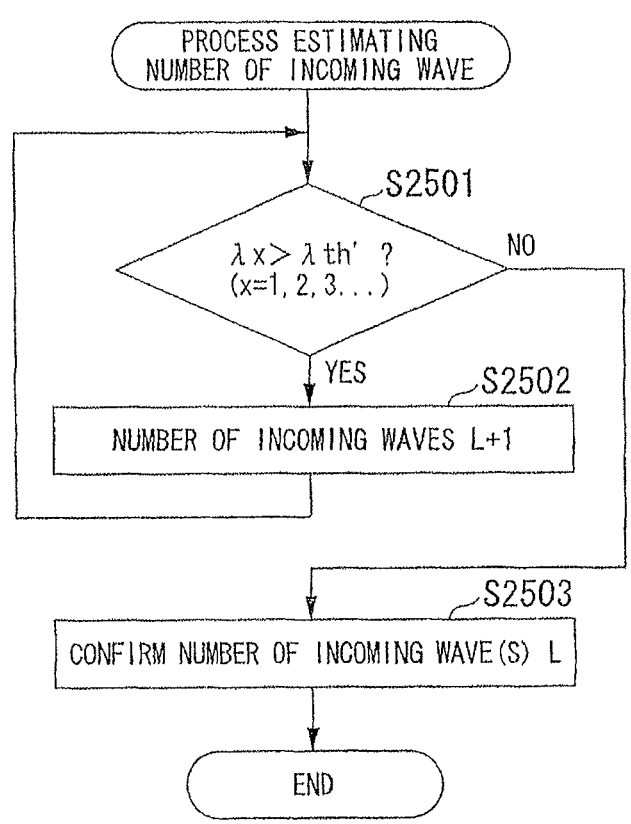
FIG. 56 is a flowchart describing in detail another process estimating a number of incoming waves, executed in step S2105 shown in FIG. 51.

Next, another process for estimating a number of an incoming wave is described with reference to the flowchart shown in FIG. 56. This FIG. 56 is different from the flowchart shown in FIG. 54 and FIG. 55 in that a normalization is not made after the eigen value is computed. Instead, as described in the description of the correlation matrix computation unit 230, a configuration may be made such that the correlation matrix computation unit 230 performs a normalization by dividing each element of the correlation matrix Rxx by the maximum value of the diagonal element among each element of the correlation matrix Rxx, and then, the eigen value computation unit 231 computes the eigen value and the eigen vector.

In addition, instead of normalizing the correlation matrix Rxx at the correlation matrix computation unit 228, the normalization process may be carried out before the eigen value computation unit 231 computes the eigen value, and then, the eigen value and the eigen vector may be computed.

As a result, the accuracy of the floating point calculation of the eigen value computation increases. In addition, it is possible to reduce the number of computations necessary for the conversion of the arithmetic algorithm (such as the Jacobi Method and the QR Method) of the eigen value and the eigen vector. In this way, it is possible to reduce the time spent on the calculation. Further, it is not necessary to normalize the eigen value in the process for estimating the number of incoming waves. In addition, among each element of the correlation matrix Rxx, when the maximum value of all of the elements including the diagonal element is set to be the standard for the normalization, the normalization process of the eigen value in step S2402 shown in FIG. 54 may be executed before the step S2501 shown in FIG. 56.

In either case, the eigen value $\lambda x$ (x=1, 2, 3, ... ) computed by the normalized correlation matrix is inputted into the determination unit 232, and the process for determining the number of incoming waves shown in the flowchart in FIG. 56 begins. At this time, the determination unit 232 resets the number of incoming waves L to 0.

The determination unit 232 sorts the inputted eigen value $\lambda x$ from the largest to the smallest. Then, the determination unit 132 makes a comparison between each eigen value $\lambda x$ and the predetermined threshold value $\lambda th'$ in the order from the largest eigen value $\lambda x$ to the smallest (step S2501).

At this time, when the determination unit 232 detects that the eigen value $\lambda x$ is greater than or equal to the predetermined threshold value $\lambda th'$, the determination unit 232 proceeds the operation to step S2502. Meanwhile, when the determination unit 232 finds that the eigen value $\lambda x$ is less than the predetermined threshold value $\lambda th'$, the determination unit 232 proceeds the operation to step S2503.

Further, when the determination unit 232 finds that the eigen value $\lambda x$ is greater than or equal to the predetermined threshold value $\lambda th'$, the determination unit 232 increments the number of incoming waves L (step S2502), and returns the operation to step S2501.

Further, when the eigen value Xx is less than the predetermined threshold value $\lambda th'$, the determination unit 232 confirms the present number of incoming waves L as the estimated number of incoming waves, and outputs to the direction detection unit 230 (step S2503).

In this process for estimating the number of incoming waves, the determination unit 232 executes the above described process from step S2501 to step S2503 every time an eigen value is inputted from the eigen value computation unit 231.

Figure 57:
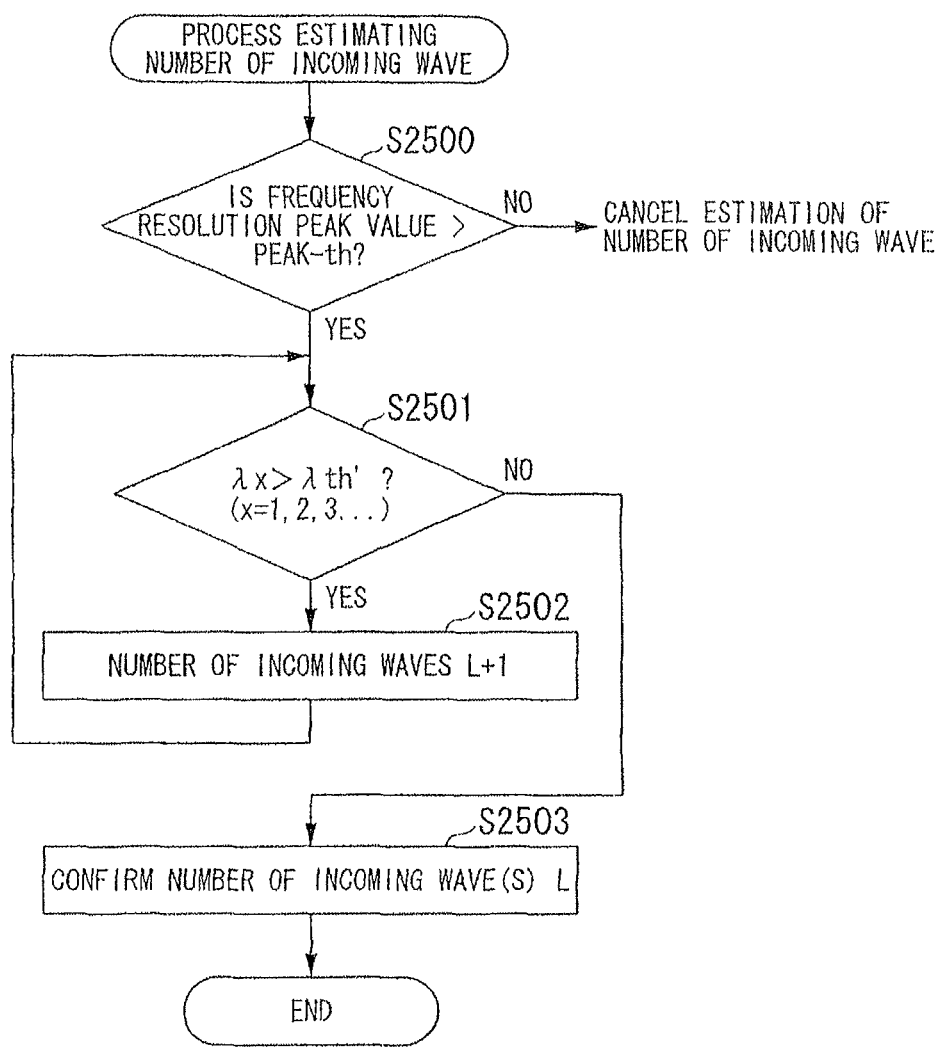
FIG. 57 is a flowchart describing in detail another process estimating a number of incoming waves, executed in step S2105 shown in FIG. 51.

Furthermore, as shown in FIG. 57, it is possible to place a step S2500 before the comparison process of step S2501 in the flowchart shown in FIG. 56. In the step S2500, the peak value detected by the peak detection unit 223 after the frequency resolution is compared with the predetermined threshold value PEAK-th.

Further, the determination unit 232 detects whether or not the peak value inputted from the peak detection unit 223 is greater than or equal to a predetermined threshold PEAK-th (step S2500). When the determination unit 232 detects that the peak value is greater than or equal to the threshold value PEAK-th, the determination unit 232 performs step S2501 shown in FIG. 53 and the steps subsequent to step S2501 in the process for determining the number of incoming waves. Meanwhile, when the determination unit 232 detects that the peak value is less than the threshold value PEAK-th, the determination unit 232 does not execute the process for estimating the number of incoming waves. Thus, the determination unit 232 does not output the number of incoming waves L to the direction detection unit 230.

In other words, even in embodiments such that an eigen value is obtained from a correlation matrix of the entire frequency point or within a specific range of the frequency point, it is possible to cancel (halt) the process of estimating the number of incoming waves during the estimation of the number of incoming waves. Thus, even if the level of reception is low due to the influence of multipass on the road surface, it is possible to avoid making an erroneous estimation of the number of incoming waves.

Figure 58:
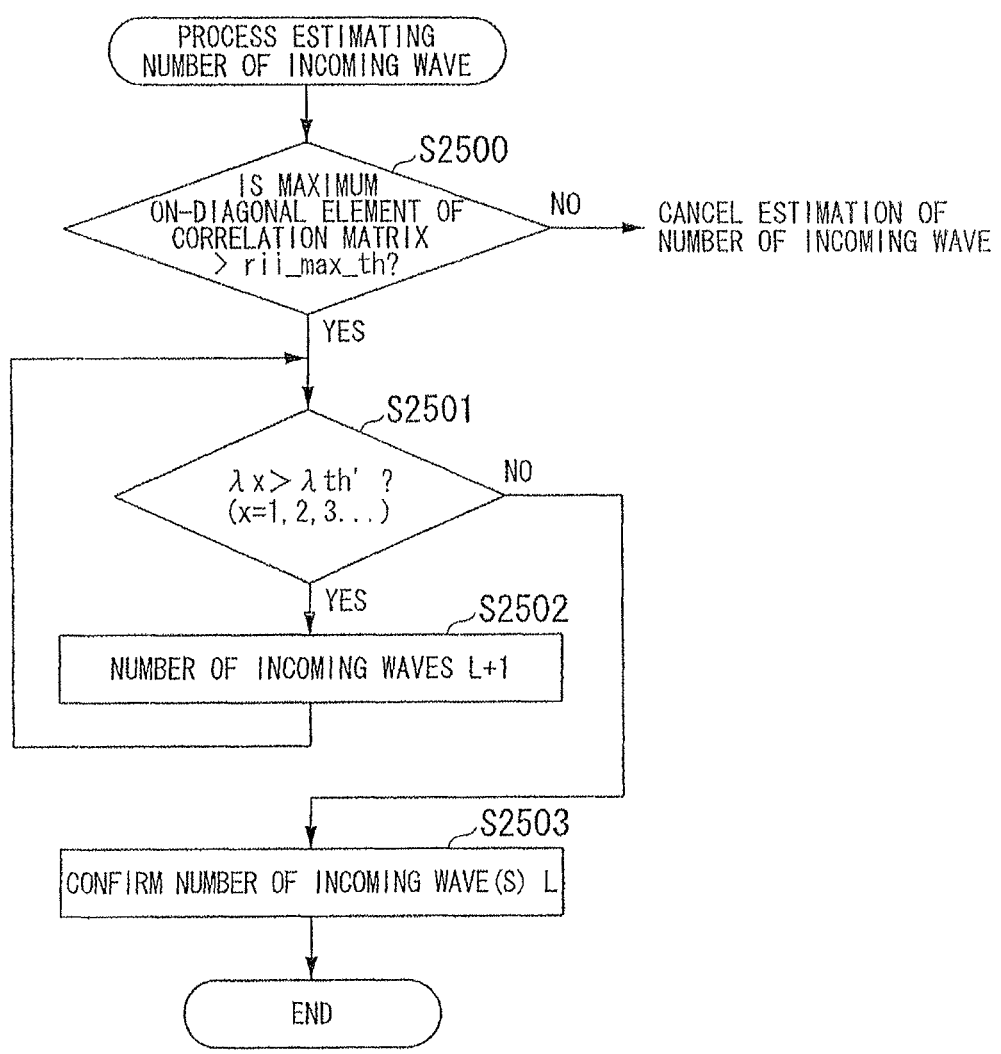
FIG. 58 is a flowchart describing in detail another process estimating a number of incoming waves, executed in step S2105 shown in FIG. 51.

Moreover, as shown in FIG. 58, instead of the step S2500 in FIG. 57, it is possible to place a step S2500 in which the maximum value of the diagonal element of the obtained correlation matrix is compared with a predetermined threshold value.

Figure 60A:
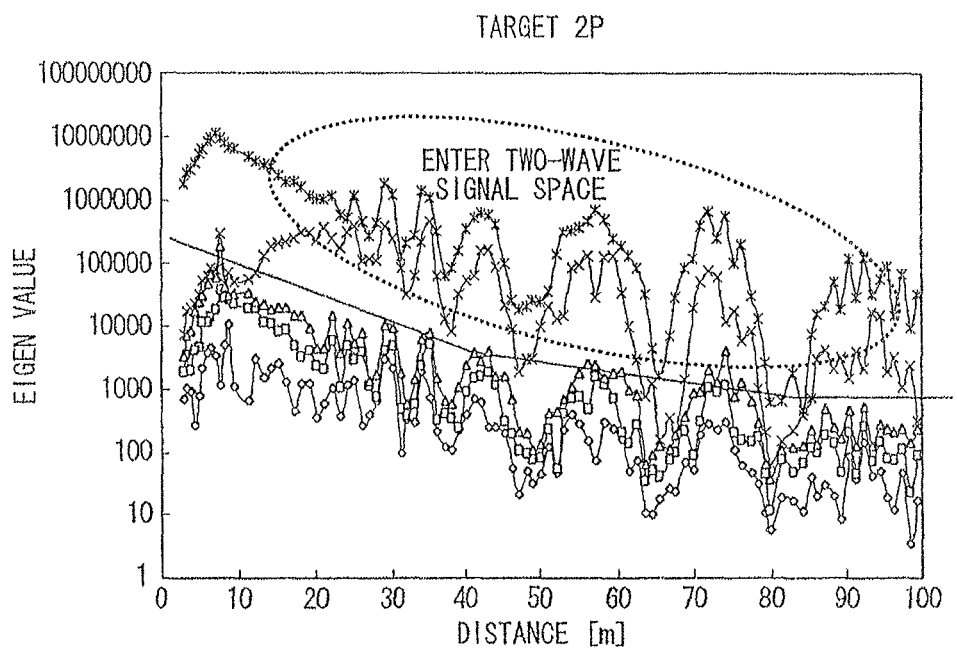
FIG. 60A is a graph showing a distance when a number of incoming waves is 2, also showing a correspondence between an eigen value and each distance.
Figure 60B:
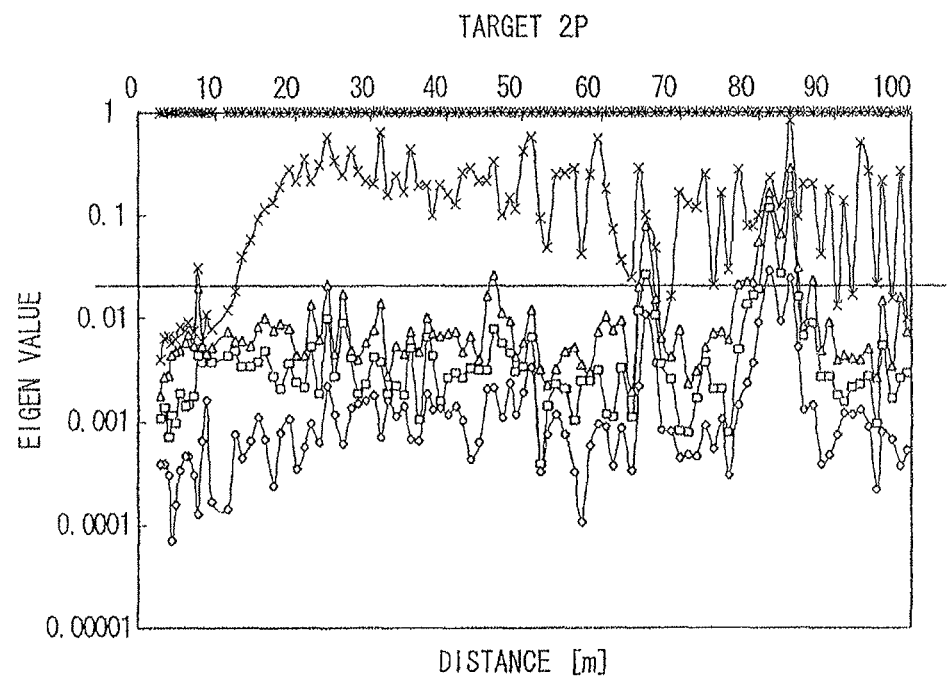
FIG. 60B is a graph showing a distance when a number of incoming waves is 2, also showing a correspondence between an eigen value and each distance.

FIGS. 59A, 59B, 59C, and FIGS. 60A and 60B are graphs showing a condition in which the distribution of the eigen values actually fluctuates for each distance (for each beat frequency). FIGS. 59A, 59B, and 59C present the instance in which one wave has arrived (the number of incoming wave being 1). FIGS. 60A and 60B present the instance in which two waves have arrived (the number of incoming waves being 2).

Here, the horizontal axis of FIGS. 59A and 60A indicates the distance, while the vertical axis indicates the eigen value. In addition, the horizontal axis of FIGS. 59B and 60B indicates the distance, while the vertical axis indicates the value obtained by normalizing the other eigen value $\lambda x$ with the maximum eigen value $\lambda a$.

FIG. 59A and FIG. 60A indicate that, in an area within a distance of approximately 65 in and 80 m from the target, a region exists such that the eigen value becomes small due to multipass.

In addition, as shown in FIG. 59B and FIG. 60B, even if the value is normalized, the fluctuation of the normalized value itself becomes large, and an erroneous estimation of the incoming waves may be made when the incoming wave estimation is conducted at a region under the influence of multipass.

Therefore, according to the processes of step S2400 of FIG. 55, step S2500 of FIG. 57, and step S2500 of FIG. 58, a configuration is introduced in which an incoming wave estimation is not made. Thus, the estimation of the number of incoming waves and the detection of the direction according to this correlation matrix may be cancelled. Therefore, an erroneous detection result of the direction is not calculated.

FIG. 59C shows the value of the eigen value at a distance of 100 (m) in FIG. 60A, in which the number of incoming wave is 1. Thus, FIG. 59C shows the difference between the values of the eigen value $\lambda 1$ in the signal space and the eigen value in another noise space.

Conventionally, the estimation of the incoming wave was conducted by setting a threshold value Th for each distance by using the eigen values of FIG. 59A and FIG. 60A. However, in the eighth embodiment, the eigen value is normalized, and a comparison with the threshold value Th is made, as shown in FIG. 59B and FIG. 60B. Therefore, as already described, the threshold value $\lambda th$ (or the threshold value $\lambda th'$) is set as one value which is uniform for all distances. Thus, a comparison is made with the eigen value for all distances. Therefore, the estimation of the number of incoming waves is made easily.

In addition, when the estimation of the number of incoming waves cannot be conducted, the direction detection unit 230 copes with this situation by way of a method estimating the present distance based on the past distance, the relative velocity, and the direction.

Ninth Embodiment

Figure 61:
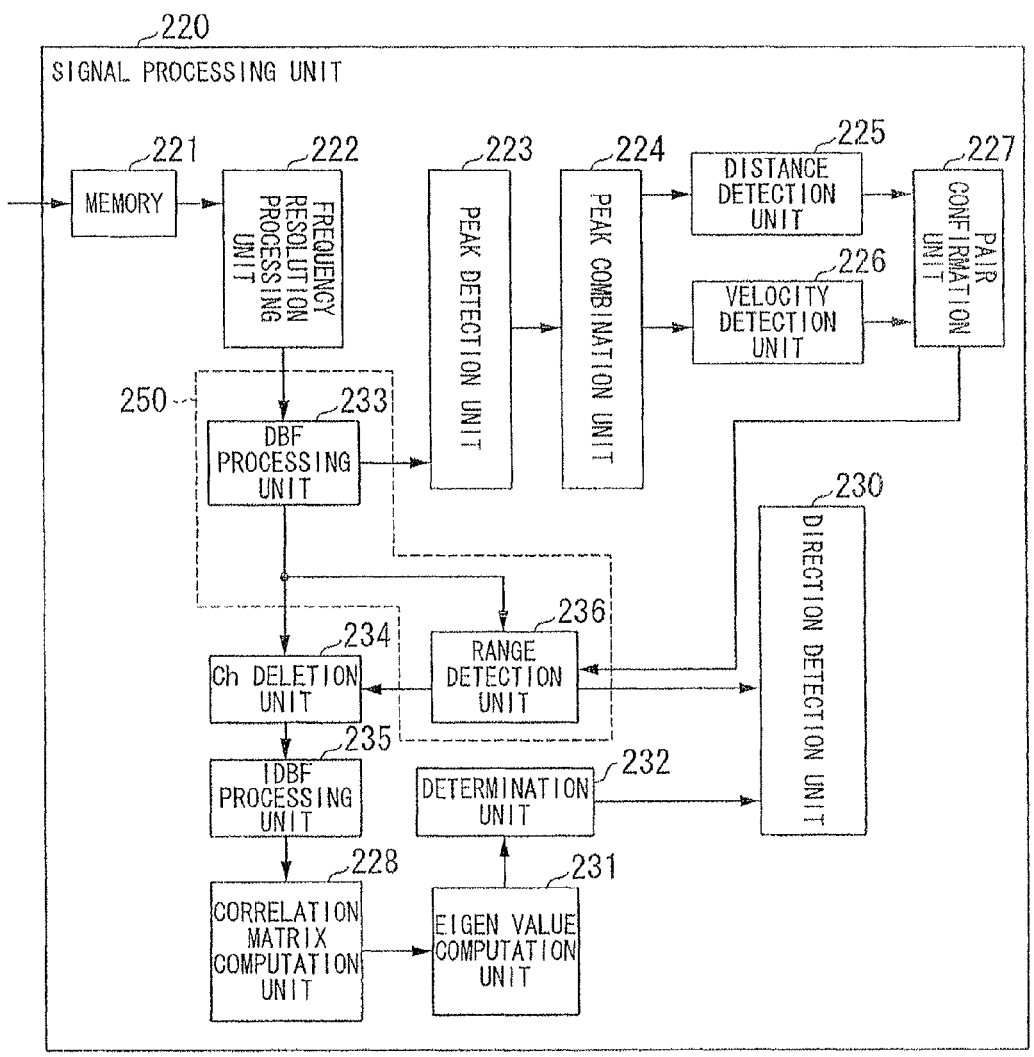
FIG. 61 is a block diagram showing an example of a configuration of a signal processing unit 220 of an electronic scanning type radar device according to a ninth embodiment of the present invention.

Hereinafter, an electronic scanning type radar device according to a ninth embodiment of the present invention is described with reference to FIG. 61. FIG. 61 is a block diagram showing an example of a configuration of an electronic scanning type radar device according to the ninth embodiment.

According to this ninth embodiment, similar to the eighth embodiment, the estimation of the direction for the setting of the range is first performed using DBF (Digital Beam Forming) which has a low resolution compared to super-resolution algorithms such as MUSIC, thus narrowing the angular range of the target.

The ninth embodiment differs from the eighth embodiment in that an IBDF (inverse DBF, i.e., an inverse spatial axis Fourier transform) is conducted on the DBF-ed value, thus returning to a complex number data of a temporal axis. Thus, the accuracy with which the direction is subsequently estimated by the super-resolution algorithm is enhanced. The same reference numeral is used for the configuration which is similar to the eighth embodiment shown in FIG. 45. Hereinafter, the aspects which are different from the eighth embodiment are described.

The ninth embodiment shows a configuration in which a Ch (Channel) deleting unit 234 and an IDBF processing unit 235 are added to the angular range setting unit 250 in the eighth embodiment.

The DBF processing unit 233 performs, similar to the eighth embodiment, a spatial axis Fourier transform, and outputs the spatial complex number data to the peak detection unit 223, and outputs to the Ch deleting unit 234 as well.

Here, in the ninth embodiment in the direction in which the reception antennas are aligned, as shown in FIG. 49A and FIG. 50A, the DBF processing unit 233 performs a spatial axis Fourier transform based on a 16-point resolution, for instance, and, as a result, creates a spectrum with an angle unit of 15 angular channels, and outputs to the Ch deleting unit 134 and to the range detection unit 236.

Then, similar to the eighth embodiment, from the spectrum with an angular unit of angular channels, the range detection unit 236 outputs to the direction detection unit 230 as an angular range information, a range of the angular channel which has a spectrum intensity greater than or equal to the threshold value.

Figure 49B:
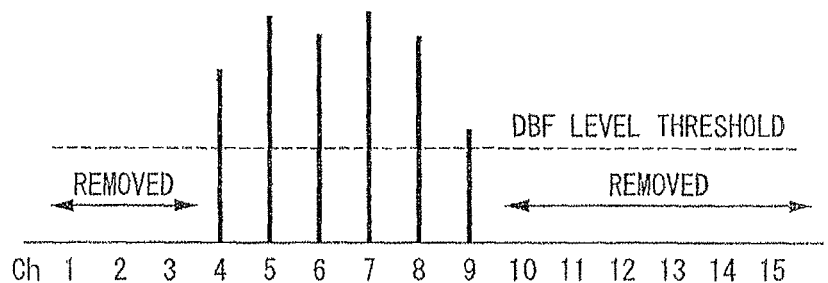
FIG. 49B is a graph describing a focusing process of an angle range for computing a MUSIC spectrum using a DBF process.
Figure 50B:
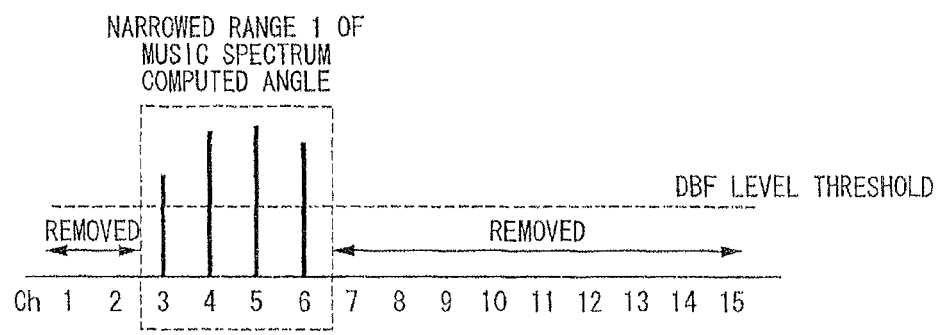
FIG. 50B is a graph describing a focusing process of an angle range for computing a MUSIC spectrum using a DBF process.
Figure 50C:
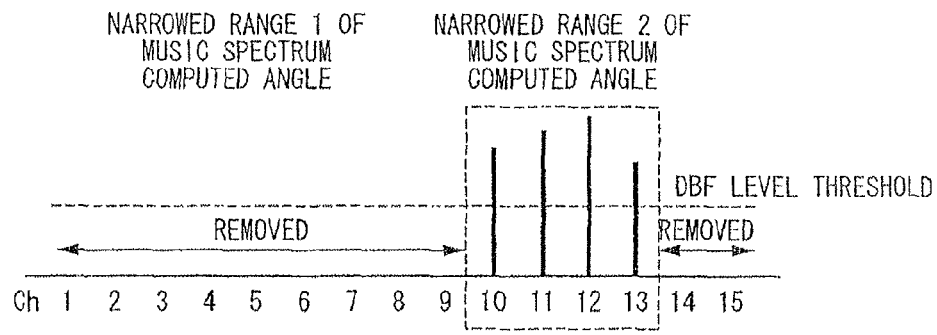
FIG. 50C is a graph describing a focusing process of an angle range for computing a MUSIC spectrum using a DBF process.

In addition, the Ch deleting unit 234 detects whether or not the level of the spectrum is continuous while being adjacent to the predetermined angular range, and, whether or not the level of the predetermined DBF threshold value is exceeded. Furthermore, the Ch deleting unit 234 performs a process converting the spectrum of the angular channel which does not exceed the DBF threshold value to "0," and thus outputs a narrowed spatial complex number data for each beat frequency as shown in FIGS. 49B, 50B, and 50C.

According to the process described above, when, for example, four adjacent angular channels have a level which continuously exceeds the DBF threshold value, the Ch deleting unit 234 determines that a target exists, and leaves the spectrum of these angular channels intact, while converting the intensity of a spectrum of another angle to "0."

Further, the IDBF processing unit 235 performs an inverse spatial axis Fourier transform on a spatial complex number data such that the spectrum was narrowed, i.e., only the data of the angular channel region being continuous for the predetermined number of angular channels and exceeding the DBF threshold value is left, and the intensity of the rest of the region is converted to "0." Thus, the IDBF processing unit 235 restores the spatial complex number data to a complex number data of a temporal axis, and outputs to the correlation matrix computation unit 228.

Figure 49C:
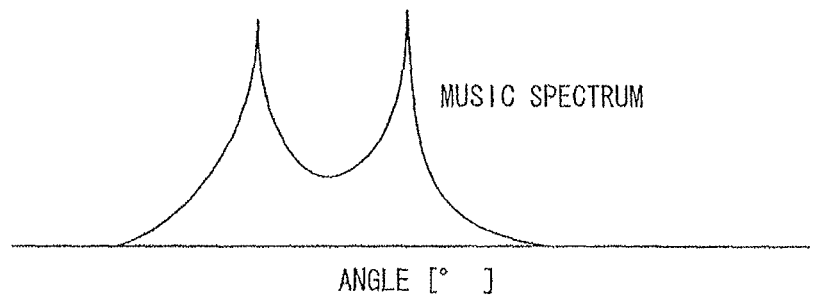
FIG. 49C is a graph describing a focusing process of an angle range for computing a MUSIC spectrum using a DBF process.

Furthermore, in order to compute a correlation matrix from the inputted complex number data, the correlation matrix computation unit 228 can obtain a correlation matrix with a good orthogonal characteristic such that objects on the roadside and the like are removed and the noise element is deleted. FIG. 49C shows an example in which a correlation matrix is created by the above described method with respect to the target cluster of the DBF resolution in FIG. 49B (the term "target cluster" is used because, in actuality, two or more targets may exist), and the target is divided even further by a super-resolution algorithm.

In other words, the present invention involves an algorithm which estimates the direction of the incoming wave by making an accurate calculation of the number of incoming waves and the angle. During the detection of the direction by the DBF, an estimation of the angle is not made by a peak estimation for example. Instead, a range (target cluster) in which one or more targets exist(s) is merely extracted. Further, the existence of one or more targets described above is divided into pieces.

In addition, as shown in FIG. 50A, when a reception wave including a reflection component from a plurality of target clusters is received, there are a plurality of angular channel ranges, which exceed the DBF level at continuous angular channels, in the spatial complex number data outputted from the DBF processing unit 233.

Further, the Ch deleting unit 234 selects the spatial complex number data corresponding to the frequency point of the target in the descending region for which a combination is confirmed by the pair confirmation unit 227. Then, after performing the Ch (channel) deletion, described above, the Ch deleting unit outputs to the IDBF processing unit 235.

In addition, the IDBF processing unit 235 performs an inverse spatial Fourier transform on the inputted spatial complex number data, and outputs the obtained temporal axis complex number data to the correlation matrix computation unit 228.

As a result, the correlation matrix computation unit 228 calculates the correlation matrix from the inputted complex number data, and outputs to the eigen value computation unit 231.

The subsequent process for estimating the number of incoming waves is similar to the process described already and shown from FIG. 54 to FIG. 57.

According to the process described above, the range of the detection direction can be narrowed when the spectrum of the MUSIC is computed in the direction detection unit 230, in a manner similar to the ninth embodiment. Thus, the resolution can be enhanced.

In other words, according to the configuration described above, the reception wave divided into reflection components for each target cluster is hypothetically received in the correlation matrix used in the eigen value computation, regarding the eigen value computation unit 231. Therefore, even if the received reception wave includes a reflection component from a number of targets which is equal to or exceeded by, for example, the number of reception antennas and the number of subarrays, the eigen value computation can be carried out without any errors. In addition, an application can be made to the subsequent estimation of the angular spectrum and the Root-MUSIC which computes a root obtaining the angle.

Furthermore, because a division is made from the entire detectable angular range to a plurality of angular ranges, it is possible to estimate a maximum value of the number of incoming waves (the number of targets) within the divided, narrow angular range. Therefore, even if the number of incoming waves is not estimated, it is possible to set a fixed number of incoming waves, and estimate the angular spectrum as well as the root for obtaining the angle.

Moreover, after the direction of the present target has been detected, the direction detection unit 230 may store the direction of this target to the memory 221, and read it from the memory 221 as information for each cycle after the next direction computation cycle. In addition, in the direction computation cycle, the spectrum may be computed while including the angular range surrounding the target direction of the past cycle in the above angular range (the angular range information inputted from the range setting unit 236).

Tenth Embodiment

Furthermore, in FIG. 44, after the direction of the present target has been detected, the direction detection unit 30 stores the direction of this target to the memory 221.

In addition, the angular range setting unit 250 sets each cycle information in and after the next direction computation cycle, reads the direction of the present target from the memory 221, and considering this direction as a center, adds a predetermined range of a numerical value to the front and back, sets an angular range with a center at a direction obtained by the result of this previous detection cycle, and outputs this angular range to the direction detection unit 230 as information on the angular range.

At this time, in the previous detection cycle, when each direction of a plurality of targets is stored in the memory 221, the angular range setting unit 236 reads the direction of each target from the memory 221, computes the angular range information for each direction, and outputs to the direction detection unit 230.

Heretofore, the eighth, ninth, and tenth embodiments have been described based on a configuration used in the FMCW-type radar shown in FIG. 44. However, an application to other antenna configurations of an FMCW-type is also possible.

In addition, an application is possible to a format other than an FMCW-type such as a multi-frequency CW and a pulse radar. In addition, according to the tenth embodiment, the estimation of the number of incoming waves and the detection of the direction were conducted concerning the correlation matrix corresponding to the beat frequency of either one of the ascending portion and the descending portion of the triangular wave. However, it is possible to perform the estimation of the number of incoming waves and the detection of the direction in each of the ascending region and the descending region, and, perform a peak combination after detecting the direction. Moreover, the tenth embodiment was described based on the MUSIC Method, which is a super-resolution algorithm, as an example of the direction detection unit. However, it is possible to apply the Minimum Norm Method and the ESPRIT Method and the like, which performs an eigen expansion in a similar manner, and is a detection algorithm based on the principle that the number of incoming waves is estimated in order to detect the direction of the incoming wave.

Furthermore, a program executing an operation of the signal processing unit 220 shown in FIG. 44, FIG. 45, and FIG. 61 may be recorded in a recording medium which can be read by a computer. The program recorded to this recording medium may then be read by a computer system, and may be executed to perform a signal processing which performs a detection of the direction and includes a process estimating the number of incoming waves as shown in FIG. 54 to FIG. 57, in which the number of reception waves is estimated. Incidentally, the "computer system" here includes hardware such as OS and peripheral devices. In addition, the "computer system" includes a www-system which possesses an environment to provide websites (or, an environment for displaying). In addition, a "recording medium which can be read by a computer" indicates a transportable medium such as a flexible disc, an optical magnetic disc, a ROM, a CD-ROM, and the like, as well as a memory device such as a hard disc which is embedded in a computer system. Furthermore, a "recording medium which can be read by a computer" also indicates those which retain a program for a certain period of time such as a network like an internet, a server when a program is transmitted via a transmission line such as a telephone line, or a volatile memory (RAM) inside a client computer system.

In addition, the program may be transmitted to another computer system from a computer system which stores this program inside a memory device and the like, to another computer system through a transmission medium or a transmission wave inside a transmission medium. Here, a "transmission medium" transmitting the program includes a medium having an operation of transmitting information, such as a network (communication network) like the internet, or a communication line (communication wire) such as a telephone line. In addition, the program may be such that a part of the above described operation is executed. Furthermore, the program may be a so-called difference file (difference program) which executes the above described operation in combination with a program already recorded in the computer system.

Figure 62:
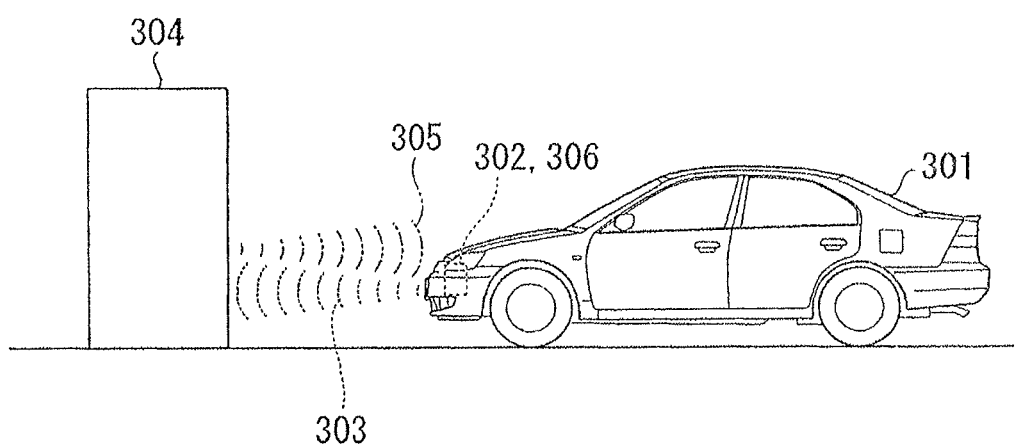
FIG. 62 is a conceptual diagram showing an electronic scanning type radar device and a computer mounted on a moving body, the electronic scanning type radar device transmitting a transmission wave, and the electronic scanning type radar device receiving a reflection wave caused by the transmission wave reflecting from a target.

FIG. 62 is a conceptual diagram showing an electronic scanning type radar device 302 and a computer 306 mounted on a moving body 301, the electronic scanning type radar device 302 transmitting a transmission wave 303, and the electronic scanning type radar device 302 receiving a reflection wave 305 caused by the transmission wave 303 reflecting from a target 304. According to FIG. 62, the computer 306 is integrated with the electronic scanning type radar device 302. However, the computer 306 may be placed at a place separate from the electronic scanning type radar device 302.

INDUSTRIAL APPLICABILITY

According to an aspect of the present invention, the target consolidation processing unit relates the same target in the present and in the past to one another. Then, the target consolidation processing unit performs an averaging process of the correlation matrix. Therefore, regardless of the fluctuation of the distance to the target, the eigen value computation in the subsequent direction detection process and the spectrum computation (such as MUSIC) can be performed accurately. Thus, compared to the instance in which the computation is performed using the correlation matrix of only the present time, it is possible to enhance the recognition performance of the final distance and direction of the target.

The invention claimed is:
1. An electronic scanning type radar device mounted on a moving body comprising:
   a transmission unit transmitting a transmission wave;
   a reception unit comprising a plurality of antennas receiving an incoming wave, the incoming wave being a reflection wave of the transmission wave from a target;
   a beat signal generation unit generating a beat signal comprising a frequency of a difference between the transmission wave and the reflection wave;
   a frequency resolution processing unit frequency resolving the beat signal into a beat frequency of a predetermined resolution number in chronological order and computing a complex number data;

a peak detection unit detecting a peak value from an intensity value of each of the beat frequency and detecting an existence of a target;

a correlation matrix computation unit computing a correlation matrix from each of a complex number data of a detected beat frequency for which the target was detected for each of the antennas;

an eigen value computation unit computing an eigen value from a correlation matrix;

a comparison unit comparing an eigen value obtained by normalizing, and a predetermined threshold value;

a determination unit determining a number of an eigen value of a numeric value, among an eigen value corresponding to a beat frequency for which a target was detected, the numeric value exceeding the threshold value, as a number of the incoming waves.

2. The electronic scanning type radar device according to claim 1, wherein the eigen value computation unit, concerning an eigen value having a maximum value among the computed eigen value, normalizes all eigen values by performing a division, and wherein the comparison unit compares the normalized eigen value and the predetermined threshold value.

3. The electronic scanning type radar device according to claim 1, wherein the eigen value computation unit, by a maximum value element of the correlation matrix, divides all of the element of the correlation matrix, and computes an eigen value based on a correlation matrix whose element is normalized, and wherein the comparison unit compares the eigen value with the predetermined threshold value.

4. The electronic scanning type radar device according to claim 1, wherein the determination unit compares a predetermined maximum eigen value threshold value and a maximum eigen value among an obtained eigen value, and, when the maximum eigen value exceeds the predetermined maximum eigen value threshold value, the determination unit finds that the eigen value is of an effective reception level, and performs an estimation of a number of an incoming wave.

5. The electronic scanning type radar device according to claim 1, wherein the eigen value computation unit divides all element of the correlation matrix with an element having a maximum value among a diagonal element of the correlation matrix, computes an eigen value based on a correlation matrix whose elements are normalized, and wherein the comparison unit compares the eigen value and the predetermined threshold value.

6. The electronic scanning type radar device according to claim 1 further comprising a peak value comparison unit comparing the peak value with a predetermined effective reception level, wherein when the peak value exceeds the predetermined effective reception level, the determination unit finds that an eigen value is of an effective determination level, and estimates a number of a incoming wave.

7. The electronic scanning type radar device according to claim 1, wherein the determination unit compares a predetermined maximum correlation matrix diagonal element threshold value and a maximum value of a diagonal element of the correlation matrix which was obtained, and when the maximum value of the diagonal element exceeds the maximum correlation matrix diagonal element threshold, the determination unit finds that an eigen value is of an effective reception level, and estimates a number of an incoming wave.

8. The electronic scanning type radar device according to claim 1, wherein the peak detection unit comprises a digital beam forming unit which performs a digital beam forming in a direction of a channel based on the complex number data for each of the antennas, and detects an existence of the target.

9. The electronic scanning type radar device according to claim 8, further comprising a channel deleting unit wherein, when the digital beam forming unit computes a spatial complex number data showing an intensity of a spectrum for each angular channel by performing a digital beam forming using the complex number data, and an intensity of a spectrum of an adjacent angular channel exceeds a predetermined digital beam forming threshold value in a predetermined range of a number of angular channels, the channel deleting unit detects an existence of a target, and wherein, the channel deleting unit replaces a spectrum intensity of an angular channel for which the existence of the target is not detected to "0," and outputs a new spatial complex number data; and an inverse digital beam forming unit generating a restored complex number data by performing an inverse digital beam forming on the new spatial complex number data, wherein the correlation matrix computation unit computes a correlation matrix from the restored complex number data.

10. The electronic scanning type radar device according to claim 1, wherein the peak detection unit converts an added value of a complex number data of all of the antennas to a frequency spectrum, and detects a target based on a peak value of the frequency spectrum.

11. A reception wave direction estimation method by an electronic scanning type radar device mounted on a moving body comprising:

a transmission process transmitting a transmission wave from a transmission unit;

a reception process in which a reception unit comprising a plurality of antennas receives a reflection wave of the transmission wave from a target;

a beat signal generation process in which a beat signal generation unit generates a beat signal comprising a frequency of a difference between the transmission wave and the reflection wave;

a frequency resolution processing step in which a frequency resolution processing unit frequency resolves the beat signal into a beat frequency of a predetermined resolution number and computes a complex number data in chronological order;

a peak detection process in which a peak detection unit detects a peak value from an intensity value of each of the beat frequency and detecting an existence of the target;

a correlation matrix computing process in which a correlation matrix computation unit computes a correlation matrix from each of a complex number data of a detected beat frequency for which the target was detected for each of the antennas;

an eigen value computation process in which an eigen value computation unit computes an eigen value from a correlation matrix;

a comparison process in which a comparison unit compares an eigen value obtained by normalizing, and a predetermined threshold value; and a determination process in which the determination unit determines a number of an eigen value of a numeric value, among an eigen value corresponding to a beat frequency for which a target was detected, the numeric value exceeding the threshold value, as a number of the incoming waves.

12. A non-transitory computer readable medium having a reception wave direction estimation program, which is a program for an electronic scanning type radar device mounted on a moving body, embodied thereon which when executed by a computer causes the computer to control an operation of a reception wave direction estimation, the program comprising:
- a transmission process transmitting a transmission wave from a transmission unit;
- a reception process in which a reception unit comprising a plurality of antennas receives an incoming wave, the incoming wave being a reflection wave of the transmission wave from a target;
- a beat signal generation process in which a beat signal generation unit generates a beat signal comprising a frequency of a difference of the transmission wave and the reflection wave;
- a frequency resolution processing step in which a frequency resolution processing unit frequency resolves the beat signal into a beat frequency of a predetermined resolution number and computes a complex number data in chronological order;
- a peak detection process in which a peak detection unit detects a peak value from an intensity value of each of the beat frequency and detects an existence of the target;
- a correlation matrix computing process in which a correlation matrix computation unit computes a correlation matrix from each of a complex number data of a detected beat frequency for which the target was detected for each of the antennas;
- an eigen value computation process in which an eigen value computation unit computes an eigen value from a correlation matrix;
- a comparison process in which a comparison unit compares an eigen value obtained by normalizing, and a predetermined threshold value; and
- a determination process in which the determination unit determines a number of an eigen value of a numeric value, among an eigen value corresponding to a beat frequency for which a target was detected, the numeric value exceeding the threshold value, as a number of the incoming waves.

* * * * *